(12) United States Patent
Plante et al.

(10) Patent No.: US 9,121,289 B2
(45) Date of Patent: Sep. 1, 2015

(54) HIGH PRESSURE TURBINE BLADE COOLING HOLE DISTRIBUTION

(71) Applicant: Pratt & Whitney Canada Corp., Longueuil (CA)

(72) Inventors: Ghislain Plante, Verdun (CA); Rene Paquet, Montreal (CA); Patrick Peloquin, Varennes (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 397 days.

(21) Appl. No.: 13/630,310

(22) Filed: Sep. 28, 2012

(65) Prior Publication Data
US 2014/0219816 A1 Aug. 7, 2014

(51) Int. Cl.
F01D 5/18 (2006.01)
F01D 5/14 (2006.01)

(52) U.S. Cl.
CPC ............. *F01D 5/186* (2013.01); *F01D 5/141* (2013.01); *F01D 5/187* (2013.01); *F05D 2250/74* (2013.01)

(58) Field of Classification Search
CPC ......... F01D 5/186; F01D 5/141; F01D 5/187; F05D 2250/74
USPC .................... 415/115; 416/97 R, DIG. 2
See application file for complete search history.

(56) References Cited

U.S. PATENT DOCUMENTS

| | | |
|---|---|---|
| 3,994,622 A | 11/1976 | Schultz et al. |
| 4,601,638 A | 7/1986 | Hill et al. |
| 4,753,575 A | 6/1988 | Levengood et al. |
| 5,374,162 A | 12/1994 | Green |
| 6,174,134 B1 | 1/2001 | Lee et al. |
| 6,196,792 B1 | 3/2001 | Lee et al. |
| 6,290,462 B1 | 9/2001 | Ishiguro et al. |
| 6,318,960 B1 | 11/2001 | Kuwabara et al. |
| 6,354,797 B1 | 3/2002 | Heyward et al. |
| 6,398,489 B1 | 6/2002 | Burdgick et al. |
| 6,514,037 B1 | 2/2003 | Danowski et al. |
| 6,554,572 B2 | 4/2003 | Rinck et al. |
| 6,607,355 B2 | 8/2003 | Cunha et al. |
| 6,832,897 B2 | 12/2004 | Urban |
| 6,854,961 B2 | 2/2005 | Zhang et al. |
| 6,868,675 B1 | 3/2005 | Kuhn et al. |
| 6,910,864 B2 | 6/2005 | Tomberg |
| 6,910,868 B2 | 6/2005 | Hyde et al. |
| 7,008,186 B2 | 3/2006 | Heeg et al. |
| 7,124,487 B2 | 10/2006 | Kuhn et al. |
| 7,186,085 B2 | 3/2007 | Lee |
| 7,249,934 B2 | 7/2007 | Palmer et al. |
| 7,306,436 B2 | 12/2007 | Girgis et al. |

(Continued)

*Primary Examiner* — Dwayne J White
*Assistant Examiner* — Ryan Ellis
(74) *Attorney, Agent, or Firm* — Norton Rose Fulbright Canada

(57) ABSTRACT

A turbine blade for a gas turbine engine with an airfoil portion defined by a perimeter wall surrounding at least one enclosure, the perimeter wall having a plurality of cooling holes defined therethrough and providing fluid communication between the at least one enclosure and a gaspath of the gas turbine engine. The plurality of cooling holes includes at least one row of holes selected from the group consisting of a first row, a second row, a third row and a fourth row, with the first, second, third and fourth rows of holes respectively including the holes numbered PA-1 to PA-10, PB-1 to PB-3, HA-1 to HA-9, and SA-1 to SA-8 located such that a central axis thereof extends through the respective point 1 and point 2 having a nominal location in accordance with the X, Y, Z Cartesian coordinate values set forth in Table 3.

20 Claims, 6 Drawing Sheets

(56) References Cited

U.S. PATENT DOCUMENTS

| | | |
|---|---|---|
| 7,351,038 B2 | 4/2008 | Girgis et al. |
| 7,354,249 B2 | 4/2008 | Girgis et al. |
| 7,364,405 B2 | 4/2008 | Cunha et al. |
| 7,367,779 B2 | 5/2008 | Girgis et al. |
| 7,402,026 B2 | 7/2008 | Girgis et al. |
| 7,478,994 B2 | 1/2009 | Cunha et al. |
| 7,500,823 B2 | 3/2009 | Bolms et al. |
| 7,506,512 B2 | 3/2009 | Schumacher et al. |
| 7,520,726 B2 | 4/2009 | Papple et al. |
| 7,520,727 B2 | 4/2009 | Sreekanth et al. |
| 7,520,728 B2 | 4/2009 | Sleiman et al. |
| 7,534,091 B2 | 5/2009 | Ravanis et al. |
| 7,537,432 B2 | 5/2009 | Marini et al. |
| 7,537,433 B2 | 5/2009 | Girgis et al. |
| 7,546,737 B2 | 6/2009 | Schumacher et al. |
| 7,559,746 B2 | 7/2009 | Tsifourdaris et al. |
| 7,559,747 B2 | 7/2009 | Mohan et al. |
| 7,559,748 B2 | 7/2009 | Kidikian et al. |
| 7,559,749 B2 | 7/2009 | Kidikian et al. |
| 7,566,200 B2 | 7/2009 | Marini et al. |
| 7,568,889 B2 | 8/2009 | Mohan et al. |
| 7,568,890 B2 | 8/2009 | Findlay et al. |
| 7,568,891 B2 | 8/2009 | Mohan et al. |
| 7,611,326 B2 | 11/2009 | Trindade et al. |
| 7,625,182 B2 | 12/2009 | Mah et al. |
| 7,625,183 B2 | 12/2009 | Tsifourdaris et al. |
| 7,632,074 B2 | 12/2009 | Ravanis et al. |
| 2005/0079061 A1 | 4/2005 | Beddard |
| 2008/0124219 A1 | 5/2008 | Kidikian et al. |
| 2008/0317585 A1 | 12/2008 | Lee et al. |
| 2009/0097982 A1 | 4/2009 | Saindon et al. |
| 2009/0116967 A1 | 5/2009 | Sleiman et al. |
| 2010/0008784 A1 | 1/2010 | Shafique et al. |
| 2010/0266398 A1 | 10/2010 | Marini |
| 2010/0329874 A1 | 12/2010 | Tsifourdaris et al. |
| 2011/0236214 A1* | 9/2011 | Tsifourdaris ............. 416/223 A |
| 2011/0243747 A1 | 10/2011 | Marini |
| 2011/0243748 A1 | 10/2011 | Tsifourdaris |
| 2011/0262279 A1 | 10/2011 | Marini et al. |
| 2014/0010632 A1* | 1/2014 | Spangler et al. .............. 415/115 |
| 2014/0219817 A1* | 8/2014 | Papple et al. ................ 416/97 R |

\* cited by examiner

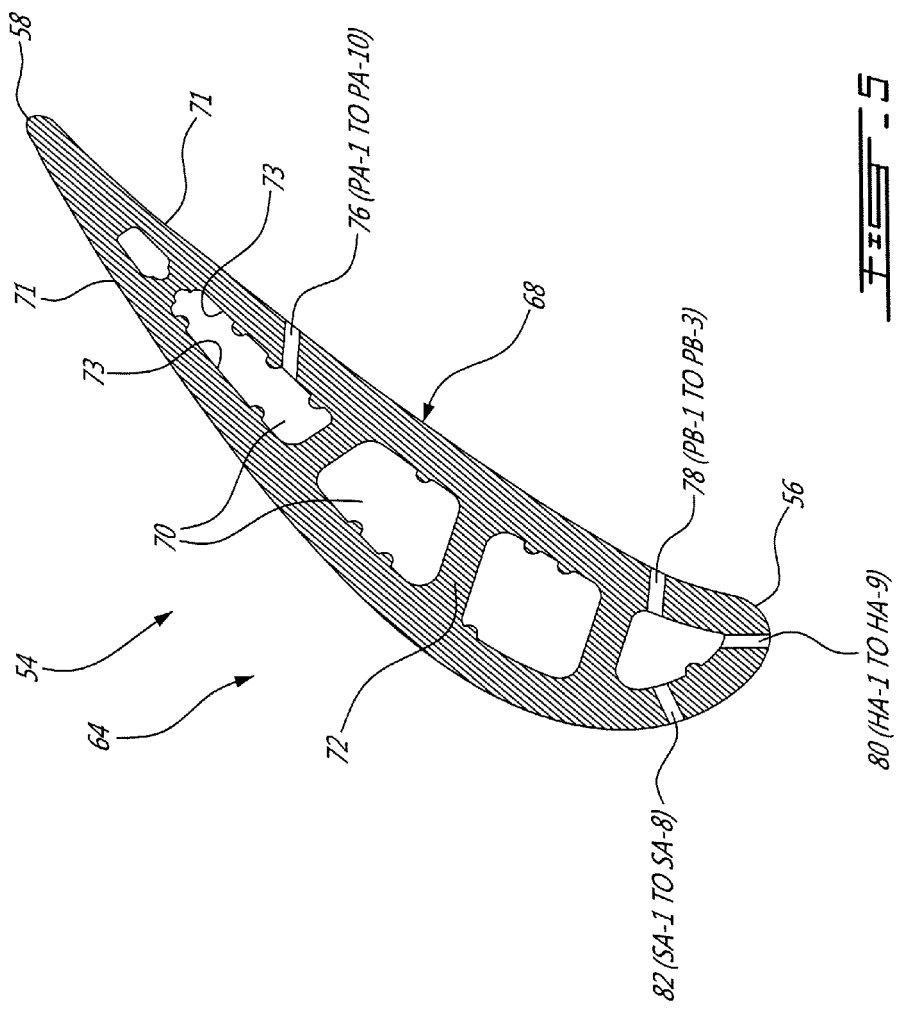

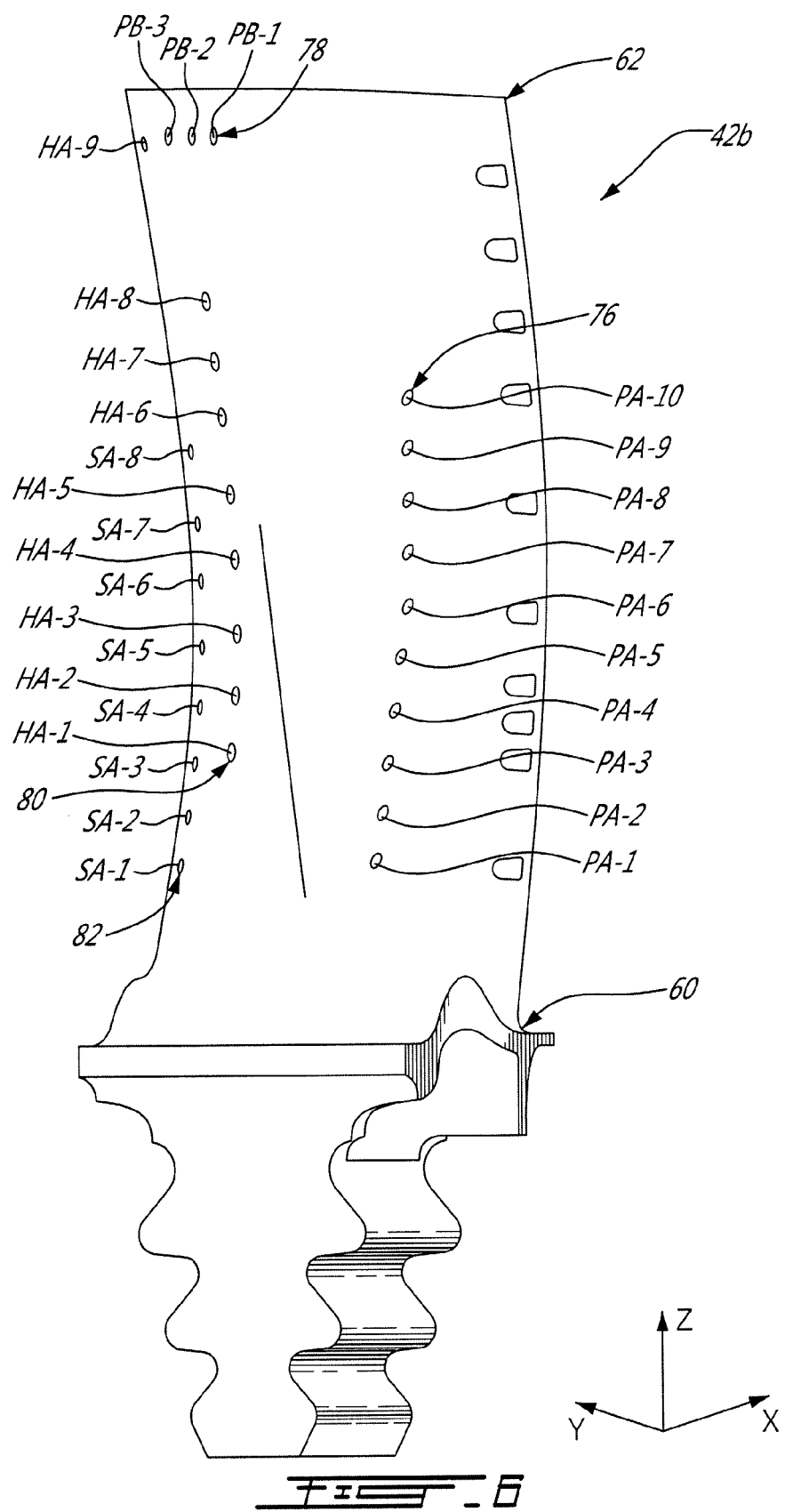

HIGH PRESSURE TURBINE BLADE COOLING HOLE DISTRIBUTION

TECHNICAL FIELD

The application relates generally to a blade airfoil for a gas turbine engine and, more particularly, to a cooling hole distribution suited for use in the second stage blade assembly of a high pressure (HP) turbine.

BACKGROUND OF THE ART

Every stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. The high pressure turbine is subject to elevated temperatures and pressures, and as such adequate cooling must be provided to the elements of the high pressure turbine, including the turbine blades.

SUMMARY

In one aspect, there is provided a turbine blade for a gas turbine engine comprising an airfoil portion defined by a perimeter wall surrounding at least one enclosure, the perimeter wall having a plurality of cooling holes defined therethrough and providing fluid communication between the at least one enclosure and a gaspath of the gas turbine engine, the plurality of cooling holes including at least one row of holes selected from the group consisting of a first row, a second row, a third row and a fourth row, with the first row extending at least substantially radially and closer to a trailing edge than to a leading edge of the airfoil portion, the second row extending at least approximately axially near a tip of the blade and near the leading edge, the third and fourth rows extending at least substantially radially adjacent the leading edge, and the first, second, third and fourth rows of holes respectively including the holes numbered PA-1 to PA-10, PB-1 to PB-3, HA-1 to HA-9, and SA-1 to SA-8 located such that a central axis thereof extends through the respective point 1 and point 2 having a nominal location in accordance with the X, Y, Z Cartesian coordinate values set forth in Table 3, wherein the point of origin of the X, Y, Z Cartesian system is located at an intersection of a centerline of the gas turbine engine and a stacking line of the turbine blade, the X axis being angled with respect to a turbine rotor centerline by an angle corresponding to a restagger of the blade with a positive direction thereof being oriented towards aft of the engine and the Z axis extending generally radially along the stacking line with a positive direction thereof being oriented toward the tip of the blade.

In another aspect, there is provided a turbine rotor assembly for a gas turbine engine comprising a blade having an airfoil portion defined by a perimeter wall enclosing at least one cooling cavity, the perimeter wall having a plurality of cooling holes defined therethrough and providing fluid communication between the at least one cooling cavity and a gaspath of the gas turbine engine, the plurality of cooling holes including at least one row of holes selected from the group consisting of a first row, a second row, a third row and a fourth row, with the first row being defined closer to a trailing edge than to a leading edge of the airfoil portion, and the second, third and fourth rows being defined along or in proximity of the leading edge, the first, second, third and fourth rows of holes respectively including the holes numbered PA-1 to PA-10, PB-1 to PB-3, HA-1 to HA-9, and SA-1 to SA-8, located such that a central axis thereof extends through the respective point 1 and point 2 having a nominal location in accordance with the X, Y, Z Cartesian coordinate values set forth in Table 3, wherein the point of origin of X, Y, Z Cartesian system is located at an intersection of a centerline of the gas turbine engine and a stacking line of the turbine blade, the X axis being angled with respect to a turbine rotor centerline by an angle corresponding to a restagger of the blade with a positive direction thereof being oriented towards aft of the engine and the Z axis extending generally radially along the stacking line with a positive direction thereof being oriented toward a tip of the blade.

In a further aspect, there is provided a high pressure turbine blade comprising an airfoil having a perimeter wall surrounding at least one cooling cavity, the perimeter wall having an outer surface lying substantially on the points of Table 2, the perimeter wall having a plurality of cooling holes defined therethrough in fluid communication with the at least one cooling cavity, the plurality of cooling holes including at least one row of holes selected from the group consisting of a first row, a second row, a third row and a fourth row, with the first, second, third and fourth rows of holes respectively including the holes numbered PA-1 to PA-10, PB-1 to PB-3, HA-1 to HA-9, and SA-1 to SA-8, located such that a central axis thereof extends through the respective point 1 and point 2 having a nominal location in accordance with the X, Y, Z Cartesian coordinate values set forth in Table 3, wherein the point of origin of X, Y, Z Cartesian system is located at an intersection of a centerline of the gas turbine engine and a stacking line of the turbine blade, the X axis being angled with respect to a turbine rotor centerline by an angle corresponding to a restagger of the blade with a positive direction thereof being oriented towards aft of the engine and the Z axis extending generally radially along the stacking line with a positive direction thereof being oriented toward a tip of the blade.

DESCRIPTION OF THE DRAWINGS

Reference is now made to the accompanying figures in which:

FIG. 5 is a schematic cross-sectional view of a HPT stage blade such as shown in FIG. 3 having cooling holes defined in accordance with a particular embodiment; and FIG. 6 is a schematic front tridimensional view of the blade of FIG. 5, provided at an angle with respect to the blade coordinate system.

DETAILED DESCRIPTION

Figure 1:
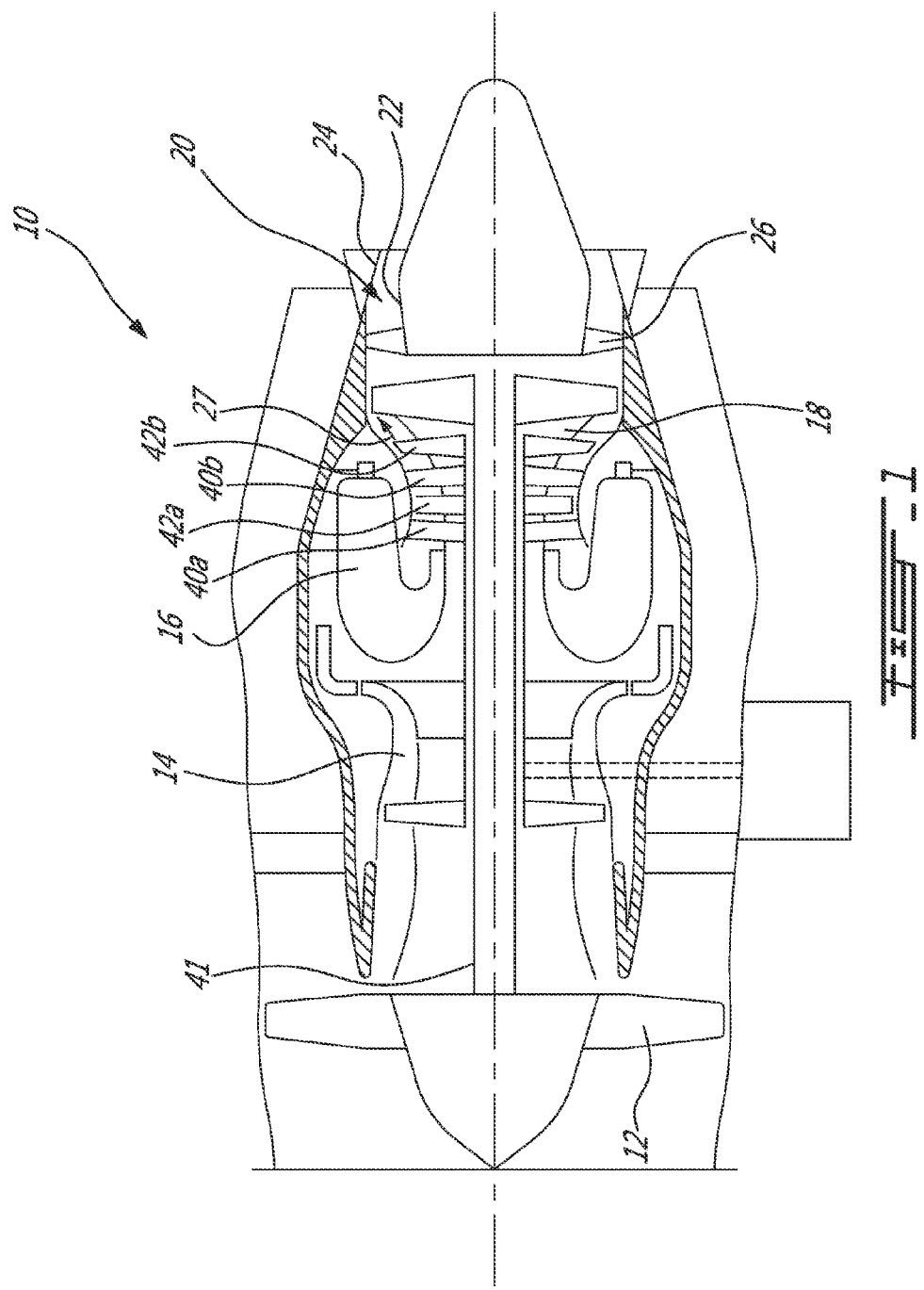
FIG. 1 is a schematic view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases to drive the fan, the compressor, and produce thrust.

The gas turbine engine 10 further includes a turbine exhaust duct 20 which is exemplified as including an annular core portion 22 and an annular outer portion 24 and a plurality of struts 26 circumferentially spaced apart, and radially extending between the inner and outer portions 22, 24.

Figure 2:
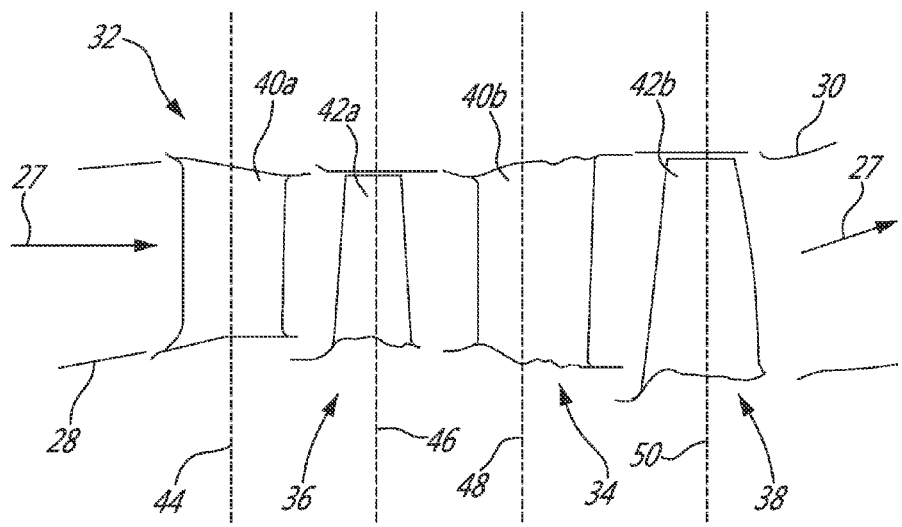
FIG. 2 is a schematic view of a gaspath of the gas turbine engine of FIG. 1, including a two-stage high pressure turbine.

FIG. 2 illustrates a portion of an annular hot gaspath, indicated by arrows 27 and defined by annular inner and outer walls 28 and 30 respectively, for directing the stream of hot combustion gases axially in an annular flow. The profile of the inner and outer walls 28 and 30 of the annular gaspath, "cold" (i.e. non-operating) conditions, is defined by the Cartesian coordinate values such as the ones given in Table 1 below with reference to a gas path coordinate system x, y, z. More particularly, the inner and outer gaspath walls 28 and 30 are defined with respect to mutually orthogonal x and z axes, as shown in FIG. 2. The x axis corresponds to the engine turbine rotor centerline 29. The radial distance of the inner and outer walls 28 and 30 from the engine turbine rotor centerline and, thus, from the x axis at specific axial locations is measured along the z axis. The z values provide the inner and outer radius of the gas path at various axial locations therealong. The x and z coordinate values in Table 1 are distances given in inches from the point of origin O (see FIG. 2). It is understood that other units of dimensions may be used. The x and z values have in average a manufacturing tolerance of about ±0.030 in. The tolerance may account for such things as casting, coating, ceramic coating and/or other tolerances. It is also understood that the manufacturing tolerances of the gas path may vary along the length thereof.

The turbine section 18 has two high pressure turbine (HPT) stages located in the gaspath 27 downstream of the combustor 16. Referring to FIG. 2, the HPT stages each comprise a stator assembly 32, 34 and a rotor assembly 36, 38 having a plurality of circumferentially arranged vane 40a, 40b and blades 42a, 42b respectively. The vanes 40a,b and blades 42a,b are mounted in position along respective stacking lines 44, 46, 48 and 50, as identified in FIG. 2. The stacking lines 44, 46, 48 and 50 extend in the radial direction along the z axis at different axial locations. The stacking lines 44, 46, 48 and 50 define the axial location where the blades and vanes of each stage are mounted in the engine 10. More specifically, stacking line 44 located at x=0 corresponds to the first stage HPT vane 40a. The stacking line 50 of the second stage HP turbine blade 42b is located at x=4.433 inches.

Table 1 provides cold coated gaspath definition from upstream to downstream of the second stage HP blade airfoil 42b in the gas path coordinate system.

TABLE 1

| COLD COATED GASPATH DEFINITION | | | |
|---|---|---|---|
| INNER GASPATH | | OUTER GASPATH | |
| x | z | x | z |
| 2.894 | 6.320 | 2.749 | 8.055 |
| 2.948 | 6.296 | 2.998 | 8.055 |
| 3.185 | 6.262 | 3.238 | 8.105 |
| 3.434 | 6.246 | 3.483 | 8.124 |
| 3.686 | 6.246 | 3.735 | 8.127 |
| 3.812 | 5.998 | 3.771 | 8.152 |
| 3.855 | 6.037 | 3.921 | 8.152 |
| 3.980 | 6.204 | 4.070 | 8.152 |

TABLE 1-continued

| COLD COATED GASPATH DEFINITION | | | |
|---|---|---|---|
| INNER GASPATH | | OUTER GASPATH | |
| x | z | x | z |
| 4.174 | 6.223 | 4.219 | 8.152 |
| 4.378 | 6.184 | 4.368 | 8.152 |
| 4.587 | 6.178 | 4.518 | 8.152 |
| 4.794 | 6.144 | 4.667 | 8.152 |
| 4.994 | 6.191 | 4.816 | 8.152 |
| 5.313 | 6.157 | 5.070 | 8.149 |
| 5.769 | 6.244 | 5.386 | 8.200 |
| 6.236 | 6.296 | 5.688 | 8.305 |

Figure 3:
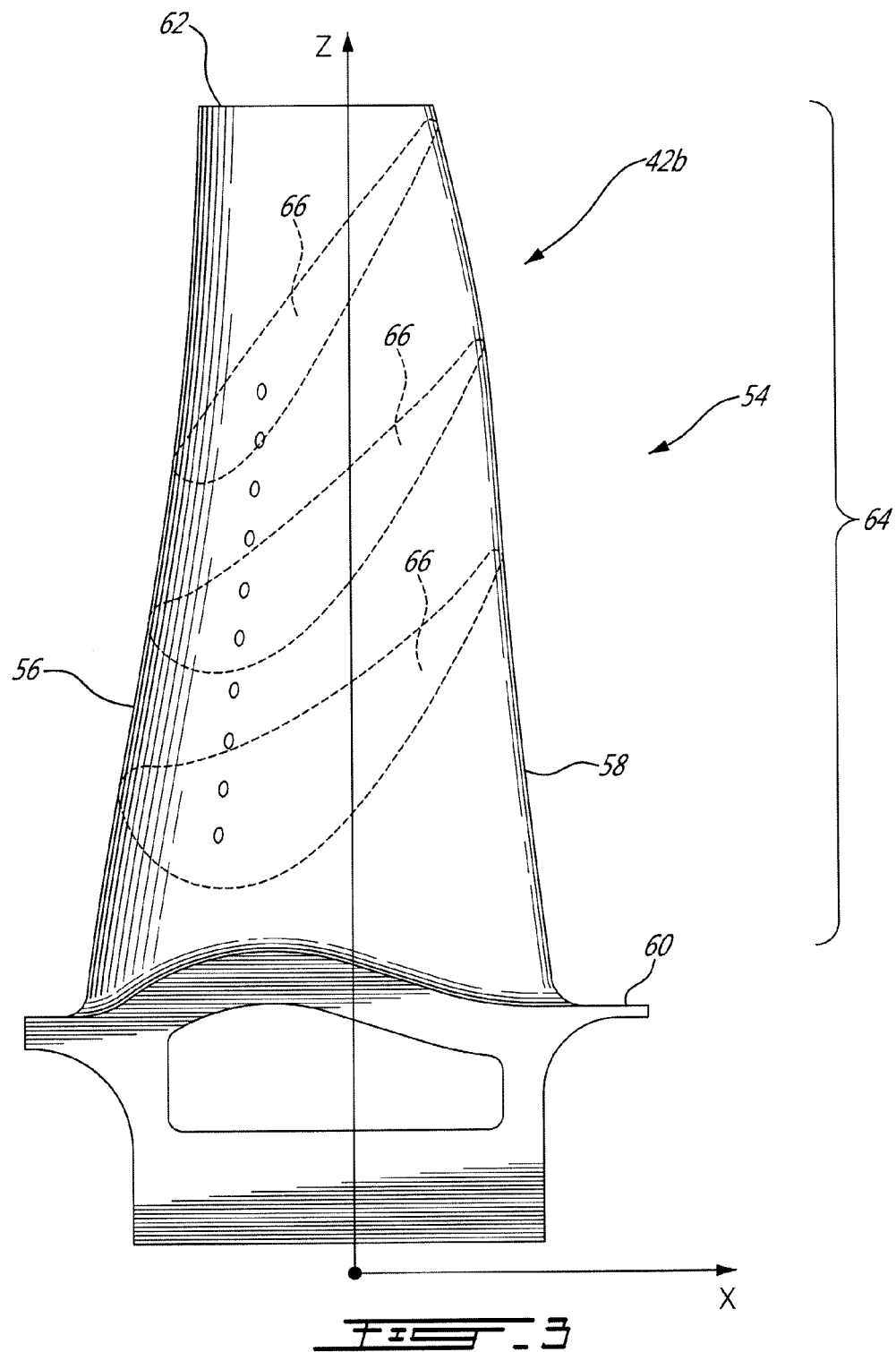
FIG. 3 is a schematic view of a high pressure turbine (HPT) stage blade having a profile defined in accordance with a particular embodiment.

More specifically, the rotor assemblies 36, 38 each include a plurality of circumferentially distributed blades 42a and 42b respectively which extend radially across the hot gaspath 27. FIG. 3 shows an example of a blade 42b of the second HPT stage. It can be seen that each blade 42b has an airfoil 54 having a leading edge 56 and a trailing edge 58, extending from an inner platform 60 to a tip 62.

The novel airfoil shape of each second stage HPT blade 42b is defined by a set of X-Y-Z points in space. This set of points represents a novel and unique solution to the target design criteria discussed above, and are well-adapted for use in a two-stage high pressure turbine design. This blade design provides the following features: tip vortex control; reduced airfoil count for high lift design; and non-axisymmetric endwall contouring. The set of points are defined in a blade Cartesian coordinate system which has mutually orthogonal X, Y and Z axes. The X axis extends axially along the turbine rotor centerline 29, i.e., the rotary axis, when the blade is at nominal restagger. The positive X direction is axially towards the aft of the turbine engine 10. The Z axis extends along the HPT blade stacking line 50 of each respective blade 42b in a generally radial direction and intersects the X axis. The positive Z direction is radially outwardly toward the tip 62 of the blade. The Y axis extends tangentially with the positive Y direction being in the direction of rotation of the rotor assembly 38. Therefore, the origin of the blade X, Y and Z axes is defined at the point of intersection of all three orthogonally-related axes: that is the point (0,0,0) at the intersection of the center of rotation of the turbine engine 10 and the stacking line 50.

In a particular embodiment of the second stage HPT blade, the set of points which define the blade airfoil profile relative to the axis of rotation of the turbine engine 10 and stacking line 50 thereof (i.e. relative to the blade coordinate system) are set out in Table 2 below as X, Y and Z Cartesian coordinate values. Particularly, the blade airfoil profile is defined by profile sections 66 at various locations along its height, the locations represented by Z values. For example, if the blades 42b are mounted about the rotor assembly 38 at an angle with respect to the radial direction, then the Z values are not a true representation of the height of the airfoils of the blades 42b. Furthermore, it is to be appreciated that, with respect to Table 2, Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 66 are defined at selected locations in a Z direction normal to the X, Y plane. The X and Y coordinates are given in distance dimensions, e.g., units of inches, and are joined smoothly, using appropriate curve-fitting techniques, at each Z location to form a smooth continuous airfoil cross-section. The blade airfoil profiles of the various surface locations between the distances Z are determined by smoothly connecting the adjacent profile sections 66 to one another to form the airfoil profile.

The coordinate values listed in Table 2 below represent the desired airfoil profiles in a "cold" non-operating coated condition with, as mentioned above, the X axis corresponding to the turbine rotor centerline 29 for a blade at nominal stagger, the X axis being angled with respect to the turbine rotor centerline 29 for a restaggered blade by an angle corresponding to the restagger. However, the manufactured airfoil surface profile will be slightly different, as a result of manufacturing and applied coating tolerances. According to an embodiment of the present invention, the finished HPT blade is coated with a thermal protecting layer.

The Table 2 values are generated and shown to three decimal places for determining the profile of the HPT stage blade airfoil. However, as mentioned above, there are manufacturing tolerance issues to be addressed and, accordingly, the values for the profile given in Table 2 are for a theoretical airfoil. A profile tolerance of ±0.015 inches, measured perpendicularly to the airfoil surface is additive to the nominal values given in Table 2 below. The second stage HPT blade airfoil design functions well within these ranges of variation. The cold or room temperature profile (including coating) is given by the X, Y and Z coordinates for manufacturing purposes. It is understood that the airfoil may deform, within acceptable limits, once entering service.

The coordinate values given in Table 2 below provide the preferred nominal second stage HPT blade airfoil profile in the blade coordinate system.

TABLE 2

|  | X | Y | Z |
|---|---|---|---|
| SECTION 1 | −0.583 | 0.022 | 6.016 |
|  | −0.584 | 0.027 | 6.016 |
|  | −0.584 | 0.031 | 6.016 |
|  | −0.584 | 0.036 | 6.016 |
|  | −0.584 | 0.040 | 6.016 |
|  | −0.584 | 0.045 | 6.016 |
|  | −0.585 | 0.049 | 6.016 |
|  | −0.585 | 0.054 | 6.016 |
|  | −0.585 | 0.058 | 6.016 |
|  | −0.585 | 0.063 | 6.016 |
|  | −0.585 | 0.067 | 6.016 |
|  | −0.584 | 0.090 | 6.016 |
|  | −0.582 | 0.112 | 6.016 |
|  | −0.580 | 0.135 | 6.016 |
|  | −0.576 | 0.157 | 6.016 |
|  | −0.571 | 0.179 | 6.016 |
|  | −0.565 | 0.201 | 6.016 |
|  | −0.558 | 0.222 | 6.016 |
|  | −0.551 | 0.243 | 6.016 |
|  | −0.542 | 0.264 | 6.016 |
|  | −0.532 | 0.284 | 6.016 |
|  | −0.521 | 0.304 | 6.016 |
|  | −0.508 | 0.323 | 6.016 |
|  | −0.495 | 0.341 | 6.016 |
|  | −0.480 | 0.358 | 6.016 |
|  | −0.464 | 0.373 | 6.016 |
|  | −0.447 | 0.388 | 6.016 |
|  | −0.428 | 0.401 | 6.016 |
|  | −0.409 | 0.412 | 6.016 |
|  | −0.389 | 0.422 | 6.016 |
|  | −0.367 | 0.430 | 6.016 |
|  | −0.346 | 0.436 | 6.016 |
|  | −0.324 | 0.440 | 6.016 |
|  | −0.301 | 0.442 | 6.016 |

TABLE 2-continued

| X | Y | Z |
|---|---|---|
| −0.279 | 0.443 | 6.016 |
| −0.256 | 0.441 | 6.016 |
| −0.234 | 0.438 | 6.016 |
| −0.212 | 0.433 | 6.016 |
| −0.190 | 0.426 | 6.016 |
| −0.169 | 0.419 | 6.016 |
| −0.149 | 0.409 | 6.016 |
| −0.129 | 0.399 | 6.016 |
| −0.109 | 0.388 | 6.016 |
| −0.090 | 0.375 | 6.016 |
| −0.072 | 0.362 | 6.016 |
| −0.054 | 0.349 | 6.016 |
| −0.036 | 0.335 | 6.016 |
| −0.019 | 0.320 | 6.016 |
| −0.003 | 0.305 | 6.016 |
| 0.014 | 0.289 | 6.016 |
| 0.030 | 0.274 | 6.016 |
| 0.046 | 0.258 | 6.016 |
| 0.062 | 0.242 | 6.016 |
| 0.077 | 0.225 | 6.016 |
| 0.092 | 0.209 | 6.016 |
| 0.107 | 0.192 | 6.016 |
| 0.122 | 0.174 | 6.016 |
| 0.136 | 0.157 | 6.016 |
| 0.150 | 0.139 | 6.016 |
| 0.164 | 0.121 | 6.016 |
| 0.177 | 0.103 | 6.016 |
| 0.190 | 0.085 | 6.016 |
| 0.203 | 0.066 | 6.016 |
| 0.216 | 0.048 | 6.016 |
| 0.228 | 0.029 | 6.016 |
| 0.240 | 0.010 | 6.016 |
| 0.252 | −0.009 | 6.016 |
| 0.264 | −0.028 | 6.016 |
| 0.275 | −0.048 | 6.016 |
| 0.287 | −0.067 | 6.016 |
| 0.298 | −0.086 | 6.016 |
| 0.309 | −0.106 | 6.016 |
| 0.320 | −0.126 | 6.016 |
| 0.331 | −0.146 | 6.016 |
| 0.342 | −0.166 | 6.016 |
| 0.352 | −0.186 | 6.016 |
| 0.362 | −0.205 | 6.016 |
| 0.373 | −0.226 | 6.016 |
| 0.383 | −0.246 | 6.016 |
| 0.393 | −0.266 | 6.016 |
| 0.403 | −0.286 | 6.016 |
| 0.413 | −0.306 | 6.016 |
| 0.423 | −0.326 | 6.016 |
| 0.433 | −0.347 | 6.016 |
| 0.442 | −0.367 | 6.016 |
| 0.452 | −0.388 | 6.016 |
| 0.461 | −0.408 | 6.016 |
| 0.469 | −0.429 | 6.016 |
| 0.478 | −0.450 | 6.016 |
| 0.486 | −0.471 | 6.016 |
| 0.488 | −0.475 | 6.016 |
| 0.490 | −0.479 | 6.016 |
| 0.491 | −0.483 | 6.016 |
| 0.493 | −0.487 | 6.016 |
| 0.495 | −0.492 | 6.016 |
| 0.497 | −0.496 | 6.016 |
| 0.499 | −0.500 | 6.016 |
| 0.500 | −0.504 | 6.016 |
| 0.501 | −0.508 | 6.016 |
| 0.503 | −0.513 | 6.016 |
| 0.504 | −0.516 | 6.016 |
| 0.505 | −0.519 | 6.016 |
| 0.505 | −0.522 | 6.016 |
| 0.505 | −0.525 | 6.016 |
| 0.504 | −0.528 | 6.016 |
| 0.503 | −0.531 | 6.016 |
| 0.501 | −0.534 | 6.016 |
| 0.499 | −0.536 | 6.016 |
| 0.496 | −0.538 | 6.016 |
| 0.493 | −0.540 | 6.016 |
| 0.490 | −0.541 | 6.016 |
| 0.487 | −0.541 | 6.016 |

TABLE 2-continued

| X | Y | Z |
|---|---|---|
| 0.484 | −0.541 | 6.016 |
| 0.480 | −0.541 | 6.016 |
| 0.477 | −0.541 | 6.016 |
| 0.474 | −0.540 | 6.016 |
| 0.472 | −0.538 | 6.016 |
| 0.469 | −0.535 | 6.016 |
| 0.468 | −0.533 | 6.016 |
| 0.466 | −0.530 | 6.016 |
| 0.465 | −0.528 | 6.016 |
| 0.463 | −0.526 | 6.016 |
| 0.462 | −0.524 | 6.016 |
| 0.460 | −0.521 | 6.016 |
| 0.459 | −0.519 | 6.016 |
| 0.457 | −0.517 | 6.016 |
| 0.456 | −0.515 | 6.016 |
| 0.454 | −0.512 | 6.016 |
| 0.452 | −0.510 | 6.016 |
| 0.445 | −0.499 | 6.016 |
| 0.436 | −0.488 | 6.016 |
| 0.428 | −0.477 | 6.016 |
| 0.419 | −0.467 | 6.016 |
| 0.411 | −0.456 | 6.016 |
| 0.402 | −0.446 | 6.016 |
| 0.393 | −0.436 | 6.016 |
| 0.383 | −0.426 | 6.016 |
| 0.374 | −0.416 | 6.016 |
| 0.364 | −0.406 | 6.016 |
| 0.355 | −0.396 | 6.016 |
| 0.345 | −0.387 | 6.016 |
| 0.335 | −0.378 | 6.016 |
| 0.324 | −0.369 | 6.016 |
| 0.314 | −0.360 | 6.016 |
| 0.303 | −0.352 | 6.016 |
| 0.293 | −0.343 | 6.016 |
| 0.282 | −0.335 | 6.016 |
| 0.271 | −0.326 | 6.016 |
| 0.260 | −0.318 | 6.016 |
| 0.249 | −0.310 | 6.016 |
| 0.239 | −0.301 | 6.016 |
| 0.228 | −0.293 | 6.016 |
| 0.217 | −0.285 | 6.016 |
| 0.206 | −0.277 | 6.016 |
| 0.195 | −0.269 | 6.016 |
| 0.183 | −0.261 | 6.016 |
| 0.172 | −0.254 | 6.016 |
| 0.161 | −0.246 | 6.016 |
| 0.149 | −0.239 | 6.016 |
| 0.138 | −0.231 | 6.016 |
| 0.126 | −0.224 | 6.016 |
| 0.115 | −0.217 | 6.016 |
| 0.103 | −0.210 | 6.016 |
| 0.091 | −0.203 | 6.016 |
| 0.079 | −0.196 | 6.016 |
| 0.068 | −0.189 | 6.016 |
| 0.056 | −0.183 | 6.016 |
| 0.044 | −0.176 | 6.016 |
| 0.032 | −0.170 | 6.016 |
| 0.019 | −0.163 | 6.016 |
| 0.007 | −0.157 | 6.016 |
| −0.005 | −0.151 | 6.016 |
| −0.017 | −0.145 | 6.016 |
| −0.029 | −0.139 | 6.016 |
| −0.042 | −0.133 | 6.016 |
| −0.054 | −0.127 | 6.016 |
| −0.067 | −0.122 | 6.016 |
| −0.079 | −0.117 | 6.016 |
| −0.092 | −0.111 | 6.016 |
| −0.104 | −0.106 | 6.016 |
| −0.117 | −0.101 | 6.016 |
| −0.130 | −0.096 | 6.016 |
| −0.142 | −0.091 | 6.016 |
| −0.155 | −0.086 | 6.016 |
| −0.168 | −0.082 | 6.016 |
| −0.181 | −0.077 | 6.016 |
| −0.194 | −0.073 | 6.016 |
| −0.207 | −0.069 | 6.016 |
| −0.220 | −0.065 | 6.016 |
| −0.233 | −0.061 | 6.016 |
| −0.246 | −0.058 | 6.016 |
| −0.260 | −0.054 | 6.016 |
| −0.273 | −0.051 | 6.016 |
| −0.286 | −0.048 | 6.016 |
| −0.300 | −0.046 | 6.016 |
| −0.313 | −0.043 | 6.016 |
| −0.326 | −0.040 | 6.016 |
| −0.340 | −0.038 | 6.016 |
| −0.353 | −0.036 | 6.016 |
| −0.367 | −0.034 | 6.016 |
| −0.380 | −0.032 | 6.016 |
| −0.394 | −0.031 | 6.016 |
| −0.408 | −0.030 | 6.016 |
| −0.421 | −0.030 | 6.016 |
| −0.435 | −0.031 | 6.016 |
| −0.448 | −0.031 | 6.016 |
| −0.462 | −0.033 | 6.016 |
| −0.476 | −0.034 | 6.016 |
| −0.478 | −0.034 | 6.016 |
| −0.481 | −0.034 | 6.016 |
| −0.484 | −0.034 | 6.016 |
| −0.487 | −0.035 | 6.016 |
| −0.489 | −0.035 | 6.016 |
| −0.492 | −0.035 | 6.016 |
| −0.495 | −0.035 | 6.016 |
| −0.497 | −0.035 | 6.016 |
| −0.500 | −0.036 | 6.016 |
| −0.503 | −0.036 | 6.016 |
| −0.509 | −0.036 | 6.016 |
| −0.515 | −0.037 | 6.016 |
| −0.521 | −0.037 | 6.016 |
| −0.527 | −0.037 | 6.016 |
| −0.533 | −0.036 | 6.016 |
| −0.539 | −0.035 | 6.016 |
| −0.545 | −0.034 | 6.016 |
| −0.551 | −0.032 | 6.016 |
| −0.556 | −0.029 | 6.016 |
| −0.561 | −0.026 | 6.016 |
| −0.566 | −0.022 | 6.016 |
| −0.570 | −0.017 | 6.016 |
| −0.573 | −0.012 | 6.016 |
| −0.576 | −0.007 | 6.016 |
| −0.579 | −0.001 | 6.016 |
| −0.580 | 0.004 | 6.016 |
| −0.582 | 0.010 | 6.016 |
| −0.583 | 0.016 | 6.016 |

SECTION 2

| X | Y | Z |
|---|---|---|
| −0.563 | 0.050 | 6.160 |
| −0.563 | 0.054 | 6.160 |
| −0.563 | 0.059 | 6.160 |
| −0.563 | 0.063 | 6.160 |
| −0.563 | 0.067 | 6.160 |
| −0.562 | 0.071 | 6.160 |
| −0.562 | 0.076 | 6.160 |
| −0.562 | 0.080 | 6.160 |
| −0.562 | 0.084 | 6.160 |
| −0.561 | 0.088 | 6.160 |
| −0.561 | 0.093 | 6.160 |
| −0.558 | 0.114 | 6.160 |
| −0.554 | 0.135 | 6.160 |
| −0.549 | 0.156 | 6.160 |
| −0.543 | 0.176 | 6.160 |
| −0.537 | 0.196 | 6.160 |
| −0.529 | 0.216 | 6.160 |
| −0.520 | 0.236 | 6.160 |
| −0.510 | 0.255 | 6.160 |
| −0.499 | 0.273 | 6.160 |
| −0.487 | 0.290 | 6.160 |
| −0.474 | 0.307 | 6.160 |
| −0.460 | 0.323 | 6.160 |
| −0.445 | 0.338 | 6.160 |
| −0.428 | 0.352 | 6.160 |
| −0.411 | 0.365 | 6.160 |
| −0.393 | 0.376 | 6.160 |
| −0.374 | 0.386 | 6.160 |
| −0.354 | 0.394 | 6.160 |
| −0.334 | 0.400 | 6.160 |
| −0.313 | 0.405 | 6.160 |
| −0.292 | 0.408 | 6.160 |

TABLE 2-continued

| X | Y | Z |
|---|---|---|
| −0.271 | 0.410 | 6.160 |
| −0.249 | 0.409 | 6.160 |
| −0.228 | 0.407 | 6.160 |
| −0.207 | 0.404 | 6.160 |
| −0.186 | 0.399 | 6.160 |
| −0.166 | 0.392 | 6.160 |
| −0.146 | 0.384 | 6.160 |
| −0.127 | 0.375 | 6.160 |
| −0.108 | 0.365 | 6.160 |
| −0.089 | 0.354 | 6.160 |
| −0.072 | 0.343 | 6.160 |
| −0.054 | 0.330 | 6.160 |
| −0.037 | 0.317 | 6.160 |
| −0.021 | 0.304 | 6.160 |
| −0.005 | 0.290 | 6.160 |
| 0.011 | 0.276 | 6.160 |
| 0.027 | 0.261 | 6.160 |
| 0.042 | 0.246 | 6.160 |
| 0.057 | 0.231 | 6.160 |
| 0.072 | 0.215 | 6.160 |
| 0.086 | 0.200 | 6.160 |
| 0.100 | 0.184 | 6.160 |
| 0.114 | 0.168 | 6.160 |
| 0.128 | 0.151 | 6.160 |
| 0.142 | 0.135 | 6.160 |
| 0.155 | 0.118 | 6.160 |
| 0.168 | 0.101 | 6.160 |
| 0.181 | 0.084 | 6.160 |
| 0.193 | 0.067 | 6.160 |
| 0.205 | 0.049 | 6.160 |
| 0.217 | 0.031 | 6.160 |
| 0.229 | 0.014 | 6.160 |
| 0.241 | −0.004 | 6.160 |
| 0.252 | −0.022 | 6.160 |
| 0.264 | −0.040 | 6.160 |
| 0.275 | −0.058 | 6.160 |
| 0.286 | −0.077 | 6.160 |
| 0.297 | −0.095 | 6.160 |
| 0.307 | −0.114 | 6.160 |
| 0.318 | −0.132 | 6.160 |
| 0.328 | −0.151 | 6.160 |
| 0.339 | −0.169 | 6.160 |
| 0.349 | −0.188 | 6.160 |
| 0.359 | −0.207 | 6.160 |
| 0.369 | −0.226 | 6.160 |
| 0.379 | −0.245 | 6.160 |
| 0.389 | −0.264 | 6.160 |
| 0.399 | −0.283 | 6.160 |
| 0.408 | −0.302 | 6.160 |
| 0.418 | −0.321 | 6.160 |
| 0.427 | −0.340 | 6.160 |
| 0.437 | −0.359 | 6.160 |
| 0.446 | −0.378 | 6.160 |
| 0.455 | −0.398 | 6.160 |
| 0.463 | −0.417 | 6.160 |
| 0.471 | −0.437 | 6.160 |
| 0.479 | −0.457 | 6.160 |
| 0.488 | −0.476 | 6.160 |
| 0.489 | −0.480 | 6.160 |
| 0.491 | −0.484 | 6.160 |
| 0.493 | −0.488 | 6.160 |
| 0.495 | −0.492 | 6.160 |
| 0.496 | −0.496 | 6.160 |
| 0.498 | −0.500 | 6.160 |
| 0.500 | −0.504 | 6.160 |
| 0.501 | −0.508 | 6.160 |
| 0.502 | −0.512 | 6.160 |
| 0.504 | −0.516 | 6.160 |
| 0.505 | −0.519 | 6.160 |
| 0.506 | −0.522 | 6.160 |
| 0.506 | −0.525 | 6.160 |
| 0.506 | −0.528 | 6.160 |
| 0.505 | −0.531 | 6.160 |
| 0.503 | −0.534 | 6.160 |
| 0.502 | −0.537 | 6.160 |
| 0.500 | −0.539 | 6.160 |
| 0.497 | −0.541 | 6.160 |
| 0.494 | −0.542 | 6.160 |
| 0.491 | −0.543 | 6.160 |
| 0.488 | −0.544 | 6.160 |
| 0.485 | −0.544 | 6.160 |
| 0.482 | −0.544 | 6.160 |
| 0.479 | −0.543 | 6.160 |
| 0.476 | −0.542 | 6.160 |
| 0.473 | −0.541 | 6.160 |
| 0.471 | −0.539 | 6.160 |
| 0.469 | −0.536 | 6.160 |
| 0.468 | −0.534 | 6.160 |
| 0.466 | −0.532 | 6.160 |
| 0.465 | −0.529 | 6.160 |
| 0.463 | −0.527 | 6.160 |
| 0.462 | −0.525 | 6.160 |
| 0.460 | −0.523 | 6.160 |
| 0.459 | −0.520 | 6.160 |
| 0.457 | −0.518 | 6.160 |
| 0.456 | −0.516 | 6.160 |
| 0.454 | −0.514 | 6.160 |
| 0.446 | −0.503 | 6.160 |
| 0.438 | −0.492 | 6.160 |
| 0.430 | −0.481 | 6.160 |
| 0.421 | −0.471 | 6.160 |
| 0.412 | −0.461 | 6.160 |
| 0.403 | −0.450 | 6.160 |
| 0.394 | −0.440 | 6.160 |
| 0.385 | −0.431 | 6.160 |
| 0.376 | −0.421 | 6.160 |
| 0.366 | −0.411 | 6.160 |
| 0.357 | −0.402 | 6.160 |
| 0.347 | −0.392 | 6.160 |
| 0.337 | −0.383 | 6.160 |
| 0.327 | −0.374 | 6.160 |
| 0.317 | −0.366 | 6.160 |
| 0.306 | −0.357 | 6.160 |
| 0.296 | −0.348 | 6.160 |
| 0.285 | −0.340 | 6.160 |
| 0.275 | −0.332 | 6.160 |
| 0.264 | −0.323 | 6.160 |
| 0.254 | −0.315 | 6.160 |
| 0.243 | −0.306 | 6.160 |
| 0.232 | −0.298 | 6.160 |
| 0.222 | −0.290 | 6.160 |
| 0.211 | −0.282 | 6.160 |
| 0.200 | −0.274 | 6.160 |
| 0.189 | −0.266 | 6.160 |
| 0.178 | −0.258 | 6.160 |
| 0.167 | −0.250 | 6.160 |
| 0.156 | −0.243 | 6.160 |
| 0.145 | −0.235 | 6.160 |
| 0.133 | −0.228 | 6.160 |
| 0.122 | −0.220 | 6.160 |
| 0.111 | −0.213 | 6.160 |
| 0.099 | −0.206 | 6.160 |
| 0.088 | −0.199 | 6.160 |
| 0.076 | −0.192 | 6.160 |
| 0.065 | −0.185 | 6.160 |
| 0.053 | −0.178 | 6.160 |
| 0.041 | −0.171 | 6.160 |
| 0.029 | −0.165 | 6.160 |
| 0.018 | −0.158 | 6.160 |
| 0.006 | −0.152 | 6.160 |
| −0.006 | −0.145 | 6.160 |
| −0.018 | −0.139 | 6.160 |
| −0.030 | −0.133 | 6.160 |
| −0.042 | −0.127 | 6.160 |
| −0.054 | −0.121 | 6.160 |
| −0.067 | −0.115 | 6.160 |
| −0.079 | −0.109 | 6.160 |
| −0.091 | −0.104 | 6.160 |
| −0.103 | −0.098 | 6.160 |
| −0.116 | −0.093 | 6.160 |
| −0.128 | −0.088 | 6.160 |
| −0.141 | −0.083 | 6.160 |
| −0.153 | −0.078 | 6.160 |
| −0.166 | −0.073 | 6.160 |
| −0.179 | −0.068 | 6.160 |
| −0.191 | −0.063 | 6.160 |

TABLE 2-continued

| | X | Y | Z |
|---|---|---|---|
| | −0.204 | −0.059 | 6.160 |
| | −0.217 | −0.055 | 6.160 |
| | −0.230 | −0.051 | 6.160 |
| | −0.243 | −0.047 | 6.160 |
| | −0.256 | −0.043 | 6.160 |
| | −0.269 | −0.039 | 6.160 |
| | −0.282 | −0.036 | 6.160 |
| | −0.295 | −0.033 | 6.160 |
| | −0.308 | −0.030 | 6.160 |
| | −0.321 | −0.027 | 6.160 |
| | −0.335 | −0.025 | 6.160 |
| | −0.348 | −0.022 | 6.160 |
| | −0.361 | −0.020 | 6.160 |
| | −0.375 | −0.019 | 6.160 |
| | −0.388 | −0.018 | 6.160 |
| | −0.402 | −0.017 | 6.160 |
| | −0.415 | −0.016 | 6.160 |
| | −0.429 | −0.016 | 6.160 |
| | −0.442 | −0.016 | 6.160 |
| | −0.456 | −0.017 | 6.160 |
| | −0.458 | −0.017 | 6.160 |
| | −0.461 | −0.017 | 6.160 |
| | −0.464 | −0.017 | 6.160 |
| | −0.466 | −0.018 | 6.160 |
| | −0.469 | −0.018 | 6.160 |
| | −0.472 | −0.018 | 6.160 |
| | −0.474 | −0.018 | 6.160 |
| | −0.477 | −0.018 | 6.160 |
| | −0.480 | −0.019 | 6.160 |
| | −0.482 | −0.019 | 6.160 |
| | −0.489 | −0.020 | 6.160 |
| | −0.496 | −0.020 | 6.160 |
| | −0.502 | −0.020 | 6.160 |
| | −0.509 | −0.020 | 6.160 |
| | −0.515 | −0.019 | 6.160 |
| | −0.522 | −0.018 | 6.160 |
| | −0.528 | −0.015 | 6.160 |
| | −0.534 | −0.012 | 6.160 |
| | −0.539 | −0.009 | 6.160 |
| | −0.544 | −0.004 | 6.160 |
| | −0.549 | 0.000 | 6.160 |
| | −0.553 | 0.006 | 6.160 |
| | −0.556 | 0.012 | 6.160 |
| | −0.558 | 0.018 | 6.160 |
| | −0.560 | 0.024 | 6.160 |
| | −0.562 | 0.030 | 6.160 |
| | −0.563 | 0.037 | 6.160 |
| | −0.563 | 0.044 | 6.160 |
| SECTION 3 | −0.537 | 0.088 | 6.352 |
| | −0.536 | 0.092 | 6.352 |
| | −0.536 | 0.096 | 6.352 |
| | −0.535 | 0.100 | 6.352 |
| | −0.534 | 0.104 | 6.352 |
| | −0.533 | 0.108 | 6.352 |
| | −0.533 | 0.111 | 6.352 |
| | −0.532 | 0.115 | 6.352 |
| | −0.531 | 0.119 | 6.352 |
| | −0.530 | 0.123 | 6.352 |
| | −0.529 | 0.127 | 6.352 |
| | −0.523 | 0.146 | 6.352 |
| | −0.517 | 0.165 | 6.352 |
| | −0.509 | 0.184 | 6.352 |
| | −0.501 | 0.202 | 6.352 |
| | −0.492 | 0.219 | 6.352 |
| | −0.481 | 0.236 | 6.352 |
| | −0.470 | 0.253 | 6.352 |
| | −0.458 | 0.269 | 6.352 |
| | −0.444 | 0.283 | 6.352 |
| | −0.430 | 0.298 | 6.352 |
| | −0.415 | 0.311 | 6.352 |
| | −0.399 | 0.323 | 6.352 |
| | −0.382 | 0.333 | 6.352 |
| | −0.365 | 0.343 | 6.352 |
| | −0.347 | 0.351 | 6.352 |
| | −0.328 | 0.358 | 6.352 |
| | −0.309 | 0.363 | 6.352 |
| | −0.289 | 0.367 | 6.352 |
| | −0.269 | 0.370 | 6.352 |

TABLE 2-continued

| X | Y | Z |
|---|---|---|
| −0.249 | 0.371 | 6.352 |
| −0.229 | 0.370 | 6.352 |
| −0.209 | 0.369 | 6.352 |
| −0.190 | 0.366 | 6.352 |
| −0.170 | 0.361 | 6.352 |
| −0.151 | 0.356 | 6.352 |
| −0.132 | 0.349 | 6.352 |
| −0.114 | 0.341 | 6.352 |
| −0.096 | 0.332 | 6.352 |
| −0.079 | 0.323 | 6.352 |
| −0.062 | 0.312 | 6.352 |
| −0.045 | 0.301 | 6.352 |
| −0.029 | 0.289 | 6.352 |
| −0.013 | 0.277 | 6.352 |
| 0.002 | 0.264 | 6.352 |
| 0.017 | 0.251 | 6.352 |
| 0.032 | 0.237 | 6.352 |
| 0.046 | 0.223 | 6.352 |
| 0.060 | 0.209 | 6.352 |
| 0.074 | 0.195 | 6.352 |
| 0.087 | 0.180 | 6.352 |
| 0.101 | 0.165 | 6.352 |
| 0.114 | 0.150 | 6.352 |
| 0.127 | 0.135 | 6.352 |
| 0.139 | 0.119 | 6.352 |
| 0.152 | 0.103 | 6.352 |
| 0.164 | 0.088 | 6.352 |
| 0.176 | 0.072 | 6.352 |
| 0.188 | 0.056 | 6.352 |
| 0.199 | 0.039 | 6.352 |
| 0.211 | 0.023 | 6.352 |
| 0.222 | 0.007 | 6.352 |
| 0.233 | −0.010 | 6.352 |
| 0.244 | −0.027 | 6.352 |
| 0.255 | −0.043 | 6.352 |
| 0.266 | −0.060 | 6.352 |
| 0.277 | −0.077 | 6.352 |
| 0.287 | −0.094 | 6.352 |
| 0.298 | −0.111 | 6.352 |
| 0.308 | −0.128 | 6.352 |
| 0.318 | −0.145 | 6.352 |
| 0.328 | −0.163 | 6.352 |
| 0.338 | −0.180 | 6.352 |
| 0.348 | −0.197 | 6.352 |
| 0.358 | −0.215 | 6.352 |
| 0.367 | −0.232 | 6.352 |
| 0.377 | −0.250 | 6.352 |
| 0.386 | −0.267 | 6.352 |
| 0.396 | −0.285 | 6.352 |
| 0.405 | −0.302 | 6.352 |
| 0.414 | −0.320 | 6.352 |
| 0.423 | −0.338 | 6.352 |
| 0.433 | −0.356 | 6.352 |
| 0.441 | −0.374 | 6.352 |
| 0.450 | −0.392 | 6.352 |
| 0.458 | −0.410 | 6.352 |
| 0.466 | −0.428 | 6.352 |
| 0.474 | −0.447 | 6.352 |
| 0.482 | −0.465 | 6.352 |
| 0.490 | −0.483 | 6.352 |
| 0.491 | −0.487 | 6.352 |
| 0.493 | −0.491 | 6.352 |
| 0.494 | −0.494 | 6.352 |
| 0.496 | −0.498 | 6.352 |
| 0.498 | −0.501 | 6.352 |
| 0.499 | −0.505 | 6.352 |
| 0.501 | −0.509 | 6.352 |
| 0.502 | −0.513 | 6.352 |
| 0.503 | −0.516 | 6.352 |
| 0.505 | −0.520 | 6.352 |
| 0.506 | −0.523 | 6.352 |
| 0.507 | −0.526 | 6.352 |
| 0.507 | −0.529 | 6.352 |
| 0.507 | −0.532 | 6.352 |
| 0.506 | −0.535 | 6.352 |
| 0.505 | −0.538 | 6.352 |
| 0.503 | −0.540 | 6.352 |
| 0.501 | −0.542 | 6.352 |

TABLE 2-continued

| X | Y | Z |
|---|---|---|
| 0.498 | −0.544 | 6.352 |
| 0.496 | −0.546 | 6.352 |
| 0.493 | −0.547 | 6.352 |
| 0.490 | −0.548 | 6.352 |
| 0.487 | −0.548 | 6.352 |
| 0.484 | −0.548 | 6.352 |
| 0.481 | −0.547 | 6.352 |
| 0.478 | −0.546 | 6.352 |
| 0.475 | −0.545 | 6.352 |
| 0.473 | −0.543 | 6.352 |
| 0.471 | −0.541 | 6.352 |
| 0.469 | −0.538 | 6.352 |
| 0.468 | −0.536 | 6.352 |
| 0.466 | −0.534 | 6.352 |
| 0.465 | −0.532 | 6.352 |
| 0.463 | −0.530 | 6.352 |
| 0.461 | −0.528 | 6.352 |
| 0.460 | −0.525 | 6.352 |
| 0.458 | −0.523 | 6.352 |
| 0.457 | −0.521 | 6.352 |
| 0.455 | −0.519 | 6.352 |
| 0.447 | −0.508 | 6.352 |
| 0.439 | −0.498 | 6.352 |
| 0.430 | −0.488 | 6.352 |
| 0.422 | −0.477 | 6.352 |
| 0.413 | −0.467 | 6.352 |
| 0.404 | −0.457 | 6.352 |
| 0.395 | −0.447 | 6.352 |
| 0.386 | −0.437 | 6.352 |
| 0.377 | −0.427 | 6.352 |
| 0.368 | −0.418 | 6.352 |
| 0.359 | −0.408 | 6.352 |
| 0.350 | −0.399 | 6.352 |
| 0.340 | −0.389 | 6.352 |
| 0.330 | −0.380 | 6.352 |
| 0.320 | −0.372 | 6.352 |
| 0.310 | −0.363 | 6.352 |
| 0.300 | −0.354 | 6.352 |
| 0.289 | −0.346 | 6.352 |
| 0.279 | −0.337 | 6.352 |
| 0.269 | −0.329 | 6.352 |
| 0.258 | −0.321 | 6.352 |
| 0.248 | −0.312 | 6.352 |
| 0.238 | −0.304 | 6.352 |
| 0.227 | −0.295 | 6.352 |
| 0.217 | −0.287 | 6.352 |
| 0.206 | −0.279 | 6.352 |
| 0.196 | −0.270 | 6.352 |
| 0.185 | −0.262 | 6.352 |
| 0.174 | −0.254 | 6.352 |
| 0.164 | −0.247 | 6.352 |
| 0.153 | −0.239 | 6.352 |
| 0.142 | −0.231 | 6.352 |
| 0.131 | −0.223 | 6.352 |
| 0.120 | −0.216 | 6.352 |
| 0.109 | −0.208 | 6.352 |
| 0.098 | −0.201 | 6.352 |
| 0.087 | −0.193 | 6.352 |
| 0.076 | −0.186 | 6.352 |
| 0.064 | −0.179 | 6.352 |
| 0.053 | −0.172 | 6.352 |
| 0.042 | −0.165 | 6.352 |
| 0.030 | −0.158 | 6.352 |
| 0.019 | −0.151 | 6.352 |
| 0.007 | −0.144 | 6.352 |
| −0.004 | −0.137 | 6.352 |
| −0.016 | −0.131 | 6.352 |
| −0.027 | −0.124 | 6.352 |
| −0.039 | −0.118 | 6.352 |
| −0.051 | −0.111 | 6.352 |
| −0.063 | −0.105 | 6.352 |
| −0.074 | −0.099 | 6.352 |
| −0.086 | −0.093 | 6.352 |
| −0.098 | −0.087 | 6.352 |
| −0.110 | −0.081 | 6.352 |
| −0.122 | −0.076 | 6.352 |
| −0.135 | −0.070 | 6.352 |
| −0.147 | −0.065 | 6.352 |

TABLE 2-continued

| | X | Y | Z |
|---|---|---|---|
| | −0.159 | −0.059 | 6.352 |
| | −0.171 | −0.054 | 6.352 |
| | −0.184 | −0.049 | 6.352 |
| | −0.196 | −0.044 | 6.352 |
| | −0.209 | −0.039 | 6.352 |
| | −0.221 | −0.035 | 6.352 |
| | −0.234 | −0.030 | 6.352 |
| | −0.246 | −0.026 | 6.352 |
| | −0.259 | −0.022 | 6.352 |
| | −0.272 | −0.018 | 6.352 |
| | −0.285 | −0.015 | 6.352 |
| | −0.298 | −0.011 | 6.352 |
| | −0.311 | −0.008 | 6.352 |
| | −0.324 | −0.005 | 6.352 |
| | −0.337 | −0.002 | 6.352 |
| | −0.350 | 0.000 | 6.352 |
| | −0.363 | 0.002 | 6.352 |
| | −0.376 | 0.004 | 6.352 |
| | −0.390 | 0.005 | 6.352 |
| | −0.403 | 0.006 | 6.352 |
| | −0.416 | 0.006 | 6.352 |
| | −0.430 | 0.006 | 6.352 |
| | −0.432 | 0.006 | 6.352 |
| | −0.435 | 0.006 | 6.352 |
| | −0.438 | 0.006 | 6.352 |
| | −0.440 | 0.006 | 6.352 |
| | −0.443 | 0.005 | 6.352 |
| | −0.446 | 0.005 | 6.352 |
| | −0.448 | 0.005 | 6.352 |
| | −0.451 | 0.005 | 6.352 |
| | −0.454 | 0.005 | 6.352 |
| | −0.456 | 0.004 | 6.352 |
| | −0.463 | 0.004 | 6.352 |
| | −0.471 | 0.004 | 6.352 |
| | −0.478 | 0.005 | 6.352 |
| | −0.485 | 0.006 | 6.352 |
| | −0.492 | 0.008 | 6.352 |
| | −0.498 | 0.010 | 6.352 |
| | −0.505 | 0.014 | 6.352 |
| | −0.511 | 0.018 | 6.352 |
| | −0.516 | 0.022 | 6.352 |
| | −0.521 | 0.027 | 6.352 |
| | −0.526 | 0.033 | 6.352 |
| | −0.529 | 0.039 | 6.352 |
| | −0.532 | 0.046 | 6.352 |
| | −0.535 | 0.052 | 6.352 |
| | −0.537 | 0.059 | 6.352 |
| | −0.538 | 0.066 | 6.352 |
| | −0.538 | 0.074 | 6.352 |
| | −0.538 | 0.081 | 6.352 |
| SECTION 4 | −0.519 | 0.115 | 6.487 |
| | −0.518 | 0.119 | 6.487 |
| | −0.517 | 0.123 | 6.487 |
| | −0.516 | 0.126 | 6.487 |
| | −0.515 | 0.130 | 6.487 |
| | −0.514 | 0.134 | 6.487 |
| | −0.513 | 0.137 | 6.487 |
| | −0.512 | 0.141 | 6.487 |
| | −0.510 | 0.145 | 6.487 |
| | −0.509 | 0.148 | 6.487 |
| | −0.508 | 0.152 | 6.487 |
| | −0.501 | 0.170 | 6.487 |
| | −0.493 | 0.187 | 6.487 |
| | −0.484 | 0.204 | 6.487 |
| | −0.474 | 0.220 | 6.487 |
| | −0.463 | 0.236 | 6.487 |
| | −0.451 | 0.251 | 6.487 |
| | −0.438 | 0.265 | 6.487 |
| | −0.424 | 0.278 | 6.487 |
| | −0.409 | 0.290 | 6.487 |
| | −0.394 | 0.302 | 6.487 |
| | −0.378 | 0.312 | 6.487 |
| | −0.361 | 0.321 | 6.487 |
| | −0.343 | 0.329 | 6.487 |
| | −0.325 | 0.335 | 6.487 |
| | −0.307 | 0.341 | 6.487 |
| | −0.288 | 0.345 | 6.487 |
| | −0.269 | 0.348 | 6.487 |

TABLE 2-continued

| X | Y | Z |
|---|---|---|
| −0.250 | 0.349 | 6.487 |
| −0.231 | 0.349 | 6.487 |
| −0.212 | 0.348 | 6.487 |
| −0.193 | 0.346 | 6.487 |
| −0.174 | 0.342 | 6.487 |
| −0.156 | 0.338 | 6.487 |
| −0.137 | 0.332 | 6.487 |
| −0.119 | 0.326 | 6.487 |
| −0.102 | 0.318 | 6.487 |
| −0.085 | 0.310 | 6.487 |
| −0.068 | 0.300 | 6.487 |
| −0.052 | 0.290 | 6.487 |
| −0.036 | 0.280 | 6.487 |
| −0.020 | 0.268 | 6.487 |
| −0.005 | 0.257 | 6.487 |
| 0.010 | 0.244 | 6.487 |
| 0.024 | 0.232 | 6.487 |
| 0.038 | 0.219 | 6.487 |
| 0.052 | 0.205 | 6.487 |
| 0.065 | 0.192 | 6.487 |
| 0.078 | 0.178 | 6.487 |
| 0.091 | 0.164 | 6.487 |
| 0.104 | 0.149 | 6.487 |
| 0.116 | 0.135 | 6.487 |
| 0.128 | 0.120 | 6.487 |
| 0.140 | 0.105 | 6.487 |
| 0.152 | 0.090 | 6.487 |
| 0.164 | 0.075 | 6.487 |
| 0.175 | 0.060 | 6.487 |
| 0.187 | 0.044 | 6.487 |
| 0.198 | 0.029 | 6.487 |
| 0.209 | 0.013 | 6.487 |
| 0.220 | −0.003 | 6.487 |
| 0.230 | −0.019 | 6.487 |
| 0.241 | −0.034 | 6.487 |
| 0.252 | −0.050 | 6.487 |
| 0.262 | −0.066 | 6.487 |
| 0.272 | −0.083 | 6.487 |
| 0.283 | −0.099 | 6.487 |
| 0.293 | −0.115 | 6.487 |
| 0.303 | −0.131 | 6.487 |
| 0.313 | −0.148 | 6.487 |
| 0.323 | −0.164 | 6.487 |
| 0.332 | −0.180 | 6.487 |
| 0.342 | −0.197 | 6.487 |
| 0.352 | −0.214 | 6.487 |
| 0.361 | −0.230 | 6.487 |
| 0.370 | −0.247 | 6.487 |
| 0.380 | −0.264 | 6.487 |
| 0.389 | −0.280 | 6.487 |
| 0.398 | −0.297 | 6.487 |
| 0.407 | −0.314 | 6.487 |
| 0.416 | −0.331 | 6.487 |
| 0.425 | −0.348 | 6.487 |
| 0.434 | −0.365 | 6.487 |
| 0.442 | −0.382 | 6.487 |
| 0.450 | −0.399 | 6.487 |
| 0.458 | −0.417 | 6.487 |
| 0.466 | −0.434 | 6.487 |
| 0.474 | −0.452 | 6.487 |
| 0.481 | −0.469 | 6.487 |
| 0.489 | −0.487 | 6.487 |
| 0.490 | −0.490 | 6.487 |
| 0.492 | −0.494 | 6.487 |
| 0.493 | −0.497 | 6.487 |
| 0.495 | −0.501 | 6.487 |
| 0.497 | −0.504 | 6.487 |
| 0.498 | −0.508 | 6.487 |
| 0.500 | −0.511 | 6.487 |
| 0.501 | −0.515 | 6.487 |
| 0.502 | −0.519 | 6.487 |
| 0.503 | −0.522 | 6.487 |
| 0.505 | −0.525 | 6.487 |
| 0.505 | −0.528 | 6.487 |
| 0.506 | −0.531 | 6.487 |
| 0.505 | −0.534 | 6.487 |
| 0.505 | −0.537 | 6.487 |
| 0.503 | −0.540 | 6.487 |
| 0.502 | −0.542 | 6.487 |
| 0.500 | −0.544 | 6.487 |
| 0.497 | −0.546 | 6.487 |
| 0.495 | −0.548 | 6.487 |
| 0.492 | −0.549 | 6.487 |
| 0.489 | −0.550 | 6.487 |
| 0.486 | −0.550 | 6.487 |
| 0.483 | −0.550 | 6.487 |
| 0.480 | −0.549 | 6.487 |
| 0.477 | −0.548 | 6.487 |
| 0.474 | −0.547 | 6.487 |
| 0.472 | −0.545 | 6.487 |
| 0.470 | −0.543 | 6.487 |
| 0.468 | −0.541 | 6.487 |
| 0.467 | −0.538 | 6.487 |
| 0.465 | −0.536 | 6.487 |
| 0.464 | −0.534 | 6.487 |
| 0.462 | −0.532 | 6.487 |
| 0.460 | −0.530 | 6.487 |
| 0.459 | −0.528 | 6.487 |
| 0.457 | −0.526 | 6.487 |
| 0.456 | −0.524 | 6.487 |
| 0.454 | −0.522 | 6.487 |
| 0.446 | −0.511 | 6.487 |
| 0.438 | −0.501 | 6.487 |
| 0.429 | −0.490 | 6.487 |
| 0.421 | −0.480 | 6.487 |
| 0.412 | −0.470 | 6.487 |
| 0.403 | −0.460 | 6.487 |
| 0.395 | −0.450 | 6.487 |
| 0.386 | −0.440 | 6.487 |
| 0.377 | −0.431 | 6.487 |
| 0.368 | −0.421 | 6.487 |
| 0.359 | −0.412 | 6.487 |
| 0.349 | −0.402 | 6.487 |
| 0.340 | −0.393 | 6.487 |
| 0.330 | −0.384 | 6.487 |
| 0.320 | −0.375 | 6.487 |
| 0.310 | −0.366 | 6.487 |
| 0.300 | −0.358 | 6.487 |
| 0.290 | −0.349 | 6.487 |
| 0.280 | −0.341 | 6.487 |
| 0.270 | −0.332 | 6.487 |
| 0.260 | −0.324 | 6.487 |
| 0.250 | −0.315 | 6.487 |
| 0.239 | −0.306 | 6.487 |
| 0.229 | −0.298 | 6.487 |
| 0.219 | −0.289 | 6.487 |
| 0.209 | −0.281 | 6.487 |
| 0.199 | −0.273 | 6.487 |
| 0.188 | −0.264 | 6.487 |
| 0.178 | −0.256 | 6.487 |
| 0.167 | −0.248 | 6.487 |
| 0.157 | −0.240 | 6.487 |
| 0.146 | −0.232 | 6.487 |
| 0.135 | −0.224 | 6.487 |
| 0.125 | −0.217 | 6.487 |
| 0.114 | −0.209 | 6.487 |
| 0.103 | −0.201 | 6.487 |
| 0.092 | −0.193 | 6.487 |
| 0.081 | −0.186 | 6.487 |
| 0.071 | −0.178 | 6.487 |
| 0.060 | −0.171 | 6.487 |
| 0.049 | −0.164 | 6.487 |
| 0.037 | −0.156 | 6.487 |
| 0.026 | −0.149 | 6.487 |
| 0.015 | −0.142 | 6.487 |
| 0.004 | −0.135 | 6.487 |
| −0.007 | −0.128 | 6.487 |
| −0.019 | −0.121 | 6.487 |
| −0.030 | −0.115 | 6.487 |
| −0.042 | −0.108 | 6.487 |
| −0.053 | −0.101 | 6.487 |
| −0.065 | −0.095 | 6.487 |
| −0.076 | −0.088 | 6.487 |
| −0.088 | −0.082 | 6.487 |
| −0.099 | −0.076 | 6.487 |
| −0.111 | −0.070 | 6.487 |

TABLE 2-continued

|  | X | Y | Z |
|---|---|---|---|
|  | −0.123 | −0.064 | 6.487 |
|  | −0.135 | −0.058 | 6.487 |
|  | −0.147 | −0.052 | 6.487 |
|  | −0.159 | −0.046 | 6.487 |
|  | −0.171 | −0.041 | 6.487 |
|  | −0.183 | −0.036 | 6.487 |
|  | −0.195 | −0.030 | 6.487 |
|  | −0.207 | −0.025 | 6.487 |
|  | −0.220 | −0.020 | 6.487 |
|  | −0.232 | −0.016 | 6.487 |
|  | −0.245 | −0.011 | 6.487 |
|  | −0.257 | −0.007 | 6.487 |
|  | −0.270 | −0.002 | 6.487 |
|  | −0.282 | 0.002 | 6.487 |
|  | −0.295 | 0.005 | 6.487 |
|  | −0.308 | 0.009 | 6.487 |
|  | −0.321 | 0.012 | 6.487 |
|  | −0.334 | 0.015 | 6.487 |
|  | −0.347 | 0.017 | 6.487 |
|  | −0.360 | 0.020 | 6.487 |
|  | −0.373 | 0.021 | 6.487 |
|  | −0.386 | 0.023 | 6.487 |
|  | −0.399 | 0.023 | 6.487 |
|  | −0.412 | 0.024 | 6.487 |
|  | −0.415 | 0.024 | 6.487 |
|  | −0.418 | 0.024 | 6.487 |
|  | −0.420 | 0.024 | 6.487 |
|  | −0.423 | 0.024 | 6.487 |
|  | −0.426 | 0.024 | 6.487 |
|  | −0.428 | 0.024 | 6.487 |
|  | −0.431 | 0.024 | 6.487 |
|  | −0.434 | 0.023 | 6.487 |
|  | −0.436 | 0.023 | 6.487 |
|  | −0.439 | 0.023 | 6.487 |
|  | −0.446 | 0.023 | 6.487 |
|  | −0.454 | 0.023 | 6.487 |
|  | −0.461 | 0.024 | 6.487 |
|  | −0.469 | 0.026 | 6.487 |
|  | −0.476 | 0.029 | 6.487 |
|  | −0.482 | 0.032 | 6.487 |
|  | −0.489 | 0.036 | 6.487 |
|  | −0.495 | 0.040 | 6.487 |
|  | −0.500 | 0.046 | 6.487 |
|  | −0.505 | 0.051 | 6.487 |
|  | −0.509 | 0.057 | 6.487 |
|  | −0.513 | 0.064 | 6.487 |
|  | −0.516 | 0.071 | 6.487 |
|  | −0.518 | 0.078 | 6.487 |
|  | −0.520 | 0.085 | 6.487 |
|  | −0.520 | 0.093 | 6.487 |
|  | −0.521 | 0.100 | 6.487 |
|  | −0.520 | 0.108 | 6.487 |
| SECTION 5 | −0.511 | 0.127 | 6.544 |
|  | −0.510 | 0.130 | 6.544 |
|  | −0.509 | 0.134 | 6.544 |
|  | −0.508 | 0.138 | 6.544 |
|  | −0.506 | 0.141 | 6.544 |
|  | −0.505 | 0.145 | 6.544 |
|  | −0.504 | 0.148 | 6.544 |
|  | −0.503 | 0.152 | 6.544 |
|  | −0.502 | 0.156 | 6.544 |
|  | −0.500 | 0.159 | 6.544 |
|  | −0.499 | 0.163 | 6.544 |
|  | −0.491 | 0.180 | 6.544 |
|  | −0.483 | 0.196 | 6.544 |
|  | −0.473 | 0.213 | 6.544 |
|  | −0.462 | 0.228 | 6.544 |
|  | −0.451 | 0.243 | 6.544 |
|  | −0.438 | 0.257 | 6.544 |
|  | −0.425 | 0.270 | 6.544 |
|  | −0.410 | 0.282 | 6.544 |
|  | −0.395 | 0.293 | 6.544 |
|  | −0.379 | 0.303 | 6.544 |
|  | −0.363 | 0.312 | 6.544 |
|  | −0.346 | 0.320 | 6.544 |
|  | −0.328 | 0.327 | 6.544 |
|  | −0.310 | 0.332 | 6.544 |
|  | −0.292 | 0.337 | 6.544 |

TABLE 2-continued

| X | Y | Z |
|---|---|---|
| −0.273 | 0.340 | 6.544 |
| −0.254 | 0.341 | 6.544 |
| −0.236 | 0.342 | 6.544 |
| −0.217 | 0.341 | 6.544 |
| −0.198 | 0.339 | 6.544 |
| −0.180 | 0.336 | 6.544 |
| −0.161 | 0.332 | 6.544 |
| −0.143 | 0.327 | 6.544 |
| −0.125 | 0.321 | 6.544 |
| −0.108 | 0.314 | 6.544 |
| −0.091 | 0.306 | 6.544 |
| −0.074 | 0.298 | 6.544 |
| −0.058 | 0.288 | 6.544 |
| −0.042 | 0.278 | 6.544 |
| −0.026 | 0.267 | 6.544 |
| −0.011 | 0.256 | 6.544 |
| 0.003 | 0.244 | 6.544 |
| 0.018 | 0.232 | 6.544 |
| 0.032 | 0.219 | 6.544 |
| 0.045 | 0.206 | 6.544 |
| 0.059 | 0.193 | 6.544 |
| 0.072 | 0.180 | 6.544 |
| 0.084 | 0.166 | 6.544 |
| 0.097 | 0.152 | 6.544 |
| 0.109 | 0.138 | 6.544 |
| 0.121 | 0.123 | 6.544 |
| 0.133 | 0.109 | 6.544 |
| 0.145 | 0.094 | 6.544 |
| 0.157 | 0.079 | 6.544 |
| 0.168 | 0.064 | 6.544 |
| 0.179 | 0.049 | 6.544 |
| 0.190 | 0.034 | 6.544 |
| 0.201 | 0.018 | 6.544 |
| 0.212 | 0.003 | 6.544 |
| 0.222 | −0.013 | 6.544 |
| 0.233 | −0.028 | 6.544 |
| 0.243 | −0.044 | 6.544 |
| 0.254 | −0.059 | 6.544 |
| 0.264 | −0.075 | 6.544 |
| 0.274 | −0.091 | 6.544 |
| 0.284 | −0.107 | 6.544 |
| 0.294 | −0.123 | 6.544 |
| 0.304 | −0.139 | 6.544 |
| 0.314 | −0.155 | 6.544 |
| 0.324 | −0.171 | 6.544 |
| 0.333 | −0.187 | 6.544 |
| 0.343 | −0.203 | 6.544 |
| 0.352 | −0.220 | 6.544 |
| 0.362 | −0.236 | 6.544 |
| 0.371 | −0.252 | 6.544 |
| 0.380 | −0.269 | 6.544 |
| 0.389 | −0.285 | 6.544 |
| 0.398 | −0.302 | 6.544 |
| 0.407 | −0.318 | 6.544 |
| 0.416 | −0.335 | 6.544 |
| 0.425 | −0.352 | 6.544 |
| 0.433 | −0.368 | 6.544 |
| 0.442 | −0.385 | 6.544 |
| 0.450 | −0.402 | 6.544 |
| 0.458 | −0.419 | 6.544 |
| 0.465 | −0.437 | 6.544 |
| 0.473 | −0.454 | 6.544 |
| 0.480 | −0.471 | 6.544 |
| 0.488 | −0.488 | 6.544 |
| 0.489 | −0.492 | 6.544 |
| 0.491 | −0.495 | 6.544 |
| 0.492 | −0.499 | 6.544 |
| 0.494 | −0.502 | 6.544 |
| 0.495 | −0.505 | 6.544 |
| 0.497 | −0.509 | 6.544 |
| 0.498 | −0.512 | 6.544 |
| 0.499 | −0.516 | 6.544 |
| 0.501 | −0.519 | 6.544 |
| 0.502 | −0.523 | 6.544 |
| 0.503 | −0.526 | 6.544 |
| 0.504 | −0.529 | 6.544 |
| 0.504 | −0.532 | 6.544 |
| 0.504 | −0.535 | 6.544 |

TABLE 2-continued

| X | Y | Z |
|---|---|---|
| 0.503 | −0.538 | 6.544 |
| 0.502 | −0.540 | 6.544 |
| 0.500 | −0.543 | 6.544 |
| 0.498 | −0.545 | 6.544 |
| 0.496 | −0.547 | 6.544 |
| 0.493 | −0.548 | 6.544 |
| 0.491 | −0.550 | 6.544 |
| 0.488 | −0.550 | 6.544 |
| 0.485 | −0.551 | 6.544 |
| 0.482 | −0.550 | 6.544 |
| 0.479 | −0.550 | 6.544 |
| 0.476 | −0.549 | 6.544 |
| 0.473 | −0.547 | 6.544 |
| 0.471 | −0.546 | 6.544 |
| 0.469 | −0.543 | 6.544 |
| 0.467 | −0.541 | 6.544 |
| 0.466 | −0.539 | 6.544 |
| 0.464 | −0.537 | 6.544 |
| 0.463 | −0.535 | 6.544 |
| 0.461 | −0.533 | 6.544 |
| 0.459 | −0.531 | 6.544 |
| 0.458 | −0.529 | 6.544 |
| 0.456 | −0.527 | 6.544 |
| 0.455 | −0.524 | 6.544 |
| 0.453 | −0.522 | 6.544 |
| 0.445 | −0.512 | 6.544 |
| 0.437 | −0.502 | 6.544 |
| 0.428 | −0.491 | 6.544 |
| 0.420 | −0.481 | 6.544 |
| 0.411 | −0.471 | 6.544 |
| 0.402 | −0.461 | 6.544 |
| 0.394 | −0.452 | 6.544 |
| 0.385 | −0.442 | 6.544 |
| 0.376 | −0.432 | 6.544 |
| 0.367 | −0.422 | 6.544 |
| 0.358 | −0.413 | 6.544 |
| 0.348 | −0.403 | 6.544 |
| 0.339 | −0.394 | 6.544 |
| 0.329 | −0.385 | 6.544 |
| 0.319 | −0.376 | 6.544 |
| 0.309 | −0.368 | 6.544 |
| 0.299 | −0.359 | 6.544 |
| 0.289 | −0.351 | 6.544 |
| 0.279 | −0.342 | 6.544 |
| 0.269 | −0.333 | 6.544 |
| 0.259 | −0.325 | 6.544 |
| 0.250 | −0.316 | 6.544 |
| 0.240 | −0.307 | 6.544 |
| 0.229 | −0.299 | 6.544 |
| 0.219 | −0.290 | 6.544 |
| 0.209 | −0.282 | 6.544 |
| 0.199 | −0.273 | 6.544 |
| 0.189 | −0.265 | 6.544 |
| 0.178 | −0.257 | 6.544 |
| 0.168 | −0.249 | 6.544 |
| 0.158 | −0.241 | 6.544 |
| 0.147 | −0.233 | 6.544 |
| 0.137 | −0.225 | 6.544 |
| 0.126 | −0.217 | 6.544 |
| 0.115 | −0.209 | 6.544 |
| 0.105 | −0.201 | 6.544 |
| 0.094 | −0.193 | 6.544 |
| 0.083 | −0.186 | 6.544 |
| 0.072 | −0.178 | 6.544 |
| 0.062 | −0.171 | 6.544 |
| 0.051 | −0.163 | 6.544 |
| 0.040 | −0.156 | 6.544 |
| 0.029 | −0.149 | 6.544 |
| 0.018 | −0.141 | 6.544 |
| 0.007 | −0.134 | 6.544 |
| −0.005 | −0.127 | 6.544 |
| −0.016 | −0.120 | 6.544 |
| −0.027 | −0.113 | 6.544 |
| −0.038 | −0.106 | 6.544 |
| −0.050 | −0.100 | 6.544 |
| −0.061 | −0.093 | 6.544 |
| −0.073 | −0.086 | 6.544 |
| −0.084 | −0.080 | 6.544 |

TABLE 2-continued

| | X | Y | Z |
|---|---|---|---|
| | −0.096 | −0.073 | 6.544 |
| | −0.107 | −0.067 | 6.544 |
| | −0.119 | −0.061 | 6.544 |
| | −0.131 | −0.055 | 6.544 |
| | −0.142 | −0.049 | 6.544 |
| | −0.154 | −0.043 | 6.544 |
| | −0.166 | −0.037 | 6.544 |
| | −0.178 | −0.032 | 6.544 |
| | −0.190 | −0.026 | 6.544 |
| | −0.202 | −0.021 | 6.544 |
| | −0.214 | −0.016 | 6.544 |
| | −0.227 | −0.011 | 6.544 |
| | −0.239 | −0.006 | 6.544 |
| | −0.251 | −0.002 | 6.544 |
| | −0.264 | 0.003 | 6.544 |
| | −0.276 | 0.007 | 6.544 |
| | −0.289 | 0.011 | 6.544 |
| | −0.302 | 0.015 | 6.544 |
| | −0.314 | 0.018 | 6.544 |
| | −0.327 | 0.021 | 6.544 |
| | −0.340 | 0.024 | 6.544 |
| | −0.353 | 0.026 | 6.544 |
| | −0.366 | 0.029 | 6.544 |
| | −0.379 | 0.030 | 6.544 |
| | −0.392 | 0.031 | 6.544 |
| | −0.406 | 0.032 | 6.544 |
| | −0.408 | 0.032 | 6.544 |
| | −0.411 | 0.032 | 6.544 |
| | −0.413 | 0.032 | 6.544 |
| | −0.416 | 0.032 | 6.544 |
| | −0.419 | 0.032 | 6.544 |
| | −0.421 | 0.032 | 6.544 |
| | −0.424 | 0.032 | 6.544 |
| | −0.427 | 0.032 | 6.544 |
| | −0.429 | 0.032 | 6.544 |
| | −0.432 | 0.031 | 6.544 |
| | −0.440 | 0.031 | 6.544 |
| | −0.447 | 0.032 | 6.544 |
| | −0.455 | 0.033 | 6.544 |
| | −0.462 | 0.035 | 6.544 |
| | −0.469 | 0.038 | 6.544 |
| | −0.476 | 0.042 | 6.544 |
| | −0.482 | 0.046 | 6.544 |
| | −0.488 | 0.050 | 6.544 |
| | −0.493 | 0.056 | 6.544 |
| | −0.498 | 0.062 | 6.544 |
| | −0.503 | 0.068 | 6.544 |
| | −0.506 | 0.075 | 6.544 |
| | −0.509 | 0.082 | 6.544 |
| | −0.511 | 0.089 | 6.544 |
| | −0.513 | 0.097 | 6.544 |
| | −0.513 | 0.104 | 6.544 |
| | −0.513 | 0.112 | 6.544 |
| | −0.512 | 0.119 | 6.544 |
| SECTION 6 | −0.482 | 0.166 | 6.736 |
| | −0.480 | 0.170 | 6.736 |
| | −0.479 | 0.173 | 6.736 |
| | −0.478 | 0.176 | 6.736 |
| | −0.476 | 0.180 | 6.736 |
| | −0.475 | 0.183 | 6.736 |
| | −0.473 | 0.186 | 6.736 |
| | −0.471 | 0.189 | 6.736 |
| | −0.470 | 0.192 | 6.736 |
| | −0.468 | 0.195 | 6.736 |
| | −0.466 | 0.198 | 6.736 |
| | −0.457 | 0.214 | 6.736 |
| | −0.446 | 0.228 | 6.736 |
| | −0.435 | 0.242 | 6.736 |
| | −0.422 | 0.254 | 6.736 |
| | −0.409 | 0.266 | 6.736 |
| | −0.395 | 0.277 | 6.736 |
| | −0.380 | 0.287 | 6.736 |
| | −0.365 | 0.296 | 6.736 |
| | −0.349 | 0.303 | 6.736 |
| | −0.332 | 0.310 | 6.736 |
| | −0.315 | 0.315 | 6.736 |
| | −0.298 | 0.319 | 6.736 |
| | −0.280 | 0.322 | 6.736 |

TABLE 2-continued

| X | Y | Z |
|---|---|---|
| −0.262 | 0.324 | 6.736 |
| −0.245 | 0.325 | 6.736 |
| −0.227 | 0.324 | 6.736 |
| −0.209 | 0.323 | 6.736 |
| −0.191 | 0.321 | 6.736 |
| −0.174 | 0.317 | 6.736 |
| −0.157 | 0.313 | 6.736 |
| −0.140 | 0.308 | 6.736 |
| −0.123 | 0.302 | 6.736 |
| −0.106 | 0.295 | 6.736 |
| −0.090 | 0.288 | 6.736 |
| −0.074 | 0.280 | 6.736 |
| −0.059 | 0.271 | 6.736 |
| −0.044 | 0.261 | 6.736 |
| −0.029 | 0.251 | 6.736 |
| −0.015 | 0.241 | 6.736 |
| −0.001 | 0.230 | 6.736 |
| 0.013 | 0.219 | 6.736 |
| 0.027 | 0.207 | 6.736 |
| 0.040 | 0.195 | 6.736 |
| 0.052 | 0.182 | 6.736 |
| 0.065 | 0.170 | 6.736 |
| 0.077 | 0.157 | 6.736 |
| 0.089 | 0.143 | 6.736 |
| 0.101 | 0.130 | 6.736 |
| 0.112 | 0.116 | 6.736 |
| 0.124 | 0.103 | 6.736 |
| 0.135 | 0.089 | 6.736 |
| 0.146 | 0.075 | 6.736 |
| 0.157 | 0.061 | 6.736 |
| 0.167 | 0.046 | 6.736 |
| 0.178 | 0.032 | 6.736 |
| 0.188 | 0.017 | 6.736 |
| 0.198 | 0.003 | 6.736 |
| 0.208 | −0.012 | 6.736 |
| 0.218 | −0.027 | 6.736 |
| 0.228 | −0.041 | 6.736 |
| 0.238 | −0.056 | 6.736 |
| 0.248 | −0.071 | 6.736 |
| 0.258 | −0.086 | 6.736 |
| 0.267 | −0.101 | 6.736 |
| 0.277 | −0.116 | 6.736 |
| 0.286 | −0.131 | 6.736 |
| 0.296 | −0.146 | 6.736 |
| 0.305 | −0.161 | 6.736 |
| 0.314 | −0.177 | 6.736 |
| 0.324 | −0.192 | 6.736 |
| 0.333 | −0.207 | 6.736 |
| 0.342 | −0.223 | 6.736 |
| 0.351 | −0.238 | 6.736 |
| 0.360 | −0.253 | 6.736 |
| 0.368 | −0.269 | 6.736 |
| 0.377 | −0.284 | 6.736 |
| 0.386 | −0.300 | 6.736 |
| 0.395 | −0.315 | 6.736 |
| 0.403 | −0.331 | 6.736 |
| 0.412 | −0.347 | 6.736 |
| 0.420 | −0.362 | 6.736 |
| 0.428 | −0.378 | 6.736 |
| 0.436 | −0.394 | 6.736 |
| 0.444 | −0.410 | 6.736 |
| 0.451 | −0.427 | 6.736 |
| 0.458 | −0.443 | 6.736 |
| 0.465 | −0.459 | 6.736 |
| 0.473 | −0.475 | 6.736 |
| 0.480 | −0.492 | 6.736 |
| 0.482 | −0.495 | 6.736 |
| 0.483 | −0.498 | 6.736 |
| 0.485 | −0.501 | 6.736 |
| 0.486 | −0.505 | 6.736 |
| 0.488 | −0.508 | 6.736 |
| 0.489 | −0.511 | 6.736 |
| 0.490 | −0.514 | 6.736 |
| 0.491 | −0.518 | 6.736 |
| 0.493 | −0.521 | 6.736 |
| 0.494 | −0.524 | 6.736 |
| 0.495 | −0.527 | 6.736 |
| 0.496 | −0.530 | 6.736 |
| 0.496 | −0.533 | 6.736 |
| 0.496 | −0.536 | 6.736 |
| 0.495 | −0.539 | 6.736 |
| 0.494 | −0.541 | 6.736 |
| 0.492 | −0.544 | 6.736 |
| 0.490 | −0.546 | 6.736 |
| 0.488 | −0.548 | 6.736 |
| 0.486 | −0.549 | 6.736 |
| 0.483 | −0.551 | 6.736 |
| 0.480 | −0.551 | 6.736 |
| 0.477 | −0.552 | 6.736 |
| 0.474 | −0.551 | 6.736 |
| 0.471 | −0.551 | 6.736 |
| 0.469 | −0.550 | 6.736 |
| 0.466 | −0.549 | 6.736 |
| 0.463 | −0.547 | 6.736 |
| 0.461 | −0.545 | 6.736 |
| 0.460 | −0.543 | 6.736 |
| 0.458 | −0.541 | 6.736 |
| 0.457 | −0.539 | 6.736 |
| 0.455 | −0.537 | 6.736 |
| 0.454 | −0.534 | 6.736 |
| 0.452 | −0.532 | 6.736 |
| 0.450 | −0.530 | 6.736 |
| 0.449 | −0.528 | 6.736 |
| 0.447 | −0.526 | 6.736 |
| 0.446 | −0.524 | 6.736 |
| 0.437 | −0.514 | 6.736 |
| 0.429 | −0.504 | 6.736 |
| 0.421 | −0.494 | 6.736 |
| 0.412 | −0.484 | 6.736 |
| 0.404 | −0.474 | 6.736 |
| 0.395 | −0.464 | 6.736 |
| 0.386 | −0.455 | 6.736 |
| 0.378 | −0.445 | 6.736 |
| 0.369 | −0.435 | 6.736 |
| 0.360 | −0.426 | 6.736 |
| 0.351 | −0.416 | 6.736 |
| 0.342 | −0.407 | 6.736 |
| 0.332 | −0.398 | 6.736 |
| 0.323 | −0.389 | 6.736 |
| 0.313 | −0.380 | 6.736 |
| 0.303 | −0.372 | 6.736 |
| 0.294 | −0.363 | 6.736 |
| 0.284 | −0.354 | 6.736 |
| 0.274 | −0.346 | 6.736 |
| 0.264 | −0.337 | 6.736 |
| 0.255 | −0.328 | 6.736 |
| 0.245 | −0.319 | 6.736 |
| 0.235 | −0.311 | 6.736 |
| 0.226 | −0.302 | 6.736 |
| 0.216 | −0.293 | 6.736 |
| 0.206 | −0.285 | 6.736 |
| 0.196 | −0.276 | 6.736 |
| 0.186 | −0.268 | 6.736 |
| 0.176 | −0.259 | 6.736 |
| 0.166 | −0.251 | 6.736 |
| 0.156 | −0.243 | 6.736 |
| 0.146 | −0.234 | 6.736 |
| 0.136 | −0.226 | 6.736 |
| 0.126 | −0.218 | 6.736 |
| 0.116 | −0.210 | 6.736 |
| 0.105 | −0.202 | 6.736 |
| 0.095 | −0.194 | 6.736 |
| 0.085 | −0.186 | 6.736 |
| 0.074 | −0.178 | 6.736 |
| 0.064 | −0.170 | 6.736 |
| 0.053 | −0.162 | 6.736 |
| 0.043 | −0.155 | 6.736 |
| 0.032 | −0.147 | 6.736 |
| 0.022 | −0.139 | 6.736 |
| 0.011 | −0.132 | 6.736 |
| 0.001 | −0.124 | 6.736 |
| −0.010 | −0.117 | 6.736 |
| −0.021 | −0.109 | 6.736 |
| −0.032 | −0.102 | 6.736 |
| −0.043 | −0.095 | 6.736 |
| −0.054 | −0.088 | 6.736 |

TABLE 2-continued

|  | X | Y | Z |
|---|---|---|---|
|  | −0.064 | −0.080 | 6.736 |
|  | −0.075 | −0.073 | 6.736 |
|  | −0.086 | −0.066 | 6.736 |
|  | −0.098 | −0.060 | 6.736 |
|  | −0.109 | −0.053 | 6.736 |
|  | −0.120 | −0.046 | 6.736 |
|  | −0.131 | −0.040 | 6.736 |
|  | −0.143 | −0.033 | 6.736 |
|  | −0.154 | −0.027 | 6.736 |
|  | −0.165 | −0.020 | 6.736 |
|  | −0.177 | −0.014 | 6.736 |
|  | −0.188 | −0.008 | 6.736 |
|  | −0.200 | −0.002 | 6.736 |
|  | −0.212 | 0.004 | 6.736 |
|  | −0.223 | 0.009 | 6.736 |
|  | −0.235 | 0.015 | 6.736 |
|  | −0.247 | 0.020 | 6.736 |
|  | −0.259 | 0.025 | 6.736 |
|  | −0.271 | 0.030 | 6.736 |
|  | −0.284 | 0.035 | 6.736 |
|  | −0.296 | 0.039 | 6.736 |
|  | −0.308 | 0.043 | 6.736 |
|  | −0.321 | 0.047 | 6.736 |
|  | −0.333 | 0.051 | 6.736 |
|  | −0.346 | 0.054 | 6.736 |
|  | −0.359 | 0.056 | 6.736 |
|  | −0.372 | 0.059 | 6.736 |
|  | −0.384 | 0.060 | 6.736 |
|  | −0.387 | 0.060 | 6.736 |
|  | −0.390 | 0.061 | 6.736 |
|  | −0.392 | 0.061 | 6.736 |
|  | −0.395 | 0.061 | 6.736 |
|  | −0.398 | 0.061 | 6.736 |
|  | −0.400 | 0.061 | 6.736 |
|  | −0.403 | 0.061 | 6.736 |
|  | −0.405 | 0.062 | 6.736 |
|  | −0.408 | 0.062 | 6.736 |
|  | −0.411 | 0.062 | 6.736 |
|  | −0.418 | 0.062 | 6.736 |
|  | −0.426 | 0.063 | 6.736 |
|  | −0.434 | 0.065 | 6.736 |
|  | −0.441 | 0.068 | 6.736 |
|  | −0.448 | 0.071 | 6.736 |
|  | −0.455 | 0.075 | 6.736 |
|  | −0.461 | 0.080 | 6.736 |
|  | −0.467 | 0.086 | 6.736 |
|  | −0.472 | 0.092 | 6.736 |
|  | −0.476 | 0.098 | 6.736 |
|  | −0.480 | 0.105 | 6.736 |
|  | −0.483 | 0.113 | 6.736 |
|  | −0.485 | 0.120 | 6.736 |
|  | −0.487 | 0.128 | 6.736 |
|  | −0.487 | 0.136 | 6.736 |
|  | −0.487 | 0.143 | 6.736 |
|  | −0.486 | 0.151 | 6.736 |
|  | −0.484 | 0.159 | 6.736 |
| SECTION 7 | −0.450 | 0.208 | 6.928 |
|  | −0.449 | 0.211 | 6.928 |
|  | −0.447 | 0.214 | 6.928 |
|  | −0.445 | 0.217 | 6.928 |
|  | −0.444 | 0.220 | 6.928 |
|  | −0.442 | 0.222 | 6.928 |
|  | −0.440 | 0.225 | 6.928 |
|  | −0.438 | 0.228 | 6.928 |
|  | −0.436 | 0.231 | 6.928 |
|  | −0.434 | 0.233 | 6.928 |
|  | −0.432 | 0.236 | 6.928 |
|  | −0.421 | 0.249 | 6.928 |
|  | −0.409 | 0.261 | 6.928 |
|  | −0.396 | 0.272 | 6.928 |
|  | −0.383 | 0.282 | 6.928 |
|  | −0.368 | 0.291 | 6.928 |
|  | −0.353 | 0.299 | 6.928 |
|  | −0.338 | 0.306 | 6.928 |
|  | −0.322 | 0.312 | 6.928 |
|  | −0.305 | 0.316 | 6.928 |
|  | −0.289 | 0.319 | 6.928 |
|  | −0.272 | 0.321 | 6.928 |

TABLE 2-continued

| X | Y | Z |
|---|---|---|
| −0.255 | 0.322 | 6.928 |
| −0.238 | 0.322 | 6.928 |
| −0.221 | 0.321 | 6.928 |
| −0.204 | 0.319 | 6.928 |
| −0.188 | 0.316 | 6.928 |
| −0.171 | 0.312 | 6.928 |
| −0.155 | 0.307 | 6.928 |
| −0.139 | 0.301 | 6.928 |
| −0.123 | 0.295 | 6.928 |
| −0.108 | 0.288 | 6.928 |
| −0.093 | 0.280 | 6.928 |
| −0.078 | 0.272 | 6.928 |
| −0.064 | 0.263 | 6.928 |
| −0.050 | 0.253 | 6.928 |
| −0.036 | 0.244 | 6.928 |
| −0.022 | 0.233 | 6.928 |
| −0.009 | 0.223 | 6.928 |
| 0.004 | 0.212 | 6.928 |
| 0.017 | 0.201 | 6.928 |
| 0.029 | 0.189 | 6.928 |
| 0.041 | 0.177 | 6.928 |
| 0.053 | 0.165 | 6.928 |
| 0.065 | 0.153 | 6.928 |
| 0.076 | 0.140 | 6.928 |
| 0.087 | 0.128 | 6.928 |
| 0.098 | 0.115 | 6.928 |
| 0.109 | 0.102 | 6.928 |
| 0.120 | 0.089 | 6.928 |
| 0.130 | 0.075 | 6.928 |
| 0.141 | 0.062 | 6.928 |
| 0.151 | 0.048 | 6.928 |
| 0.161 | 0.035 | 6.928 |
| 0.171 | 0.021 | 6.928 |
| 0.181 | 0.007 | 6.928 |
| 0.190 | −0.007 | 6.928 |
| 0.200 | −0.021 | 6.928 |
| 0.209 | −0.035 | 6.928 |
| 0.219 | −0.049 | 6.928 |
| 0.228 | −0.063 | 6.928 |
| 0.237 | −0.077 | 6.928 |
| 0.246 | −0.091 | 6.928 |
| 0.255 | −0.106 | 6.928 |
| 0.264 | −0.120 | 6.928 |
| 0.273 | −0.135 | 6.928 |
| 0.282 | −0.149 | 6.928 |
| 0.291 | −0.164 | 6.928 |
| 0.299 | −0.178 | 6.928 |
| 0.308 | −0.193 | 6.928 |
| 0.317 | −0.207 | 6.928 |
| 0.325 | −0.222 | 6.928 |
| 0.334 | −0.237 | 6.928 |
| 0.342 | −0.251 | 6.928 |
| 0.350 | −0.266 | 6.928 |
| 0.359 | −0.281 | 6.928 |
| 0.367 | −0.296 | 6.928 |
| 0.375 | −0.311 | 6.928 |
| 0.383 | −0.325 | 6.928 |
| 0.391 | −0.340 | 6.928 |
| 0.399 | −0.355 | 6.928 |
| 0.407 | −0.370 | 6.928 |
| 0.415 | −0.385 | 6.928 |
| 0.423 | −0.400 | 6.928 |
| 0.430 | −0.416 | 6.928 |
| 0.437 | −0.431 | 6.928 |
| 0.444 | −0.447 | 6.928 |
| 0.451 | −0.462 | 6.928 |
| 0.458 | −0.477 | 6.928 |
| 0.465 | −0.493 | 6.928 |
| 0.466 | −0.496 | 6.928 |
| 0.468 | −0.499 | 6.928 |
| 0.469 | −0.502 | 6.928 |
| 0.471 | −0.505 | 6.928 |
| 0.472 | −0.508 | 6.928 |
| 0.473 | −0.511 | 6.928 |
| 0.475 | −0.514 | 6.928 |
| 0.476 | −0.518 | 6.928 |
| 0.477 | −0.521 | 6.928 |
| 0.478 | −0.524 | 6.928 |

TABLE 2-continued

| X | Y | Z |
|---|---|---|
| 0.480 | −0.526 | 6.928 |
| 0.480 | −0.529 | 6.928 |
| 0.481 | −0.532 | 6.928 |
| 0.481 | −0.535 | 6.928 |
| 0.480 | −0.538 | 6.928 |
| 0.479 | −0.540 | 6.928 |
| 0.477 | −0.543 | 6.928 |
| 0.475 | −0.545 | 6.928 |
| 0.473 | −0.547 | 6.928 |
| 0.471 | −0.548 | 6.928 |
| 0.468 | −0.549 | 6.928 |
| 0.465 | −0.550 | 6.928 |
| 0.462 | −0.550 | 6.928 |
| 0.460 | −0.550 | 6.928 |
| 0.457 | −0.550 | 6.928 |
| 0.454 | −0.549 | 6.928 |
| 0.451 | −0.548 | 6.928 |
| 0.449 | −0.546 | 6.928 |
| 0.447 | −0.544 | 6.928 |
| 0.445 | −0.542 | 6.928 |
| 0.444 | −0.540 | 6.928 |
| 0.442 | −0.538 | 6.928 |
| 0.441 | −0.536 | 6.928 |
| 0.439 | −0.534 | 6.928 |
| 0.438 | −0.532 | 6.928 |
| 0.436 | −0.530 | 6.928 |
| 0.434 | −0.528 | 6.928 |
| 0.433 | −0.526 | 6.928 |
| 0.431 | −0.524 | 6.928 |
| 0.423 | −0.514 | 6.928 |
| 0.415 | −0.504 | 6.928 |
| 0.406 | −0.494 | 6.928 |
| 0.398 | −0.484 | 6.928 |
| 0.390 | −0.474 | 6.928 |
| 0.381 | −0.465 | 6.928 |
| 0.372 | −0.455 | 6.928 |
| 0.364 | −0.446 | 6.928 |
| 0.355 | −0.436 | 6.928 |
| 0.346 | −0.427 | 6.928 |
| 0.337 | −0.417 | 6.928 |
| 0.328 | −0.408 | 6.928 |
| 0.319 | −0.399 | 6.928 |
| 0.309 | −0.391 | 6.928 |
| 0.300 | −0.382 | 6.928 |
| 0.290 | −0.373 | 6.928 |
| 0.281 | −0.365 | 6.928 |
| 0.271 | −0.356 | 6.928 |
| 0.261 | −0.347 | 6.928 |
| 0.252 | −0.339 | 6.928 |
| 0.242 | −0.330 | 6.928 |
| 0.233 | −0.321 | 6.928 |
| 0.224 | −0.312 | 6.928 |
| 0.214 | −0.304 | 6.928 |
| 0.205 | −0.295 | 6.928 |
| 0.195 | −0.286 | 6.928 |
| 0.185 | −0.278 | 6.928 |
| 0.176 | −0.269 | 6.928 |
| 0.166 | −0.260 | 6.928 |
| 0.156 | −0.252 | 6.928 |
| 0.147 | −0.243 | 6.928 |
| 0.137 | −0.235 | 6.928 |
| 0.127 | −0.227 | 6.928 |
| 0.117 | −0.218 | 6.928 |
| 0.107 | −0.210 | 6.928 |
| 0.097 | −0.202 | 6.928 |
| 0.088 | −0.193 | 6.928 |
| 0.078 | −0.185 | 6.928 |
| 0.068 | −0.177 | 6.928 |
| 0.058 | −0.169 | 6.928 |
| 0.048 | −0.161 | 6.928 |
| 0.038 | −0.153 | 6.928 |
| 0.028 | −0.145 | 6.928 |
| 0.017 | −0.137 | 6.928 |
| 0.007 | −0.129 | 6.928 |
| −0.003 | −0.121 | 6.928 |
| −0.013 | −0.113 | 6.928 |
| −0.023 | −0.105 | 6.928 |
| −0.034 | −0.097 | 6.928 |

TABLE 2-continued

| | X | Y | Z |
|---|---|---|---|
| | −0.044 | −0.089 | 6.928 |
| | −0.054 | −0.082 | 6.928 |
| | −0.065 | −0.074 | 6.928 |
| | −0.075 | −0.067 | 6.928 |
| | −0.086 | −0.059 | 6.928 |
| | −0.096 | −0.052 | 6.928 |
| | −0.107 | −0.044 | 6.928 |
| | −0.117 | −0.037 | 6.928 |
| | −0.128 | −0.030 | 6.928 |
| | −0.139 | −0.022 | 6.928 |
| | −0.150 | −0.015 | 6.928 |
| | −0.160 | −0.008 | 6.928 |
| | −0.171 | −0.001 | 6.928 |
| | −0.182 | 0.006 | 6.928 |
| | −0.193 | 0.012 | 6.928 |
| | −0.204 | 0.019 | 6.928 |
| | −0.215 | 0.026 | 6.928 |
| | −0.226 | 0.032 | 6.928 |
| | −0.238 | 0.038 | 6.928 |
| | −0.249 | 0.045 | 6.928 |
| | −0.260 | 0.051 | 6.928 |
| | −0.272 | 0.056 | 6.928 |
| | −0.283 | 0.062 | 6.928 |
| | −0.295 | 0.068 | 6.928 |
| | −0.307 | 0.073 | 6.928 |
| | −0.319 | 0.078 | 6.928 |
| | −0.331 | 0.082 | 6.928 |
| | −0.343 | 0.086 | 6.928 |
| | −0.356 | 0.090 | 6.928 |
| | −0.368 | 0.093 | 6.928 |
| | −0.371 | 0.094 | 6.928 |
| | −0.373 | 0.094 | 6.928 |
| | −0.376 | 0.095 | 6.928 |
| | −0.378 | 0.095 | 6.928 |
| | −0.381 | 0.096 | 6.928 |
| | −0.383 | 0.096 | 6.928 |
| | −0.386 | 0.096 | 6.928 |
| | −0.388 | 0.097 | 6.928 |
| | −0.391 | 0.097 | 6.928 |
| | −0.393 | 0.097 | 6.928 |
| | −0.401 | 0.099 | 6.928 |
| | −0.409 | 0.100 | 6.928 |
| | −0.416 | 0.103 | 6.928 |
| | −0.423 | 0.106 | 6.928 |
| | −0.430 | 0.110 | 6.928 |
| | −0.437 | 0.115 | 6.928 |
| | −0.442 | 0.120 | 6.928 |
| | −0.447 | 0.126 | 6.928 |
| | −0.452 | 0.133 | 6.928 |
| | −0.455 | 0.140 | 6.928 |
| | −0.458 | 0.147 | 6.928 |
| | −0.460 | 0.155 | 6.928 |
| | −0.461 | 0.163 | 6.928 |
| | −0.461 | 0.170 | 6.928 |
| | −0.460 | 0.178 | 6.928 |
| | −0.459 | 0.186 | 6.928 |
| | −0.457 | 0.194 | 6.928 |
| | −0.454 | 0.201 | 6.928 |
| SECTION 8 | −0.424 | 0.257 | 7.120 |
| | −0.422 | 0.259 | 7.120 |
| | −0.420 | 0.262 | 7.120 |
| | −0.418 | 0.265 | 7.120 |
| | −0.416 | 0.267 | 7.120 |
| | −0.414 | 0.270 | 7.120 |
| | −0.412 | 0.272 | 7.120 |
| | −0.410 | 0.275 | 7.120 |
| | −0.408 | 0.277 | 7.120 |
| | −0.405 | 0.279 | 7.120 |
| | −0.403 | 0.282 | 7.120 |
| | −0.391 | 0.293 | 7.120 |
| | −0.378 | 0.303 | 7.120 |
| | −0.365 | 0.312 | 7.120 |
| | −0.350 | 0.319 | 7.120 |
| | −0.335 | 0.326 | 7.120 |
| | −0.320 | 0.331 | 7.120 |
| | −0.304 | 0.335 | 7.120 |
| | −0.288 | 0.338 | 7.120 |
| | −0.272 | 0.339 | 7.120 |

TABLE 2-continued

| X | Y | Z |
|---|---|---|
| −0.255 | 0.340 | 7.120 |
| −0.239 | 0.339 | 7.120 |
| −0.223 | 0.337 | 7.120 |
| −0.207 | 0.334 | 7.120 |
| −0.191 | 0.330 | 7.120 |
| −0.176 | 0.325 | 7.120 |
| −0.160 | 0.319 | 7.120 |
| −0.145 | 0.313 | 7.120 |
| −0.131 | 0.306 | 7.120 |
| −0.116 | 0.298 | 7.120 |
| −0.102 | 0.290 | 7.120 |
| −0.088 | 0.281 | 7.120 |
| −0.075 | 0.272 | 7.120 |
| −0.062 | 0.262 | 7.120 |
| −0.049 | 0.252 | 7.120 |
| −0.036 | 0.242 | 7.120 |
| −0.024 | 0.231 | 7.120 |
| −0.012 | 0.220 | 7.120 |
| 0.000 | 0.209 | 7.120 |
| 0.011 | 0.198 | 7.120 |
| 0.023 | 0.186 | 7.120 |
| 0.034 | 0.174 | 7.120 |
| 0.045 | 0.162 | 7.120 |
| 0.056 | 0.150 | 7.120 |
| 0.066 | 0.137 | 7.120 |
| 0.077 | 0.125 | 7.120 |
| 0.087 | 0.112 | 7.120 |
| 0.097 | 0.100 | 7.120 |
| 0.107 | 0.087 | 7.120 |
| 0.117 | 0.074 | 7.120 |
| 0.127 | 0.061 | 7.120 |
| 0.137 | 0.048 | 7.120 |
| 0.146 | 0.035 | 7.120 |
| 0.156 | 0.021 | 7.120 |
| 0.165 | 0.008 | 7.120 |
| 0.175 | −0.006 | 7.120 |
| 0.184 | −0.019 | 7.120 |
| 0.193 | −0.033 | 7.120 |
| 0.201 | −0.046 | 7.120 |
| 0.210 | −0.060 | 7.120 |
| 0.219 | −0.074 | 7.120 |
| 0.228 | −0.088 | 7.120 |
| 0.236 | −0.102 | 7.120 |
| 0.245 | −0.116 | 7.120 |
| 0.253 | −0.130 | 7.120 |
| 0.261 | −0.144 | 7.120 |
| 0.269 | −0.158 | 7.120 |
| 0.278 | −0.172 | 7.120 |
| 0.286 | −0.186 | 7.120 |
| 0.294 | −0.200 | 7.120 |
| 0.302 | −0.214 | 7.120 |
| 0.310 | −0.229 | 7.120 |
| 0.318 | −0.243 | 7.120 |
| 0.326 | −0.257 | 7.120 |
| 0.333 | −0.271 | 7.120 |
| 0.341 | −0.286 | 7.120 |
| 0.349 | −0.300 | 7.120 |
| 0.357 | −0.314 | 7.120 |
| 0.365 | −0.329 | 7.120 |
| 0.372 | −0.343 | 7.120 |
| 0.380 | −0.357 | 7.120 |
| 0.388 | −0.372 | 7.120 |
| 0.395 | −0.386 | 7.120 |
| 0.402 | −0.401 | 7.120 |
| 0.409 | −0.416 | 7.120 |
| 0.416 | −0.431 | 7.120 |
| 0.422 | −0.445 | 7.120 |
| 0.429 | −0.460 | 7.120 |
| 0.436 | −0.475 | 7.120 |
| 0.443 | −0.490 | 7.120 |
| 0.445 | −0.493 | 7.120 |
| 0.446 | −0.496 | 7.120 |
| 0.447 | −0.499 | 7.120 |
| 0.449 | −0.502 | 7.120 |
| 0.450 | −0.505 | 7.120 |
| 0.451 | −0.508 | 7.120 |
| 0.453 | −0.511 | 7.120 |
| 0.454 | −0.514 | 7.120 |
| 0.455 | −0.517 | 7.120 |
| 0.456 | −0.520 | 7.120 |
| 0.458 | −0.522 | 7.120 |
| 0.458 | −0.525 | 7.120 |
| 0.459 | −0.528 | 7.120 |
| 0.459 | −0.530 | 7.120 |
| 0.458 | −0.533 | 7.120 |
| 0.457 | −0.536 | 7.120 |
| 0.455 | −0.538 | 7.120 |
| 0.453 | −0.540 | 7.120 |
| 0.451 | −0.542 | 7.120 |
| 0.449 | −0.543 | 7.120 |
| 0.446 | −0.544 | 7.120 |
| 0.444 | −0.545 | 7.120 |
| 0.441 | −0.545 | 7.120 |
| 0.438 | −0.545 | 7.120 |
| 0.435 | −0.545 | 7.120 |
| 0.433 | −0.544 | 7.120 |
| 0.430 | −0.543 | 7.120 |
| 0.428 | −0.541 | 7.120 |
| 0.426 | −0.539 | 7.120 |
| 0.424 | −0.537 | 7.120 |
| 0.423 | −0.535 | 7.120 |
| 0.421 | −0.533 | 7.120 |
| 0.420 | −0.531 | 7.120 |
| 0.418 | −0.529 | 7.120 |
| 0.416 | −0.527 | 7.120 |
| 0.415 | −0.525 | 7.120 |
| 0.413 | −0.523 | 7.120 |
| 0.412 | −0.521 | 7.120 |
| 0.410 | −0.519 | 7.120 |
| 0.402 | −0.509 | 7.120 |
| 0.394 | −0.499 | 7.120 |
| 0.385 | −0.489 | 7.120 |
| 0.377 | −0.479 | 7.120 |
| 0.369 | −0.470 | 7.120 |
| 0.360 | −0.460 | 7.120 |
| 0.351 | −0.451 | 7.120 |
| 0.343 | −0.441 | 7.120 |
| 0.334 | −0.432 | 7.120 |
| 0.325 | −0.422 | 7.120 |
| 0.316 | −0.413 | 7.120 |
| 0.307 | −0.404 | 7.120 |
| 0.298 | −0.395 | 7.120 |
| 0.289 | −0.386 | 7.120 |
| 0.279 | −0.377 | 7.120 |
| 0.270 | −0.368 | 7.120 |
| 0.260 | −0.360 | 7.120 |
| 0.251 | −0.351 | 7.120 |
| 0.241 | −0.342 | 7.120 |
| 0.232 | −0.333 | 7.120 |
| 0.223 | −0.324 | 7.120 |
| 0.214 | −0.315 | 7.120 |
| 0.205 | −0.306 | 7.120 |
| 0.195 | −0.297 | 7.120 |
| 0.186 | −0.288 | 7.120 |
| 0.177 | −0.279 | 7.120 |
| 0.167 | −0.271 | 7.120 |
| 0.158 | −0.262 | 7.120 |
| 0.149 | −0.253 | 7.120 |
| 0.139 | −0.244 | 7.120 |
| 0.130 | −0.235 | 7.120 |
| 0.120 | −0.227 | 7.120 |
| 0.111 | −0.218 | 7.120 |
| 0.101 | −0.209 | 7.120 |
| 0.092 | −0.201 | 7.120 |
| 0.082 | −0.192 | 7.120 |
| 0.073 | −0.183 | 7.120 |
| 0.063 | −0.175 | 7.120 |
| 0.054 | −0.166 | 7.120 |
| 0.044 | −0.157 | 7.120 |
| 0.034 | −0.149 | 7.120 |
| 0.025 | −0.140 | 7.120 |
| 0.015 | −0.132 | 7.120 |
| 0.005 | −0.123 | 7.120 |
| −0.004 | −0.115 | 7.120 |
| −0.014 | −0.106 | 7.120 |
| −0.024 | −0.098 | 7.120 |

TABLE 2-continued

|  | X | Y | Z |
|---|---|---|---|
|  | −0.034 | −0.090 | 7.120 |
|  | −0.043 | −0.081 | 7.120 |
|  | −0.053 | −0.073 | 7.120 |
|  | −0.063 | −0.065 | 7.120 |
|  | −0.073 | −0.056 | 7.120 |
|  | −0.083 | −0.048 | 7.120 |
|  | −0.093 | −0.040 | 7.120 |
|  | −0.103 | −0.032 | 7.120 |
|  | −0.113 | −0.024 | 7.120 |
|  | −0.123 | −0.016 | 7.120 |
|  | −0.133 | −0.008 | 7.120 |
|  | −0.143 | 0.000 | 7.120 |
|  | −0.153 | 0.008 | 7.120 |
|  | −0.163 | 0.016 | 7.120 |
|  | −0.173 | 0.024 | 7.120 |
|  | −0.184 | 0.032 | 7.120 |
|  | −0.194 | 0.040 | 7.120 |
|  | −0.204 | 0.047 | 7.120 |
|  | −0.215 | 0.055 | 7.120 |
|  | −0.225 | 0.062 | 7.120 |
|  | −0.236 | 0.070 | 7.120 |
|  | −0.246 | 0.077 | 7.120 |
|  | −0.257 | 0.084 | 7.120 |
|  | −0.268 | 0.092 | 7.120 |
|  | −0.278 | 0.099 | 7.120 |
|  | −0.289 | 0.106 | 7.120 |
|  | −0.300 | 0.112 | 7.120 |
|  | −0.311 | 0.119 | 7.120 |
|  | −0.323 | 0.125 | 7.120 |
|  | −0.334 | 0.131 | 7.120 |
|  | −0.346 | 0.136 | 7.120 |
|  | −0.358 | 0.141 | 7.120 |
|  | −0.360 | 0.142 | 7.120 |
|  | −0.363 | 0.142 | 7.120 |
|  | −0.365 | 0.143 | 7.120 |
|  | −0.368 | 0.144 | 7.120 |
|  | −0.370 | 0.145 | 7.120 |
|  | −0.372 | 0.146 | 7.120 |
|  | −0.375 | 0.146 | 7.120 |
|  | −0.377 | 0.147 | 7.120 |
|  | −0.380 | 0.148 | 7.120 |
|  | −0.382 | 0.148 | 7.120 |
|  | −0.390 | 0.150 | 7.120 |
|  | −0.397 | 0.152 | 7.120 |
|  | −0.404 | 0.155 | 7.120 |
|  | −0.410 | 0.159 | 7.120 |
|  | −0.416 | 0.163 | 7.120 |
|  | −0.422 | 0.168 | 7.120 |
|  | −0.426 | 0.173 | 7.120 |
|  | −0.431 | 0.180 | 7.120 |
|  | −0.434 | 0.186 | 7.120 |
|  | −0.436 | 0.193 | 7.120 |
|  | −0.438 | 0.200 | 7.120 |
|  | −0.439 | 0.208 | 7.120 |
|  | −0.439 | 0.215 | 7.120 |
|  | −0.438 | 0.223 | 7.120 |
|  | −0.436 | 0.230 | 7.120 |
|  | −0.434 | 0.237 | 7.120 |
|  | −0.431 | 0.244 | 7.120 |
|  | −0.428 | 0.250 | 7.120 |
| SECTION 9 | −0.408 | 0.317 | 7.312 |
|  | −0.407 | 0.320 | 7.312 |
|  | −0.405 | 0.323 | 7.312 |
|  | −0.403 | 0.325 | 7.312 |
|  | −0.401 | 0.328 | 7.312 |
|  | −0.399 | 0.330 | 7.312 |
|  | −0.397 | 0.332 | 7.312 |
|  | −0.394 | 0.335 | 7.312 |
|  | −0.392 | 0.337 | 7.312 |
|  | −0.390 | 0.339 | 7.312 |
|  | −0.388 | 0.342 | 7.312 |
|  | −0.375 | 0.352 | 7.312 |
|  | −0.362 | 0.361 | 7.312 |
|  | −0.348 | 0.368 | 7.312 |
|  | −0.333 | 0.374 | 7.312 |
|  | −0.317 | 0.378 | 7.312 |
|  | −0.302 | 0.381 | 7.312 |
|  | −0.286 | 0.382 | 7.312 |

TABLE 2-continued

| X | Y | Z |
|---|---|---|
| −0.270 | 0.382 | 7.312 |
| −0.254 | 0.381 | 7.312 |
| −0.238 | 0.378 | 7.312 |
| −0.222 | 0.374 | 7.312 |
| −0.207 | 0.369 | 7.312 |
| −0.192 | 0.364 | 7.312 |
| −0.177 | 0.357 | 7.312 |
| −0.163 | 0.350 | 7.312 |
| −0.149 | 0.342 | 7.312 |
| −0.135 | 0.334 | 7.312 |
| −0.122 | 0.325 | 7.312 |
| −0.109 | 0.315 | 7.312 |
| −0.097 | 0.306 | 7.312 |
| −0.084 | 0.295 | 7.312 |
| −0.072 | 0.285 | 7.312 |
| −0.060 | 0.274 | 7.312 |
| −0.049 | 0.263 | 7.312 |
| −0.038 | 0.252 | 7.312 |
| −0.026 | 0.240 | 7.312 |
| −0.016 | 0.228 | 7.312 |
| −0.005 | 0.216 | 7.312 |
| 0.006 | 0.204 | 7.312 |
| 0.016 | 0.192 | 7.312 |
| 0.026 | 0.180 | 7.312 |
| 0.036 | 0.167 | 7.312 |
| 0.046 | 0.155 | 7.312 |
| 0.056 | 0.142 | 7.312 |
| 0.065 | 0.129 | 7.312 |
| 0.075 | 0.116 | 7.312 |
| 0.084 | 0.103 | 7.312 |
| 0.094 | 0.090 | 7.312 |
| 0.103 | 0.077 | 7.312 |
| 0.112 | 0.064 | 7.312 |
| 0.121 | 0.051 | 7.312 |
| 0.130 | 0.038 | 7.312 |
| 0.139 | 0.024 | 7.312 |
| 0.148 | 0.011 | 7.312 |
| 0.157 | −0.002 | 7.312 |
| 0.165 | −0.016 | 7.312 |
| 0.174 | −0.029 | 7.312 |
| 0.182 | −0.043 | 7.312 |
| 0.191 | −0.057 | 7.312 |
| 0.199 | −0.070 | 7.312 |
| 0.207 | −0.084 | 7.312 |
| 0.215 | −0.098 | 7.312 |
| 0.223 | −0.112 | 7.312 |
| 0.231 | −0.126 | 7.312 |
| 0.239 | −0.140 | 7.312 |
| 0.247 | −0.153 | 7.312 |
| 0.255 | −0.167 | 7.312 |
| 0.263 | −0.181 | 7.312 |
| 0.271 | −0.195 | 7.312 |
| 0.278 | −0.209 | 7.312 |
| 0.286 | −0.224 | 7.312 |
| 0.294 | −0.238 | 7.312 |
| 0.301 | −0.252 | 7.312 |
| 0.309 | −0.266 | 7.312 |
| 0.317 | −0.280 | 7.312 |
| 0.324 | −0.294 | 7.312 |
| 0.332 | −0.308 | 7.312 |
| 0.339 | −0.322 | 7.312 |
| 0.347 | −0.336 | 7.312 |
| 0.354 | −0.350 | 7.312 |
| 0.362 | −0.365 | 7.312 |
| 0.369 | −0.379 | 7.312 |
| 0.376 | −0.393 | 7.312 |
| 0.382 | −0.408 | 7.312 |
| 0.389 | −0.423 | 7.312 |
| 0.396 | −0.437 | 7.312 |
| 0.402 | −0.452 | 7.312 |
| 0.409 | −0.466 | 7.312 |
| 0.416 | −0.481 | 7.312 |
| 0.418 | −0.483 | 7.312 |
| 0.419 | −0.486 | 7.312 |
| 0.420 | −0.489 | 7.312 |
| 0.422 | −0.492 | 7.312 |
| 0.423 | −0.495 | 7.312 |
| 0.424 | −0.498 | 7.312 |

TABLE 2-continued

| X | Y | Z |
|---|---|---|
| 0.425 | −0.501 | 7.312 |
| 0.426 | −0.504 | 7.312 |
| 0.428 | −0.507 | 7.312 |
| 0.429 | −0.510 | 7.312 |
| 0.430 | −0.512 | 7.312 |
| 0.431 | −0.515 | 7.312 |
| 0.431 | −0.518 | 7.312 |
| 0.431 | −0.521 | 7.312 |
| 0.430 | −0.523 | 7.312 |
| 0.429 | −0.526 | 7.312 |
| 0.428 | −0.528 | 7.312 |
| 0.426 | −0.530 | 7.312 |
| 0.424 | −0.532 | 7.312 |
| 0.421 | −0.534 | 7.312 |
| 0.419 | −0.535 | 7.312 |
| 0.416 | −0.535 | 7.312 |
| 0.414 | −0.536 | 7.312 |
| 0.411 | −0.536 | 7.312 |
| 0.408 | −0.535 | 7.312 |
| 0.405 | −0.534 | 7.312 |
| 0.403 | −0.533 | 7.312 |
| 0.401 | −0.531 | 7.312 |
| 0.399 | −0.529 | 7.312 |
| 0.397 | −0.527 | 7.312 |
| 0.395 | −0.525 | 7.312 |
| 0.394 | −0.523 | 7.312 |
| 0.392 | −0.521 | 7.312 |
| 0.391 | −0.519 | 7.312 |
| 0.389 | −0.517 | 7.312 |
| 0.388 | −0.515 | 7.312 |
| 0.386 | −0.513 | 7.312 |
| 0.384 | −0.511 | 7.312 |
| 0.383 | −0.509 | 7.312 |
| 0.375 | −0.498 | 7.312 |
| 0.366 | −0.488 | 7.312 |
| 0.358 | −0.478 | 7.312 |
| 0.350 | −0.468 | 7.312 |
| 0.341 | −0.458 | 7.312 |
| 0.333 | −0.448 | 7.312 |
| 0.324 | −0.438 | 7.312 |
| 0.316 | −0.428 | 7.312 |
| 0.307 | −0.419 | 7.312 |
| 0.298 | −0.409 | 7.312 |
| 0.289 | −0.399 | 7.312 |
| 0.280 | −0.390 | 7.312 |
| 0.271 | −0.381 | 7.312 |
| 0.262 | −0.371 | 7.312 |
| 0.253 | −0.362 | 7.312 |
| 0.243 | −0.353 | 7.312 |
| 0.234 | −0.344 | 7.312 |
| 0.225 | −0.334 | 7.312 |
| 0.216 | −0.325 | 7.312 |
| 0.207 | −0.315 | 7.312 |
| 0.198 | −0.306 | 7.312 |
| 0.189 | −0.296 | 7.312 |
| 0.180 | −0.287 | 7.312 |
| 0.171 | −0.277 | 7.312 |
| 0.162 | −0.268 | 7.312 |
| 0.153 | −0.259 | 7.312 |
| 0.144 | −0.249 | 7.312 |
| 0.135 | −0.240 | 7.312 |
| 0.126 | −0.230 | 7.312 |
| 0.116 | −0.221 | 7.312 |
| 0.107 | −0.212 | 7.312 |
| 0.098 | −0.202 | 7.312 |
| 0.089 | −0.193 | 7.312 |
| 0.080 | −0.184 | 7.312 |
| 0.071 | −0.174 | 7.312 |
| 0.062 | −0.165 | 7.312 |
| 0.052 | −0.156 | 7.312 |
| 0.043 | −0.146 | 7.312 |
| 0.034 | −0.137 | 7.312 |
| 0.025 | −0.128 | 7.312 |
| 0.016 | −0.118 | 7.312 |
| 0.006 | −0.109 | 7.312 |
| −0.003 | −0.100 | 7.312 |
| −0.012 | −0.091 | 7.312 |
| −0.021 | −0.082 | 7.312 |

TABLE 2-continued

| | X | Y | Z |
|---|---|---|---|
| | −0.031 | −0.072 | 7.312 |
| | −0.040 | −0.063 | 7.312 |
| | −0.049 | −0.054 | 7.312 |
| | −0.059 | −0.045 | 7.312 |
| | −0.068 | −0.036 | 7.312 |
| | −0.077 | −0.027 | 7.312 |
| | −0.087 | −0.018 | 7.312 |
| | −0.096 | −0.008 | 7.312 |
| | −0.106 | 0.001 | 7.312 |
| | −0.115 | 0.010 | 7.312 |
| | −0.125 | 0.019 | 7.312 |
| | −0.134 | 0.028 | 7.312 |
| | −0.144 | 0.037 | 7.312 |
| | −0.153 | 0.046 | 7.312 |
| | −0.163 | 0.055 | 7.312 |
| | −0.172 | 0.064 | 7.312 |
| | −0.182 | 0.072 | 7.312 |
| | −0.191 | 0.081 | 7.312 |
| | −0.201 | 0.090 | 7.312 |
| | −0.211 | 0.099 | 7.312 |
| | −0.221 | 0.107 | 7.312 |
| | −0.230 | 0.116 | 7.312 |
| | −0.240 | 0.125 | 7.312 |
| | −0.250 | 0.133 | 7.312 |
| | −0.260 | 0.142 | 7.312 |
| | −0.270 | 0.150 | 7.312 |
| | −0.280 | 0.159 | 7.312 |
| | −0.290 | 0.167 | 7.312 |
| | −0.300 | 0.175 | 7.312 |
| | −0.311 | 0.183 | 7.312 |
| | −0.321 | 0.190 | 7.312 |
| | −0.332 | 0.198 | 7.312 |
| | −0.344 | 0.204 | 7.312 |
| | −0.355 | 0.211 | 7.312 |
| | −0.357 | 0.212 | 7.312 |
| | −0.360 | 0.213 | 7.312 |
| | −0.362 | 0.215 | 7.312 |
| | −0.364 | 0.216 | 7.312 |
| | −0.367 | 0.217 | 7.312 |
| | −0.369 | 0.218 | 7.312 |
| | −0.371 | 0.219 | 7.312 |
| | −0.374 | 0.220 | 7.312 |
| | −0.376 | 0.221 | 7.312 |
| | −0.378 | 0.222 | 7.312 |
| | −0.384 | 0.224 | 7.312 |
| | −0.390 | 0.226 | 7.312 |
| | −0.396 | 0.229 | 7.312 |
| | −0.401 | 0.232 | 7.312 |
| | −0.406 | 0.237 | 7.312 |
| | −0.411 | 0.241 | 7.312 |
| | −0.414 | 0.246 | 7.312 |
| | −0.418 | 0.252 | 7.312 |
| | −0.420 | 0.258 | 7.312 |
| | −0.422 | 0.264 | 7.312 |
| | −0.423 | 0.270 | 7.312 |
| | −0.423 | 0.276 | 7.312 |
| | −0.422 | 0.282 | 7.312 |
| | −0.421 | 0.289 | 7.312 |
| | −0.420 | 0.295 | 7.312 |
| | −0.418 | 0.301 | 7.312 |
| | −0.415 | 0.307 | 7.312 |
| | −0.412 | 0.312 | 7.312 |
| SECTION 10 | −0.394 | 0.382 | 7.504 |
| | −0.393 | 0.384 | 7.504 |
| | −0.391 | 0.387 | 7.504 |
| | −0.389 | 0.389 | 7.504 |
| | −0.387 | 0.392 | 7.504 |
| | −0.384 | 0.394 | 7.504 |
| | −0.382 | 0.396 | 7.504 |
| | −0.380 | 0.398 | 7.504 |
| | −0.378 | 0.401 | 7.504 |
| | −0.375 | 0.403 | 7.504 |
| | −0.373 | 0.405 | 7.504 |
| | −0.360 | 0.414 | 7.504 |
| | −0.346 | 0.421 | 7.504 |
| | −0.331 | 0.427 | 7.504 |
| | −0.316 | 0.431 | 7.504 |
| | −0.301 | 0.433 | 7.504 |

TABLE 2-continued

| X | Y | Z |
|---|---|---|
| −0.285 | 0.433 | 7.504 |
| −0.269 | 0.431 | 7.504 |
| −0.254 | 0.428 | 7.504 |
| −0.239 | 0.423 | 7.504 |
| −0.224 | 0.417 | 7.504 |
| −0.210 | 0.411 | 7.504 |
| −0.196 | 0.403 | 7.504 |
| −0.182 | 0.395 | 7.504 |
| −0.169 | 0.386 | 7.504 |
| −0.156 | 0.377 | 7.504 |
| −0.144 | 0.367 | 7.504 |
| −0.132 | 0.357 | 7.504 |
| −0.120 | 0.346 | 7.504 |
| −0.109 | 0.336 | 7.504 |
| −0.098 | 0.325 | 7.504 |
| −0.087 | 0.313 | 7.504 |
| −0.076 | 0.302 | 7.504 |
| −0.065 | 0.290 | 7.504 |
| −0.055 | 0.278 | 7.504 |
| −0.045 | 0.266 | 7.504 |
| −0.035 | 0.254 | 7.504 |
| −0.025 | 0.241 | 7.504 |
| −0.016 | 0.229 | 7.504 |
| −0.006 | 0.216 | 7.504 |
| 0.003 | 0.203 | 7.504 |
| 0.012 | 0.191 | 7.504 |
| 0.022 | 0.178 | 7.504 |
| 0.031 | 0.165 | 7.504 |
| 0.039 | 0.152 | 7.504 |
| 0.048 | 0.139 | 7.504 |
| 0.057 | 0.126 | 7.504 |
| 0.066 | 0.112 | 7.504 |
| 0.074 | 0.099 | 7.504 |
| 0.083 | 0.086 | 7.504 |
| 0.091 | 0.073 | 7.504 |
| 0.100 | 0.059 | 7.504 |
| 0.108 | 0.046 | 7.504 |
| 0.116 | 0.033 | 7.504 |
| 0.125 | 0.019 | 7.504 |
| 0.133 | 0.006 | 7.504 |
| 0.141 | −0.008 | 7.504 |
| 0.149 | −0.022 | 7.504 |
| 0.157 | −0.035 | 7.504 |
| 0.165 | −0.049 | 7.504 |
| 0.173 | −0.062 | 7.504 |
| 0.181 | −0.076 | 7.504 |
| 0.188 | −0.090 | 7.504 |
| 0.196 | −0.103 | 7.504 |
| 0.204 | −0.117 | 7.504 |
| 0.212 | −0.131 | 7.504 |
| 0.219 | −0.145 | 7.504 |
| 0.227 | −0.158 | 7.504 |
| 0.235 | −0.172 | 7.504 |
| 0.242 | −0.186 | 7.504 |
| 0.250 | −0.200 | 7.504 |
| 0.257 | −0.214 | 7.504 |
| 0.265 | −0.228 | 7.504 |
| 0.272 | −0.242 | 7.504 |
| 0.280 | −0.255 | 7.504 |
| 0.287 | −0.269 | 7.504 |
| 0.294 | −0.283 | 7.504 |
| 0.302 | −0.297 | 7.504 |
| 0.309 | −0.311 | 7.504 |
| 0.317 | −0.325 | 7.504 |
| 0.324 | −0.339 | 7.504 |
| 0.331 | −0.353 | 7.504 |
| 0.338 | −0.367 | 7.504 |
| 0.345 | −0.381 | 7.504 |
| 0.352 | −0.396 | 7.504 |
| 0.358 | −0.410 | 7.504 |
| 0.365 | −0.424 | 7.504 |
| 0.371 | −0.439 | 7.504 |
| 0.378 | −0.453 | 7.504 |
| 0.385 | −0.467 | 7.504 |
| 0.386 | −0.470 | 7.504 |
| 0.387 | −0.473 | 7.504 |
| 0.388 | −0.476 | 7.504 |
| 0.390 | −0.479 | 7.504 |
| 0.391 | −0.482 | 7.504 |
| 0.392 | −0.485 | 7.504 |
| 0.393 | −0.488 | 7.504 |
| 0.394 | −0.490 | 7.504 |
| 0.396 | −0.493 | 7.504 |
| 0.397 | −0.496 | 7.504 |
| 0.398 | −0.499 | 7.504 |
| 0.399 | −0.502 | 7.504 |
| 0.399 | −0.504 | 7.504 |
| 0.399 | −0.507 | 7.504 |
| 0.398 | −0.510 | 7.504 |
| 0.397 | −0.512 | 7.504 |
| 0.396 | −0.515 | 7.504 |
| 0.394 | −0.517 | 7.504 |
| 0.392 | −0.519 | 7.504 |
| 0.389 | −0.520 | 7.504 |
| 0.387 | −0.521 | 7.504 |
| 0.384 | −0.522 | 7.504 |
| 0.381 | −0.522 | 7.504 |
| 0.378 | −0.522 | 7.504 |
| 0.376 | −0.522 | 7.504 |
| 0.373 | −0.521 | 7.504 |
| 0.371 | −0.520 | 7.504 |
| 0.368 | −0.518 | 7.504 |
| 0.366 | −0.516 | 7.504 |
| 0.365 | −0.514 | 7.504 |
| 0.363 | −0.512 | 7.504 |
| 0.361 | −0.510 | 7.504 |
| 0.360 | −0.507 | 7.504 |
| 0.358 | −0.505 | 7.504 |
| 0.357 | −0.503 | 7.504 |
| 0.355 | −0.501 | 7.504 |
| 0.353 | −0.499 | 7.504 |
| 0.352 | −0.497 | 7.504 |
| 0.350 | −0.495 | 7.504 |
| 0.342 | −0.484 | 7.504 |
| 0.334 | −0.474 | 7.504 |
| 0.325 | −0.463 | 7.504 |
| 0.317 | −0.453 | 7.504 |
| 0.309 | −0.442 | 7.504 |
| 0.300 | −0.432 | 7.504 |
| 0.292 | −0.422 | 7.504 |
| 0.283 | −0.411 | 7.504 |
| 0.275 | −0.401 | 7.504 |
| 0.266 | −0.391 | 7.504 |
| 0.257 | −0.381 | 7.504 |
| 0.248 | −0.371 | 7.504 |
| 0.239 | −0.361 | 7.504 |
| 0.230 | −0.351 | 7.504 |
| 0.221 | −0.341 | 7.504 |
| 0.212 | −0.331 | 7.504 |
| 0.204 | −0.321 | 7.504 |
| 0.195 | −0.311 | 7.504 |
| 0.186 | −0.301 | 7.504 |
| 0.177 | −0.291 | 7.504 |
| 0.169 | −0.281 | 7.504 |
| 0.160 | −0.271 | 7.504 |
| 0.151 | −0.261 | 7.504 |
| 0.142 | −0.251 | 7.504 |
| 0.134 | −0.241 | 7.504 |
| 0.125 | −0.231 | 7.504 |
| 0.116 | −0.220 | 7.504 |
| 0.107 | −0.210 | 7.504 |
| 0.099 | −0.200 | 7.504 |
| 0.090 | −0.190 | 7.504 |
| 0.081 | −0.180 | 7.504 |
| 0.072 | −0.170 | 7.504 |
| 0.064 | −0.160 | 7.504 |
| 0.055 | −0.150 | 7.504 |
| 0.046 | −0.140 | 7.504 |
| 0.037 | −0.130 | 7.504 |
| 0.028 | −0.120 | 7.504 |
| 0.020 | −0.110 | 7.504 |
| 0.011 | −0.100 | 7.504 |
| 0.002 | −0.090 | 7.504 |
| −0.007 | −0.080 | 7.504 |
| −0.016 | −0.070 | 7.504 |
| −0.024 | −0.060 | 7.504 |

TABLE 2-continued

|  | X | Y | Z |
|---|---|---|---|
|  | −0.033 | −0.050 | 7.504 |
|  | −0.042 | −0.040 | 7.504 |
|  | −0.051 | −0.030 | 7.504 |
|  | −0.060 | −0.020 | 7.504 |
|  | −0.069 | −0.010 | 7.504 |
|  | −0.077 | 0.000 | 7.504 |
|  | −0.086 | 0.010 | 7.504 |
|  | −0.095 | 0.020 | 7.504 |
|  | −0.104 | 0.030 | 7.504 |
|  | −0.113 | 0.040 | 7.504 |
|  | −0.122 | 0.050 | 7.504 |
|  | −0.131 | 0.060 | 7.504 |
|  | −0.140 | 0.070 | 7.504 |
|  | −0.149 | 0.080 | 7.504 |
|  | −0.158 | 0.090 | 7.504 |
|  | −0.167 | 0.100 | 7.504 |
|  | −0.175 | 0.110 | 7.504 |
|  | −0.184 | 0.120 | 7.504 |
|  | −0.193 | 0.130 | 7.504 |
|  | −0.203 | 0.139 | 7.504 |
|  | −0.212 | 0.149 | 7.504 |
|  | −0.221 | 0.159 | 7.504 |
|  | −0.230 | 0.169 | 7.504 |
|  | −0.239 | 0.179 | 7.504 |
|  | −0.248 | 0.188 | 7.504 |
|  | −0.257 | 0.198 | 7.504 |
|  | −0.266 | 0.208 | 7.504 |
|  | −0.276 | 0.217 | 7.504 |
|  | −0.285 | 0.227 | 7.504 |
|  | −0.294 | 0.236 | 7.504 |
|  | −0.304 | 0.246 | 7.504 |
|  | −0.313 | 0.255 | 7.504 |
|  | −0.323 | 0.264 | 7.504 |
|  | −0.333 | 0.273 | 7.504 |
|  | −0.343 | 0.282 | 7.504 |
|  | −0.354 | 0.290 | 7.504 |
|  | −0.356 | 0.291 | 7.504 |
|  | −0.358 | 0.293 | 7.504 |
|  | −0.361 | 0.294 | 7.504 |
|  | −0.363 | 0.296 | 7.504 |
|  | −0.365 | 0.297 | 7.504 |
|  | −0.367 | 0.299 | 7.504 |
|  | −0.370 | 0.300 | 7.504 |
|  | −0.372 | 0.301 | 7.504 |
|  | −0.374 | 0.303 | 7.504 |
|  | −0.377 | 0.304 | 7.504 |
|  | −0.381 | 0.306 | 7.504 |
|  | −0.386 | 0.308 | 7.504 |
|  | −0.390 | 0.311 | 7.504 |
|  | −0.394 | 0.314 | 7.504 |
|  | −0.397 | 0.317 | 7.504 |
|  | −0.400 | 0.321 | 7.504 |
|  | −0.403 | 0.326 | 7.504 |
|  | −0.405 | 0.330 | 7.504 |
|  | −0.406 | 0.335 | 7.504 |
|  | −0.407 | 0.340 | 7.504 |
|  | −0.407 | 0.345 | 7.504 |
|  | −0.407 | 0.350 | 7.504 |
|  | −0.406 | 0.355 | 7.504 |
|  | −0.405 | 0.359 | 7.504 |
|  | −0.404 | 0.364 | 7.504 |
|  | −0.402 | 0.369 | 7.504 |
|  | −0.400 | 0.373 | 7.504 |
|  | −0.397 | 0.378 | 7.504 |
| SECTION 11 | −0.363 | 0.435 | 7.696 |
|  | −0.361 | 0.437 | 7.696 |
|  | −0.359 | 0.439 | 7.696 |
|  | −0.357 | 0.441 | 7.696 |
|  | −0.354 | 0.443 | 7.696 |
|  | −0.352 | 0.445 | 7.696 |
|  | −0.349 | 0.446 | 7.696 |
|  | −0.346 | 0.448 | 7.696 |
|  | −0.344 | 0.449 | 7.696 |
|  | −0.341 | 0.451 | 7.696 |
|  | −0.338 | 0.452 | 7.696 |
|  | −0.324 | 0.458 | 7.696 |
|  | −0.310 | 0.461 | 7.696 |
|  | −0.295 | 0.461 | 7.696 |

TABLE 2-continued

| X | Y | Z |
|---|---|---|
| −0.280 | 0.460 | 7.696 |
| −0.265 | 0.457 | 7.696 |
| −0.250 | 0.453 | 7.696 |
| −0.237 | 0.447 | 7.696 |
| −0.223 | 0.440 | 7.696 |
| −0.210 | 0.432 | 7.696 |
| −0.198 | 0.424 | 7.696 |
| −0.186 | 0.415 | 7.696 |
| −0.174 | 0.405 | 7.696 |
| −0.163 | 0.395 | 7.696 |
| −0.152 | 0.385 | 7.696 |
| −0.141 | 0.374 | 7.696 |
| −0.131 | 0.363 | 7.696 |
| −0.121 | 0.352 | 7.696 |
| −0.111 | 0.340 | 7.696 |
| −0.101 | 0.329 | 7.696 |
| −0.092 | 0.317 | 7.696 |
| −0.083 | 0.305 | 7.696 |
| −0.073 | 0.293 | 7.696 |
| −0.064 | 0.281 | 7.696 |
| −0.056 | 0.269 | 7.696 |
| −0.047 | 0.257 | 7.696 |
| −0.038 | 0.244 | 7.696 |
| −0.030 | 0.232 | 7.696 |
| −0.021 | 0.219 | 7.696 |
| −0.013 | 0.207 | 7.696 |
| −0.005 | 0.194 | 7.696 |
| 0.003 | 0.181 | 7.696 |
| 0.011 | 0.169 | 7.696 |
| 0.019 | 0.156 | 7.696 |
| 0.027 | 0.143 | 7.696 |
| 0.035 | 0.130 | 7.696 |
| 0.043 | 0.117 | 7.696 |
| 0.051 | 0.104 | 7.696 |
| 0.058 | 0.091 | 7.696 |
| 0.066 | 0.078 | 7.696 |
| 0.074 | 0.065 | 7.696 |
| 0.081 | 0.052 | 7.696 |
| 0.089 | 0.039 | 7.696 |
| 0.096 | 0.026 | 7.696 |
| 0.104 | 0.013 | 7.696 |
| 0.111 | 0.000 | 7.696 |
| 0.119 | −0.013 | 7.696 |
| 0.126 | −0.026 | 7.696 |
| 0.133 | −0.039 | 7.696 |
| 0.141 | −0.052 | 7.696 |
| 0.148 | −0.066 | 7.696 |
| 0.156 | −0.079 | 7.696 |
| 0.163 | −0.092 | 7.696 |
| 0.170 | −0.105 | 7.696 |
| 0.178 | −0.118 | 7.696 |
| 0.185 | −0.132 | 7.696 |
| 0.192 | −0.145 | 7.696 |
| 0.199 | −0.158 | 7.696 |
| 0.207 | −0.171 | 7.696 |
| 0.214 | −0.184 | 7.696 |
| 0.221 | −0.198 | 7.696 |
| 0.228 | −0.211 | 7.696 |
| 0.235 | −0.224 | 7.696 |
| 0.242 | −0.238 | 7.696 |
| 0.249 | −0.251 | 7.696 |
| 0.257 | −0.264 | 7.696 |
| 0.264 | −0.277 | 7.696 |
| 0.271 | −0.291 | 7.696 |
| 0.278 | −0.304 | 7.696 |
| 0.285 | −0.317 | 7.696 |
| 0.292 | −0.331 | 7.696 |
| 0.299 | −0.344 | 7.696 |
| 0.305 | −0.358 | 7.696 |
| 0.312 | −0.371 | 7.696 |
| 0.318 | −0.385 | 7.696 |
| 0.324 | −0.399 | 7.696 |
| 0.331 | −0.412 | 7.696 |
| 0.337 | −0.426 | 7.696 |
| 0.343 | −0.440 | 7.696 |
| 0.350 | −0.453 | 7.696 |
| 0.351 | −0.456 | 7.696 |
| 0.352 | −0.459 | 7.696 |

TABLE 2-continued

| X | Y | Z |
|---|---|---|
| 0.354 | −0.462 | 7.696 |
| 0.355 | −0.464 | 7.696 |
| 0.356 | −0.467 | 7.696 |
| 0.357 | −0.470 | 7.696 |
| 0.358 | −0.473 | 7.696 |
| 0.359 | −0.476 | 7.696 |
| 0.361 | −0.478 | 7.696 |
| 0.362 | −0.481 | 7.696 |
| 0.363 | −0.484 | 7.696 |
| 0.364 | −0.486 | 7.696 |
| 0.364 | −0.489 | 7.696 |
| 0.364 | −0.492 | 7.696 |
| 0.363 | −0.495 | 7.696 |
| 0.362 | −0.498 | 7.696 |
| 0.360 | −0.500 | 7.696 |
| 0.358 | −0.502 | 7.696 |
| 0.356 | −0.504 | 7.696 |
| 0.354 | −0.506 | 7.696 |
| 0.351 | −0.507 | 7.696 |
| 0.348 | −0.508 | 7.696 |
| 0.345 | −0.508 | 7.696 |
| 0.343 | −0.508 | 7.696 |
| 0.340 | −0.507 | 7.696 |
| 0.337 | −0.506 | 7.696 |
| 0.334 | −0.505 | 7.696 |
| 0.332 | −0.504 | 7.696 |
| 0.330 | −0.501 | 7.696 |
| 0.328 | −0.499 | 7.696 |
| 0.327 | −0.497 | 7.696 |
| 0.325 | −0.495 | 7.696 |
| 0.323 | −0.493 | 7.696 |
| 0.322 | −0.491 | 7.696 |
| 0.320 | −0.489 | 7.696 |
| 0.319 | −0.486 | 7.696 |
| 0.317 | −0.484 | 7.696 |
| 0.315 | −0.482 | 7.696 |
| 0.314 | −0.480 | 7.696 |
| 0.306 | −0.469 | 7.696 |
| 0.297 | −0.459 | 7.696 |
| 0.289 | −0.448 | 7.696 |
| 0.281 | −0.437 | 7.696 |
| 0.273 | −0.427 | 7.696 |
| 0.265 | −0.416 | 7.696 |
| 0.256 | −0.405 | 7.696 |
| 0.248 | −0.395 | 7.696 |
| 0.240 | −0.384 | 7.696 |
| 0.231 | −0.374 | 7.696 |
| 0.223 | −0.364 | 7.696 |
| 0.214 | −0.353 | 7.696 |
| 0.205 | −0.343 | 7.696 |
| 0.196 | −0.333 | 7.696 |
| 0.187 | −0.323 | 7.696 |
| 0.179 | −0.313 | 7.696 |
| 0.170 | −0.303 | 7.696 |
| 0.161 | −0.292 | 7.696 |
| 0.153 | −0.282 | 7.696 |
| 0.145 | −0.271 | 7.696 |
| 0.136 | −0.261 | 7.696 |
| 0.128 | −0.250 | 7.696 |
| 0.120 | −0.240 | 7.696 |
| 0.111 | −0.229 | 7.696 |
| 0.103 | −0.219 | 7.696 |
| 0.094 | −0.208 | 7.696 |
| 0.086 | −0.198 | 7.696 |
| 0.077 | −0.187 | 7.696 |
| 0.069 | −0.177 | 7.696 |
| 0.061 | −0.167 | 7.696 |
| 0.052 | −0.156 | 7.696 |
| 0.044 | −0.146 | 7.696 |
| 0.035 | −0.135 | 7.696 |
| 0.027 | −0.125 | 7.696 |
| 0.019 | −0.114 | 7.696 |
| 0.010 | −0.104 | 7.696 |
| 0.002 | −0.093 | 7.696 |
| −0.007 | −0.083 | 7.696 |
| −0.015 | −0.072 | 7.696 |
| −0.023 | −0.062 | 7.696 |
| −0.032 | −0.051 | 7.696 |

TABLE 2-continued

| | X | Y | Z |
|---|---|---|---|
| | −0.040 | −0.041 | 7.696 |
| | −0.048 | −0.030 | 7.696 |
| | −0.057 | −0.020 | 7.696 |
| | −0.065 | −0.009 | 7.696 |
| | −0.073 | 0.001 | 7.696 |
| | −0.082 | 0.012 | 7.696 |
| | −0.090 | 0.022 | 7.696 |
| | −0.099 | 0.033 | 7.696 |
| | −0.107 | 0.043 | 7.696 |
| | −0.115 | 0.054 | 7.696 |
| | −0.124 | 0.065 | 7.696 |
| | −0.132 | 0.075 | 7.696 |
| | −0.140 | 0.086 | 7.696 |
| | −0.148 | 0.096 | 7.696 |
| | −0.157 | 0.107 | 7.696 |
| | −0.165 | 0.117 | 7.696 |
| | −0.173 | 0.128 | 7.696 |
| | −0.182 | 0.138 | 7.696 |
| | −0.190 | 0.149 | 7.696 |
| | −0.198 | 0.160 | 7.696 |
| | −0.207 | 0.170 | 7.696 |
| | −0.215 | 0.181 | 7.696 |
| | −0.223 | 0.191 | 7.696 |
| | −0.232 | 0.202 | 7.696 |
| | −0.240 | 0.212 | 7.696 |
| | −0.248 | 0.223 | 7.696 |
| | −0.257 | 0.233 | 7.696 |
| | −0.265 | 0.244 | 7.696 |
| | −0.273 | 0.254 | 7.696 |
| | −0.282 | 0.265 | 7.696 |
| | −0.290 | 0.275 | 7.696 |
| | −0.298 | 0.286 | 7.696 |
| | −0.307 | 0.296 | 7.696 |
| | −0.315 | 0.307 | 7.696 |
| | −0.324 | 0.317 | 7.696 |
| | −0.332 | 0.327 | 7.696 |
| | −0.341 | 0.337 | 7.696 |
| | −0.351 | 0.347 | 7.696 |
| | −0.353 | 0.349 | 7.696 |
| | −0.354 | 0.351 | 7.696 |
| | −0.356 | 0.353 | 7.696 |
| | −0.358 | 0.355 | 7.696 |
| | −0.360 | 0.357 | 7.696 |
| | −0.362 | 0.358 | 7.696 |
| | −0.364 | 0.360 | 7.696 |
| | −0.366 | 0.362 | 7.696 |
| | −0.368 | 0.364 | 7.696 |
| | −0.370 | 0.366 | 7.696 |
| | −0.373 | 0.369 | 7.696 |
| | −0.376 | 0.372 | 7.696 |
| | −0.379 | 0.375 | 7.696 |
| | −0.381 | 0.379 | 7.696 |
| | −0.383 | 0.383 | 7.696 |
| | −0.384 | 0.387 | 7.696 |
| | −0.385 | 0.391 | 7.696 |
| | −0.386 | 0.395 | 7.696 |
| | −0.385 | 0.400 | 7.696 |
| | −0.385 | 0.404 | 7.696 |
| | −0.384 | 0.408 | 7.696 |
| | −0.382 | 0.412 | 7.696 |
| | −0.381 | 0.416 | 7.696 |
| | −0.378 | 0.420 | 7.696 |
| | −0.376 | 0.423 | 7.696 |
| | −0.373 | 0.427 | 7.696 |
| | −0.370 | 0.430 | 7.696 |
| | −0.367 | 0.433 | 7.696 |
| SECTION 12 | −0.330 | 0.462 | 7.823 |
| | −0.327 | 0.463 | 7.823 |
| | −0.324 | 0.464 | 7.823 |
| | −0.322 | 0.465 | 7.823 |
| | −0.319 | 0.466 | 7.823 |
| | −0.316 | 0.466 | 7.823 |
| | −0.313 | 0.467 | 7.823 |
| | −0.311 | 0.468 | 7.823 |
| | −0.308 | 0.468 | 7.823 |
| | −0.305 | 0.468 | 7.823 |
| | −0.302 | 0.469 | 7.823 |
| | −0.288 | 0.468 | 7.823 |

TABLE 2-continued

| X | Y | Z |
|---|---|---|
| −0.274 | 0.466 | 7.823 |
| −0.260 | 0.462 | 7.823 |
| −0.246 | 0.456 | 7.823 |
| −0.234 | 0.450 | 7.823 |
| −0.221 | 0.442 | 7.823 |
| −0.210 | 0.434 | 7.823 |
| −0.198 | 0.425 | 7.823 |
| −0.188 | 0.416 | 7.823 |
| −0.177 | 0.406 | 7.823 |
| −0.167 | 0.396 | 7.823 |
| −0.157 | 0.385 | 7.823 |
| −0.148 | 0.375 | 7.823 |
| −0.138 | 0.364 | 7.823 |
| −0.129 | 0.353 | 7.823 |
| −0.120 | 0.342 | 7.823 |
| −0.111 | 0.330 | 7.823 |
| −0.102 | 0.319 | 7.823 |
| −0.094 | 0.307 | 7.823 |
| −0.086 | 0.296 | 7.823 |
| −0.077 | 0.284 | 7.823 |
| −0.069 | 0.272 | 7.823 |
| −0.061 | 0.260 | 7.823 |
| −0.054 | 0.248 | 7.823 |
| −0.046 | 0.236 | 7.823 |
| −0.038 | 0.224 | 7.823 |
| −0.031 | 0.211 | 7.823 |
| −0.023 | 0.199 | 7.823 |
| −0.016 | 0.187 | 7.823 |
| −0.008 | 0.175 | 7.823 |
| −0.001 | 0.162 | 7.823 |
| 0.007 | 0.150 | 7.823 |
| 0.014 | 0.138 | 7.823 |
| 0.021 | 0.125 | 7.823 |
| 0.028 | 0.113 | 7.823 |
| 0.036 | 0.100 | 7.823 |
| 0.043 | 0.088 | 7.823 |
| 0.050 | 0.075 | 7.823 |
| 0.057 | 0.063 | 7.823 |
| 0.064 | 0.050 | 7.823 |
| 0.071 | 0.038 | 7.823 |
| 0.078 | 0.025 | 7.823 |
| 0.085 | 0.013 | 7.823 |
| 0.092 | 0.000 | 7.823 |
| 0.099 | −0.012 | 7.823 |
| 0.106 | −0.025 | 7.823 |
| 0.113 | −0.037 | 7.823 |
| 0.120 | −0.050 | 7.823 |
| 0.127 | −0.063 | 7.823 |
| 0.134 | −0.075 | 7.823 |
| 0.141 | −0.088 | 7.823 |
| 0.147 | −0.100 | 7.823 |
| 0.154 | −0.113 | 7.823 |
| 0.161 | −0.126 | 7.823 |
| 0.168 | −0.138 | 7.823 |
| 0.175 | −0.151 | 7.823 |
| 0.182 | −0.163 | 7.823 |
| 0.189 | −0.176 | 7.823 |
| 0.196 | −0.189 | 7.823 |
| 0.202 | −0.201 | 7.823 |
| 0.209 | −0.214 | 7.823 |
| 0.216 | −0.227 | 7.823 |
| 0.223 | −0.239 | 7.823 |
| 0.230 | −0.252 | 7.823 |
| 0.236 | −0.265 | 7.823 |
| 0.243 | −0.277 | 7.823 |
| 0.250 | −0.290 | 7.823 |
| 0.257 | −0.302 | 7.823 |
| 0.263 | −0.315 | 7.823 |
| 0.270 | −0.328 | 7.823 |
| 0.276 | −0.341 | 7.823 |
| 0.283 | −0.354 | 7.823 |
| 0.289 | −0.367 | 7.823 |
| 0.295 | −0.380 | 7.823 |
| 0.301 | −0.393 | 7.823 |
| 0.307 | −0.406 | 7.823 |
| 0.313 | −0.419 | 7.823 |
| 0.319 | −0.432 | 7.823 |
| 0.326 | −0.445 | 7.823 |
| 0.327 | −0.447 | 7.823 |
| 0.328 | −0.450 | 7.823 |
| 0.329 | −0.453 | 7.823 |
| 0.330 | −0.455 | 7.823 |
| 0.331 | −0.458 | 7.823 |
| 0.332 | −0.460 | 7.823 |
| 0.334 | −0.463 | 7.823 |
| 0.335 | −0.466 | 7.823 |
| 0.336 | −0.468 | 7.823 |
| 0.337 | −0.471 | 7.823 |
| 0.338 | −0.474 | 7.823 |
| 0.339 | −0.477 | 7.823 |
| 0.339 | −0.480 | 7.823 |
| 0.339 | −0.483 | 7.823 |
| 0.338 | −0.485 | 7.823 |
| 0.337 | −0.488 | 7.823 |
| 0.336 | −0.491 | 7.823 |
| 0.334 | −0.493 | 7.823 |
| 0.331 | −0.495 | 7.823 |
| 0.329 | −0.496 | 7.823 |
| 0.326 | −0.498 | 7.823 |
| 0.323 | −0.498 | 7.823 |
| 0.320 | −0.499 | 7.823 |
| 0.317 | −0.498 | 7.823 |
| 0.314 | −0.498 | 7.823 |
| 0.311 | −0.497 | 7.823 |
| 0.309 | −0.496 | 7.823 |
| 0.306 | −0.494 | 7.823 |
| 0.304 | −0.492 | 7.823 |
| 0.303 | −0.490 | 7.823 |
| 0.301 | −0.488 | 7.823 |
| 0.299 | −0.486 | 7.823 |
| 0.298 | −0.483 | 7.823 |
| 0.296 | −0.481 | 7.823 |
| 0.295 | −0.479 | 7.823 |
| 0.293 | −0.477 | 7.823 |
| 0.291 | −0.475 | 7.823 |
| 0.290 | −0.473 | 7.823 |
| 0.288 | −0.471 | 7.823 |
| 0.280 | −0.460 | 7.823 |
| 0.272 | −0.449 | 7.823 |
| 0.264 | −0.439 | 7.823 |
| 0.256 | −0.428 | 7.823 |
| 0.248 | −0.418 | 7.823 |
| 0.240 | −0.407 | 7.823 |
| 0.232 | −0.397 | 7.823 |
| 0.224 | −0.386 | 7.823 |
| 0.215 | −0.376 | 7.823 |
| 0.207 | −0.365 | 7.823 |
| 0.199 | −0.355 | 7.823 |
| 0.190 | −0.345 | 7.823 |
| 0.181 | −0.335 | 7.823 |
| 0.173 | −0.325 | 7.823 |
| 0.164 | −0.315 | 7.823 |
| 0.155 | −0.304 | 7.823 |
| 0.147 | −0.294 | 7.823 |
| 0.139 | −0.284 | 7.823 |
| 0.130 | −0.273 | 7.823 |
| 0.122 | −0.263 | 7.823 |
| 0.114 | −0.252 | 7.823 |
| 0.106 | −0.242 | 7.823 |
| 0.098 | −0.231 | 7.823 |
| 0.089 | −0.221 | 7.823 |
| 0.081 | −0.210 | 7.823 |
| 0.073 | −0.200 | 7.823 |
| 0.065 | −0.189 | 7.823 |
| 0.057 | −0.179 | 7.823 |
| 0.048 | −0.168 | 7.823 |
| 0.040 | −0.158 | 7.823 |
| 0.032 | −0.148 | 7.823 |
| 0.024 | −0.137 | 7.823 |
| 0.016 | −0.127 | 7.823 |
| 0.007 | −0.116 | 7.823 |
| −0.001 | −0.105 | 7.823 |
| −0.009 | −0.095 | 7.823 |
| −0.017 | −0.084 | 7.823 |
| −0.025 | −0.074 | 7.823 |
| −0.033 | −0.063 | 7.823 |

TABLE 2-continued

| | X | Y | Z |
|---|---|---|---|
| | −0.041 | −0.053 | 7.823 |
| | −0.049 | −0.042 | 7.823 |
| | −0.057 | −0.032 | 7.823 |
| | −0.065 | −0.021 | 7.823 |
| | −0.073 | −0.010 | 7.823 |
| | −0.081 | 0.000 | 7.823 |
| | −0.089 | 0.011 | 7.823 |
| | −0.097 | 0.022 | 7.823 |
| | −0.105 | 0.032 | 7.823 |
| | −0.113 | 0.043 | 7.823 |
| | −0.121 | 0.054 | 7.823 |
| | −0.129 | 0.064 | 7.823 |
| | −0.137 | 0.075 | 7.823 |
| | −0.145 | 0.086 | 7.823 |
| | −0.153 | 0.096 | 7.823 |
| | −0.161 | 0.107 | 7.823 |
| | −0.169 | 0.118 | 7.823 |
| | −0.177 | 0.128 | 7.823 |
| | −0.185 | 0.139 | 7.823 |
| | −0.192 | 0.150 | 7.823 |
| | −0.200 | 0.161 | 7.823 |
| | −0.208 | 0.172 | 7.823 |
| | −0.216 | 0.182 | 7.823 |
| | −0.224 | 0.193 | 7.823 |
| | −0.231 | 0.204 | 7.823 |
| | −0.239 | 0.215 | 7.823 |
| | −0.247 | 0.226 | 7.823 |
| | −0.254 | 0.237 | 7.823 |
| | −0.262 | 0.247 | 7.823 |
| | −0.270 | 0.258 | 7.823 |
| | −0.277 | 0.269 | 7.823 |
| | −0.285 | 0.280 | 7.823 |
| | −0.292 | 0.291 | 7.823 |
| | −0.300 | 0.302 | 7.823 |
| | −0.307 | 0.313 | 7.823 |
| | −0.315 | 0.324 | 7.823 |
| | −0.323 | 0.335 | 7.823 |
| | −0.330 | 0.346 | 7.823 |
| | −0.338 | 0.357 | 7.823 |
| | −0.346 | 0.368 | 7.823 |
| | −0.347 | 0.370 | 7.823 |
| | −0.349 | 0.372 | 7.823 |
| | −0.350 | 0.374 | 7.823 |
| | −0.352 | 0.376 | 7.823 |
| | −0.353 | 0.378 | 7.823 |
| | −0.355 | 0.380 | 7.823 |
| | −0.357 | 0.383 | 7.823 |
| | −0.358 | 0.385 | 7.823 |
| | −0.360 | 0.387 | 7.823 |
| | −0.361 | 0.389 | 7.823 |
| | −0.364 | 0.393 | 7.823 |
| | −0.367 | 0.398 | 7.823 |
| | −0.368 | 0.402 | 7.823 |
| | −0.369 | 0.407 | 7.823 |
| | −0.370 | 0.412 | 7.823 |
| | −0.370 | 0.417 | 7.823 |
| | −0.370 | 0.422 | 7.823 |
| | −0.369 | 0.427 | 7.823 |
| | −0.367 | 0.432 | 7.823 |
| | −0.365 | 0.436 | 7.823 |
| | −0.363 | 0.440 | 7.823 |
| | −0.359 | 0.444 | 7.823 |
| | −0.356 | 0.448 | 7.823 |
| | −0.352 | 0.451 | 7.823 |
| | −0.348 | 0.454 | 7.823 |
| | −0.344 | 0.456 | 7.823 |
| | −0.339 | 0.458 | 7.823 |
| | −0.334 | 0.460 | 7.823 |
| SECTION 13 | −0.290 | 0.484 | 7.948 |
| | −0.288 | 0.484 | 7.948 |
| | −0.285 | 0.484 | 7.948 |
| | −0.282 | 0.483 | 7.948 |
| | −0.280 | 0.483 | 7.948 |
| | −0.277 | 0.482 | 7.948 |
| | −0.274 | 0.482 | 7.948 |
| | −0.271 | 0.481 | 7.948 |
| | −0.269 | 0.480 | 7.948 |
| | −0.266 | 0.479 | 7.948 |
| | −0.264 | 0.478 | 7.948 |
| | −0.251 | 0.473 | 7.948 |
| | −0.240 | 0.465 | 7.948 |
| | −0.229 | 0.457 | 7.948 |
| | −0.219 | 0.448 | 7.948 |
| | −0.209 | 0.438 | 7.948 |
| | −0.199 | 0.428 | 7.948 |
| | −0.190 | 0.418 | 7.948 |
| | −0.181 | 0.408 | 7.948 |
| | −0.172 | 0.398 | 7.948 |
| | −0.163 | 0.387 | 7.948 |
| | −0.154 | 0.377 | 7.948 |
| | −0.146 | 0.366 | 7.948 |
| | −0.138 | 0.355 | 7.948 |
| | −0.130 | 0.344 | 7.948 |
| | −0.122 | 0.333 | 7.948 |
| | −0.114 | 0.321 | 7.948 |
| | −0.106 | 0.310 | 7.948 |
| | −0.099 | 0.299 | 7.948 |
| | −0.091 | 0.287 | 7.948 |
| | −0.084 | 0.275 | 7.948 |
| | −0.077 | 0.264 | 7.948 |
| | −0.070 | 0.252 | 7.948 |
| | −0.063 | 0.240 | 7.948 |
| | −0.056 | 0.228 | 7.948 |
| | −0.049 | 0.216 | 7.948 |
| | −0.042 | 0.205 | 7.948 |
| | −0.035 | 0.193 | 7.948 |
| | −0.029 | 0.181 | 7.948 |
| | −0.022 | 0.169 | 7.948 |
| | −0.015 | 0.157 | 7.948 |
| | −0.008 | 0.145 | 7.948 |
| | −0.001 | 0.133 | 7.948 |
| | 0.005 | 0.121 | 7.948 |
| | 0.012 | 0.109 | 7.948 |
| | 0.019 | 0.097 | 7.948 |
| | 0.025 | 0.085 | 7.948 |
| | 0.032 | 0.073 | 7.948 |
| | 0.039 | 0.061 | 7.948 |
| | 0.045 | 0.049 | 7.948 |
| | 0.052 | 0.037 | 7.948 |
| | 0.058 | 0.025 | 7.948 |
| | 0.065 | 0.013 | 7.948 |
| | 0.072 | 0.001 | 7.948 |
| | 0.078 | −0.011 | 7.948 |
| | 0.085 | −0.023 | 7.948 |
| | 0.091 | −0.035 | 7.948 |
| | 0.098 | −0.047 | 7.948 |
| | 0.104 | −0.059 | 7.948 |
| | 0.111 | −0.071 | 7.948 |
| | 0.117 | −0.083 | 7.948 |
| | 0.124 | −0.095 | 7.948 |
| | 0.130 | −0.107 | 7.948 |
| | 0.137 | −0.119 | 7.948 |
| | 0.143 | −0.131 | 7.948 |
| | 0.150 | −0.144 | 7.948 |
| | 0.157 | −0.156 | 7.948 |
| | 0.163 | −0.168 | 7.948 |
| | 0.170 | −0.180 | 7.948 |
| | 0.176 | −0.192 | 7.948 |
| | 0.183 | −0.204 | 7.948 |
| | 0.189 | −0.216 | 7.948 |
| | 0.196 | −0.228 | 7.948 |
| | 0.202 | −0.240 | 7.948 |
| | 0.209 | −0.252 | 7.948 |
| | 0.215 | −0.264 | 7.948 |
| | 0.222 | −0.276 | 7.948 |
| | 0.228 | −0.288 | 7.948 |
| | 0.235 | −0.300 | 7.948 |
| | 0.241 | −0.313 | 7.948 |
| | 0.247 | −0.325 | 7.948 |
| | 0.253 | −0.337 | 7.948 |
| | 0.259 | −0.349 | 7.948 |
| | 0.265 | −0.362 | 7.948 |
| | 0.271 | −0.374 | 7.948 |
| | 0.277 | −0.387 | 7.948 |
| | 0.283 | −0.399 | 7.948 |
| | 0.289 | −0.411 | 7.948 |

TABLE 2-continued

| X | Y | Z |
|---|---|---|
| 0.295 | −0.424 | 7.948 |
| 0.301 | −0.436 | 7.948 |
| 0.302 | −0.438 | 7.948 |
| 0.303 | −0.441 | 7.948 |
| 0.304 | −0.443 | 7.948 |
| 0.305 | −0.446 | 7.948 |
| 0.306 | −0.448 | 7.948 |
| 0.307 | −0.451 | 7.948 |
| 0.309 | −0.453 | 7.948 |
| 0.310 | −0.456 | 7.948 |
| 0.311 | −0.458 | 7.948 |
| 0.312 | −0.461 | 7.948 |
| 0.313 | −0.464 | 7.948 |
| 0.314 | −0.467 | 7.948 |
| 0.315 | −0.470 | 7.948 |
| 0.314 | −0.473 | 7.948 |
| 0.314 | −0.476 | 7.948 |
| 0.312 | −0.479 | 7.948 |
| 0.311 | −0.481 | 7.948 |
| 0.309 | −0.484 | 7.948 |
| 0.306 | −0.486 | 7.948 |
| 0.304 | −0.487 | 7.948 |
| 0.301 | −0.489 | 7.948 |
| 0.298 | −0.489 | 7.948 |
| 0.295 | −0.490 | 7.948 |
| 0.292 | −0.490 | 7.948 |
| 0.289 | −0.489 | 7.948 |
| 0.286 | −0.488 | 7.948 |
| 0.283 | −0.487 | 7.948 |
| 0.280 | −0.485 | 7.948 |
| 0.278 | −0.483 | 7.948 |
| 0.276 | −0.481 | 7.948 |
| 0.275 | −0.478 | 7.948 |
| 0.273 | −0.476 | 7.948 |
| 0.272 | −0.474 | 7.948 |
| 0.270 | −0.472 | 7.948 |
| 0.269 | −0.470 | 7.948 |
| 0.267 | −0.468 | 7.948 |
| 0.265 | −0.466 | 7.948 |
| 0.264 | −0.464 | 7.948 |
| 0.262 | −0.462 | 7.948 |
| 0.254 | −0.451 | 7.948 |
| 0.247 | −0.441 | 7.948 |
| 0.239 | −0.430 | 7.948 |
| 0.231 | −0.420 | 7.948 |
| 0.223 | −0.409 | 7.948 |
| 0.215 | −0.399 | 7.948 |
| 0.207 | −0.388 | 7.948 |
| 0.199 | −0.378 | 7.948 |
| 0.191 | −0.368 | 7.948 |
| 0.183 | −0.357 | 7.948 |
| 0.174 | −0.347 | 7.948 |
| 0.166 | −0.337 | 7.948 |
| 0.157 | −0.327 | 7.948 |
| 0.149 | −0.317 | 7.948 |
| 0.140 | −0.307 | 7.948 |
| 0.132 | −0.297 | 7.948 |
| 0.123 | −0.287 | 7.948 |
| 0.115 | −0.277 | 7.948 |
| 0.107 | −0.267 | 7.948 |
| 0.099 | −0.256 | 7.948 |
| 0.091 | −0.246 | 7.948 |
| 0.083 | −0.235 | 7.948 |
| 0.075 | −0.225 | 7.948 |
| 0.067 | −0.215 | 7.948 |
| 0.059 | −0.204 | 7.948 |
| 0.051 | −0.194 | 7.948 |
| 0.043 | −0.183 | 7.948 |
| 0.035 | −0.173 | 7.948 |
| 0.027 | −0.163 | 7.948 |
| 0.019 | −0.152 | 7.948 |
| 0.011 | −0.142 | 7.948 |
| 0.003 | −0.131 | 7.948 |
| −0.005 | −0.121 | 7.948 |
| −0.013 | −0.110 | 7.948 |
| −0.021 | −0.100 | 7.948 |
| −0.028 | −0.089 | 7.948 |
| −0.036 | −0.079 | 7.948 |

TABLE 2-continued

| | X | Y | Z |
|---|---|---|---|
| | −0.044 | −0.068 | 7.948 |
| | −0.052 | −0.058 | 7.948 |
| | −0.060 | −0.047 | 7.948 |
| | −0.068 | −0.037 | 7.948 |
| | −0.075 | −0.026 | 7.948 |
| | −0.083 | −0.016 | 7.948 |
| | −0.091 | −0.005 | 7.948 |
| | −0.099 | 0.006 | 7.948 |
| | −0.106 | 0.016 | 7.948 |
| | −0.114 | 0.027 | 7.948 |
| | −0.122 | 0.038 | 7.948 |
| | −0.129 | 0.048 | 7.948 |
| | −0.137 | 0.059 | 7.948 |
| | −0.144 | 0.070 | 7.948 |
| | −0.152 | 0.081 | 7.948 |
| | −0.159 | 0.091 | 7.948 |
| | −0.167 | 0.102 | 7.948 |
| | −0.174 | 0.113 | 7.948 |
| | −0.182 | 0.124 | 7.948 |
| | −0.189 | 0.135 | 7.948 |
| | −0.197 | 0.145 | 7.948 |
| | −0.204 | 0.156 | 7.948 |
| | −0.211 | 0.167 | 7.948 |
| | −0.219 | 0.178 | 7.948 |
| | −0.226 | 0.189 | 7.948 |
| | −0.233 | 0.200 | 7.948 |
| | −0.240 | 0.211 | 7.948 |
| | −0.247 | 0.222 | 7.948 |
| | −0.254 | 0.233 | 7.948 |
| | −0.261 | 0.244 | 7.948 |
| | −0.268 | 0.255 | 7.948 |
| | −0.275 | 0.267 | 7.948 |
| | −0.282 | 0.278 | 7.948 |
| | −0.289 | 0.289 | 7.948 |
| | −0.295 | 0.300 | 7.948 |
| | −0.302 | 0.312 | 7.948 |
| | −0.308 | 0.323 | 7.948 |
| | −0.315 | 0.335 | 7.948 |
| | −0.321 | 0.346 | 7.948 |
| | −0.327 | 0.358 | 7.948 |
| | −0.333 | 0.369 | 7.948 |
| | −0.339 | 0.381 | 7.948 |
| | −0.341 | 0.383 | 7.948 |
| | −0.342 | 0.386 | 7.948 |
| | −0.343 | 0.388 | 7.948 |
| | −0.344 | 0.390 | 7.948 |
| | −0.345 | 0.393 | 7.948 |
| | −0.346 | 0.395 | 7.948 |
| | −0.348 | 0.397 | 7.948 |
| | −0.349 | 0.400 | 7.948 |
| | −0.350 | 0.402 | 7.948 |
| | −0.351 | 0.404 | 7.948 |
| | −0.354 | 0.410 | 7.948 |
| | −0.355 | 0.417 | 7.948 |
| | −0.357 | 0.423 | 7.948 |
| | −0.357 | 0.429 | 7.948 |
| | −0.357 | 0.436 | 7.948 |
| | −0.356 | 0.442 | 7.948 |
| | −0.354 | 0.449 | 7.948 |
| | −0.352 | 0.454 | 7.948 |
| | −0.348 | 0.460 | 7.948 |
| | −0.344 | 0.465 | 7.948 |
| | −0.339 | 0.469 | 7.948 |
| | −0.334 | 0.473 | 7.948 |
| | −0.328 | 0.476 | 7.948 |
| | −0.322 | 0.479 | 7.948 |
| | −0.316 | 0.481 | 7.948 |
| | −0.310 | 0.482 | 7.948 |
| | −0.303 | 0.484 | 7.948 |
| | −0.297 | 0.484 | 7.948 |
| SECTION 14 | −0.228 | 0.517 | 8.152 |
| | −0.226 | 0.516 | 8.152 |
| | −0.223 | 0.515 | 8.152 |
| | −0.221 | 0.513 | 8.152 |
| | −0.219 | 0.511 | 8.152 |
| | −0.217 | 0.510 | 8.152 |
| | −0.215 | 0.508 | 8.152 |
| | −0.213 | 0.506 | 8.152 |

TABLE 2-continued

| X | Y | Z |
|---|---|---|
| −0.211 | 0.505 | 8.152 |
| −0.210 | 0.503 | 8.152 |
| −0.208 | 0.501 | 8.152 |
| −0.199 | 0.491 | 8.152 |
| −0.192 | 0.480 | 8.152 |
| −0.185 | 0.469 | 8.152 |
| −0.180 | 0.457 | 8.152 |
| −0.175 | 0.445 | 8.152 |
| −0.170 | 0.433 | 8.152 |
| −0.166 | 0.420 | 8.152 |
| −0.162 | 0.408 | 8.152 |
| −0.157 | 0.395 | 8.152 |
| −0.153 | 0.383 | 8.152 |
| −0.148 | 0.371 | 8.152 |
| −0.143 | 0.359 | 8.152 |
| −0.137 | 0.347 | 8.152 |
| −0.131 | 0.335 | 8.152 |
| −0.126 | 0.324 | 8.152 |
| −0.120 | 0.312 | 8.152 |
| −0.114 | 0.300 | 8.152 |
| −0.108 | 0.289 | 8.152 |
| −0.102 | 0.277 | 8.152 |
| −0.096 | 0.265 | 8.152 |
| −0.091 | 0.253 | 8.152 |
| −0.085 | 0.242 | 8.152 |
| −0.079 | 0.230 | 8.152 |
| −0.073 | 0.218 | 8.152 |
| −0.068 | 0.206 | 8.152 |
| −0.062 | 0.195 | 8.152 |
| −0.056 | 0.183 | 8.152 |
| −0.051 | 0.171 | 8.152 |
| −0.045 | 0.159 | 8.152 |
| −0.039 | 0.148 | 8.152 |
| −0.033 | 0.136 | 8.152 |
| −0.027 | 0.124 | 8.152 |
| −0.021 | 0.112 | 8.152 |
| −0.015 | 0.101 | 8.152 |
| −0.009 | 0.089 | 8.152 |
| −0.003 | 0.078 | 8.152 |
| 0.003 | 0.066 | 8.152 |
| 0.009 | 0.054 | 8.152 |
| 0.015 | 0.043 | 8.152 |
| 0.021 | 0.031 | 8.152 |
| 0.027 | 0.020 | 8.152 |
| 0.033 | 0.008 | 8.152 |
| 0.039 | −0.003 | 8.152 |
| 0.045 | −0.015 | 8.152 |
| 0.051 | −0.027 | 8.152 |
| 0.058 | −0.038 | 8.152 |
| 0.064 | −0.050 | 8.152 |
| 0.070 | −0.061 | 8.152 |
| 0.076 | −0.073 | 8.152 |
| 0.082 | −0.084 | 8.152 |
| 0.088 | −0.096 | 8.152 |
| 0.094 | −0.108 | 8.152 |
| 0.101 | −0.119 | 8.152 |
| 0.107 | −0.131 | 8.152 |
| 0.113 | −0.142 | 8.152 |
| 0.119 | −0.154 | 8.152 |
| 0.125 | −0.165 | 8.152 |
| 0.131 | −0.177 | 8.152 |
| 0.138 | −0.188 | 8.152 |
| 0.144 | −0.200 | 8.152 |
| 0.150 | −0.211 | 8.152 |
| 0.156 | −0.223 | 8.152 |
| 0.162 | −0.234 | 8.152 |
| 0.169 | −0.246 | 8.152 |
| 0.175 | −0.257 | 8.152 |
| 0.181 | −0.269 | 8.152 |
| 0.188 | −0.280 | 8.152 |
| 0.194 | −0.292 | 8.152 |
| 0.200 | −0.303 | 8.152 |
| 0.206 | −0.315 | 8.152 |
| 0.212 | −0.327 | 8.152 |
| 0.218 | −0.338 | 8.152 |
| 0.224 | −0.350 | 8.152 |
| 0.229 | −0.362 | 8.152 |
| 0.235 | −0.373 | 8.152 |
| 0.241 | −0.385 | 8.152 |
| 0.247 | −0.397 | 8.152 |
| 0.253 | −0.408 | 8.152 |
| 0.259 | −0.420 | 8.152 |
| 0.260 | −0.422 | 8.152 |
| 0.261 | −0.425 | 8.152 |
| 0.262 | −0.427 | 8.152 |
| 0.263 | −0.430 | 8.152 |
| 0.265 | −0.432 | 8.152 |
| 0.266 | −0.434 | 8.152 |
| 0.267 | −0.437 | 8.152 |
| 0.268 | −0.439 | 8.152 |
| 0.269 | −0.441 | 8.152 |
| 0.270 | −0.444 | 8.152 |
| 0.272 | −0.447 | 8.152 |
| 0.273 | −0.450 | 8.152 |
| 0.273 | −0.453 | 8.152 |
| 0.273 | −0.456 | 8.152 |
| 0.272 | −0.460 | 8.152 |
| 0.271 | −0.463 | 8.152 |
| 0.269 | −0.466 | 8.152 |
| 0.267 | −0.468 | 8.152 |
| 0.264 | −0.470 | 8.152 |
| 0.262 | −0.472 | 8.152 |
| 0.258 | −0.473 | 8.152 |
| 0.255 | −0.474 | 8.152 |
| 0.252 | −0.474 | 8.152 |
| 0.249 | −0.474 | 8.152 |
| 0.245 | −0.474 | 8.152 |
| 0.242 | −0.473 | 8.152 |
| 0.239 | −0.471 | 8.152 |
| 0.237 | −0.469 | 8.152 |
| 0.234 | −0.467 | 8.152 |
| 0.233 | −0.465 | 8.152 |
| 0.231 | −0.463 | 8.152 |
| 0.230 | −0.461 | 8.152 |
| 0.228 | −0.459 | 8.152 |
| 0.227 | −0.457 | 8.152 |
| 0.225 | −0.455 | 8.152 |
| 0.224 | −0.453 | 8.152 |
| 0.222 | −0.451 | 8.152 |
| 0.220 | −0.448 | 8.152 |
| 0.219 | −0.446 | 8.152 |
| 0.211 | −0.436 | 8.152 |
| 0.204 | −0.426 | 8.152 |
| 0.196 | −0.416 | 8.152 |
| 0.188 | −0.405 | 8.152 |
| 0.180 | −0.395 | 8.152 |
| 0.172 | −0.385 | 8.152 |
| 0.165 | −0.375 | 8.152 |
| 0.157 | −0.365 | 8.152 |
| 0.149 | −0.354 | 8.152 |
| 0.141 | −0.344 | 8.152 |
| 0.133 | −0.334 | 8.152 |
| 0.125 | −0.324 | 8.152 |
| 0.116 | −0.314 | 8.152 |
| 0.108 | −0.305 | 8.152 |
| 0.100 | −0.295 | 8.152 |
| 0.092 | −0.285 | 8.152 |
| 0.084 | −0.275 | 8.152 |
| 0.075 | −0.265 | 8.152 |
| 0.067 | −0.255 | 8.152 |
| 0.060 | −0.245 | 8.152 |
| 0.052 | −0.235 | 8.152 |
| 0.044 | −0.224 | 8.152 |
| 0.036 | −0.214 | 8.152 |
| 0.029 | −0.204 | 8.152 |
| 0.021 | −0.194 | 8.152 |
| 0.013 | −0.183 | 8.152 |
| 0.005 | −0.173 | 8.152 |
| −0.002 | −0.163 | 8.152 |
| −0.010 | −0.152 | 8.152 |
| −0.018 | −0.142 | 8.152 |
| −0.025 | −0.132 | 8.152 |
| −0.033 | −0.122 | 8.152 |
| −0.041 | −0.111 | 8.152 |
| −0.048 | −0.101 | 8.152 |
| −0.056 | −0.090 | 8.152 |

TABLE 2-continued

| | X | Y | Z |
|---|---|---|---|
| | −0.063 | −0.080 | 8.152 |
| | −0.071 | −0.069 | 8.152 |
| | −0.078 | −0.059 | 8.152 |
| | −0.086 | −0.048 | 8.152 |
| | −0.093 | −0.038 | 8.152 |
| | −0.100 | −0.027 | 8.152 |
| | −0.108 | −0.017 | 8.152 |
| | −0.115 | −0.006 | 8.152 |
| | −0.122 | 0.004 | 8.152 |
| | −0.129 | 0.015 | 8.152 |
| | −0.137 | 0.026 | 8.152 |
| | −0.144 | 0.036 | 8.152 |
| | −0.151 | 0.047 | 8.152 |
| | −0.158 | 0.058 | 8.152 |
| | −0.165 | 0.068 | 8.152 |
| | −0.172 | 0.079 | 8.152 |
| | −0.179 | 0.090 | 8.152 |
| | −0.186 | 0.101 | 8.152 |
| | −0.193 | 0.112 | 8.152 |
| | −0.199 | 0.123 | 8.152 |
| | −0.206 | 0.134 | 8.152 |
| | −0.213 | 0.145 | 8.152 |
| | −0.219 | 0.156 | 8.152 |
| | −0.226 | 0.167 | 8.152 |
| | −0.232 | 0.178 | 8.152 |
| | −0.239 | 0.189 | 8.152 |
| | −0.245 | 0.200 | 8.152 |
| | −0.251 | 0.212 | 8.152 |
| | −0.257 | 0.223 | 8.152 |
| | −0.263 | 0.234 | 8.152 |
| | −0.269 | 0.246 | 8.152 |
| | −0.275 | 0.257 | 8.152 |
| | −0.281 | 0.269 | 8.152 |
| | −0.286 | 0.280 | 8.152 |
| | −0.292 | 0.292 | 8.152 |
| | −0.297 | 0.304 | 8.152 |
| | −0.302 | 0.315 | 8.152 |
| | −0.307 | 0.327 | 8.152 |
| | −0.312 | 0.339 | 8.152 |
| | −0.316 | 0.351 | 8.152 |
| | −0.320 | 0.364 | 8.152 |
| | −0.324 | 0.376 | 8.152 |
| | −0.327 | 0.388 | 8.152 |
| | −0.330 | 0.401 | 8.152 |
| | −0.330 | 0.403 | 8.152 |
| | −0.331 | 0.406 | 8.152 |
| | −0.331 | 0.408 | 8.152 |
| | −0.331 | 0.411 | 8.152 |
| | −0.332 | 0.414 | 8.152 |
| | −0.332 | 0.416 | 8.152 |
| | −0.333 | 0.419 | 8.152 |
| | −0.333 | 0.421 | 8.152 |
| | −0.333 | 0.424 | 8.152 |
| | −0.334 | 0.426 | 8.152 |
| | −0.336 | 0.435 | 8.152 |
| | −0.338 | 0.445 | 8.152 |
| | −0.338 | 0.454 | 8.152 |
| | −0.338 | 0.463 | 8.152 |
| | −0.336 | 0.473 | 8.152 |
| | −0.333 | 0.482 | 8.152 |
| | −0.329 | 0.490 | 8.152 |
| | −0.324 | 0.498 | 8.152 |
| | −0.317 | 0.504 | 8.152 |
| | −0.310 | 0.510 | 8.152 |
| | −0.301 | 0.514 | 8.152 |
| | −0.293 | 0.518 | 8.152 |
| | −0.283 | 0.520 | 8.152 |
| | −0.274 | 0.522 | 8.152 |
| | −0.265 | 0.522 | 8.152 |
| | −0.255 | 0.522 | 8.152 |
| | −0.246 | 0.521 | 8.152 |
| | −0.237 | 0.521 | 8.152 |
| SECTION 15 | −0.222 | 0.515 | 8.275 |
| | −0.220 | 0.513 | 8.275 |
| | −0.218 | 0.512 | 8.275 |
| | −0.216 | 0.510 | 8.275 |
| | −0.215 | 0.508 | 8.275 |
| | −0.213 | 0.506 | 8.275 |
| | −0.212 | 0.504 | 8.275 |
| | −0.210 | 0.502 | 8.275 |
| | −0.208 | 0.500 | 8.275 |
| | −0.207 | 0.497 | 8.275 |
| | −0.206 | 0.495 | 8.275 |
| | −0.199 | 0.484 | 8.275 |
| | −0.193 | 0.473 | 8.275 |
| | −0.188 | 0.461 | 8.275 |
| | −0.183 | 0.449 | 8.275 |
| | −0.179 | 0.437 | 8.275 |
| | −0.176 | 0.425 | 8.275 |
| | −0.173 | 0.413 | 8.275 |
| | −0.170 | 0.400 | 8.275 |
| | −0.167 | 0.388 | 8.275 |
| | −0.163 | 0.375 | 8.275 |
| | −0.160 | 0.363 | 8.275 |
| | −0.155 | 0.351 | 8.275 |
| | −0.151 | 0.339 | 8.275 |
| | −0.146 | 0.327 | 8.275 |
| | −0.141 | 0.316 | 8.275 |
| | −0.136 | 0.304 | 8.275 |
| | −0.131 | 0.292 | 8.275 |
| | −0.125 | 0.280 | 8.275 |
| | −0.120 | 0.269 | 8.275 |
| | −0.115 | 0.257 | 8.275 |
| | −0.109 | 0.246 | 8.275 |
| | −0.104 | 0.234 | 8.275 |
| | −0.098 | 0.223 | 8.275 |
| | −0.093 | 0.211 | 8.275 |
| | −0.087 | 0.200 | 8.275 |
| | −0.082 | 0.188 | 8.275 |
| | −0.076 | 0.177 | 8.275 |
| | −0.070 | 0.165 | 8.275 |
| | −0.065 | 0.154 | 8.275 |
| | −0.059 | 0.142 | 8.275 |
| | −0.054 | 0.131 | 8.275 |
| | −0.048 | 0.119 | 8.275 |
| | −0.042 | 0.108 | 8.275 |
| | −0.037 | 0.096 | 8.275 |
| | −0.031 | 0.085 | 8.275 |
| | −0.025 | 0.073 | 8.275 |
| | −0.019 | 0.062 | 8.275 |
| | −0.013 | 0.051 | 8.275 |
| | −0.007 | 0.039 | 8.275 |
| | −0.001 | 0.028 | 8.275 |
| | 0.004 | 0.017 | 8.275 |
| | 0.010 | 0.005 | 8.275 |
| | 0.016 | −0.006 | 8.275 |
| | 0.022 | −0.017 | 8.275 |
| | 0.028 | −0.029 | 8.275 |
| | 0.034 | −0.040 | 8.275 |
| | 0.040 | −0.051 | 8.275 |
| | 0.046 | −0.062 | 8.275 |
| | 0.052 | −0.074 | 8.275 |
| | 0.058 | −0.085 | 8.275 |
| | 0.064 | −0.096 | 8.275 |
| | 0.070 | −0.107 | 8.275 |
| | 0.077 | −0.119 | 8.275 |
| | 0.083 | −0.130 | 8.275 |
| | 0.089 | −0.141 | 8.275 |
| | 0.095 | −0.152 | 8.275 |
| | 0.101 | −0.163 | 8.275 |
| | 0.107 | −0.175 | 8.275 |
| | 0.113 | −0.186 | 8.275 |
| | 0.120 | −0.197 | 8.275 |
| | 0.126 | −0.208 | 8.275 |
| | 0.132 | −0.219 | 8.275 |
| | 0.138 | −0.231 | 8.275 |
| | 0.145 | −0.242 | 8.275 |
| | 0.151 | −0.253 | 8.275 |
| | 0.157 | −0.264 | 8.275 |
| | 0.164 | −0.275 | 8.275 |
| | 0.170 | −0.286 | 8.275 |
| | 0.176 | −0.297 | 8.275 |
| | 0.183 | −0.308 | 8.275 |
| | 0.189 | −0.320 | 8.275 |
| | 0.195 | −0.331 | 8.275 |
| | 0.201 | −0.342 | 8.275 |

TABLE 2-continued

| X | Y | Z |
|---|---|---|
| 0.207 | −0.353 | 8.275 |
| 0.213 | −0.365 | 8.275 |
| 0.219 | −0.376 | 8.275 |
| 0.225 | −0.387 | 8.275 |
| 0.232 | −0.398 | 8.275 |
| 0.238 | −0.409 | 8.275 |
| 0.239 | −0.412 | 8.275 |
| 0.240 | −0.414 | 8.275 |
| 0.241 | −0.416 | 8.275 |
| 0.242 | −0.418 | 8.275 |
| 0.244 | −0.421 | 8.275 |
| 0.245 | −0.423 | 8.275 |
| 0.246 | −0.425 | 8.275 |
| 0.247 | −0.427 | 8.275 |
| 0.248 | −0.430 | 8.275 |
| 0.250 | −0.432 | 8.275 |
| 0.251 | −0.435 | 8.275 |
| 0.252 | −0.438 | 8.275 |
| 0.253 | −0.442 | 8.275 |
| 0.253 | −0.445 | 8.275 |
| 0.252 | −0.448 | 8.275 |
| 0.251 | −0.452 | 8.275 |
| 0.249 | −0.455 | 8.275 |
| 0.247 | −0.457 | 8.275 |
| 0.245 | −0.460 | 8.275 |
| 0.242 | −0.461 | 8.275 |
| 0.239 | −0.463 | 8.275 |
| 0.235 | −0.464 | 8.275 |
| 0.232 | −0.464 | 8.275 |
| 0.228 | −0.464 | 8.275 |
| 0.225 | −0.464 | 8.275 |
| 0.222 | −0.463 | 8.275 |
| 0.219 | −0.462 | 8.275 |
| 0.216 | −0.460 | 8.275 |
| 0.214 | −0.457 | 8.275 |
| 0.212 | −0.455 | 8.275 |
| 0.210 | −0.453 | 8.275 |
| 0.209 | −0.451 | 8.275 |
| 0.207 | −0.449 | 8.275 |
| 0.206 | −0.447 | 8.275 |
| 0.204 | −0.445 | 8.275 |
| 0.202 | −0.443 | 8.275 |
| 0.201 | −0.441 | 8.275 |
| 0.199 | −0.439 | 8.275 |
| 0.198 | −0.437 | 8.275 |
| 0.190 | −0.427 | 8.275 |
| 0.182 | −0.417 | 8.275 |
| 0.174 | −0.407 | 8.275 |
| 0.166 | −0.397 | 8.275 |
| 0.158 | −0.387 | 8.275 |
| 0.150 | −0.377 | 8.275 |
| 0.142 | −0.367 | 8.275 |
| 0.134 | −0.357 | 8.275 |
| 0.126 | −0.347 | 8.275 |
| 0.118 | −0.337 | 8.275 |
| 0.110 | −0.327 | 8.275 |
| 0.102 | −0.317 | 8.275 |
| 0.094 | −0.307 | 8.275 |
| 0.086 | −0.297 | 8.275 |
| 0.078 | −0.288 | 8.275 |
| 0.070 | −0.278 | 8.275 |
| 0.061 | −0.268 | 8.275 |
| 0.053 | −0.258 | 8.275 |
| 0.046 | −0.248 | 8.275 |
| 0.038 | −0.238 | 8.275 |
| 0.030 | −0.228 | 8.275 |
| 0.022 | −0.217 | 8.275 |
| 0.015 | −0.207 | 8.275 |
| 0.007 | −0.197 | 8.275 |
| 0.000 | −0.187 | 8.275 |
| −0.008 | −0.176 | 8.275 |
| −0.015 | −0.166 | 8.275 |
| −0.023 | −0.156 | 8.275 |
| −0.031 | −0.145 | 8.275 |
| −0.038 | −0.135 | 8.275 |
| −0.046 | −0.125 | 8.275 |
| −0.053 | −0.114 | 8.275 |
| −0.060 | −0.104 | 8.275 |
| −0.068 | −0.094 | 8.275 |
| −0.075 | −0.083 | 8.275 |
| −0.083 | −0.073 | 8.275 |
| −0.090 | −0.062 | 8.275 |
| −0.097 | −0.052 | 8.275 |
| −0.104 | −0.041 | 8.275 |
| −0.112 | −0.031 | 8.275 |
| −0.119 | −0.020 | 8.275 |
| −0.126 | −0.010 | 8.275 |
| −0.133 | 0.001 | 8.275 |
| −0.140 | 0.011 | 8.275 |
| −0.147 | 0.022 | 8.275 |
| −0.155 | 0.033 | 8.275 |
| −0.162 | 0.043 | 8.275 |
| −0.169 | 0.054 | 8.275 |
| −0.175 | 0.065 | 8.275 |
| −0.182 | 0.076 | 8.275 |
| −0.189 | 0.086 | 8.275 |
| −0.196 | 0.097 | 8.275 |
| −0.203 | 0.108 | 8.275 |
| −0.209 | 0.119 | 8.275 |
| −0.216 | 0.130 | 8.275 |
| −0.223 | 0.141 | 8.275 |
| −0.229 | 0.152 | 8.275 |
| −0.235 | 0.163 | 8.275 |
| −0.242 | 0.174 | 8.275 |
| −0.248 | 0.185 | 8.275 |
| −0.254 | 0.196 | 8.275 |
| −0.260 | 0.208 | 8.275 |
| −0.266 | 0.219 | 8.275 |
| −0.271 | 0.230 | 8.275 |
| −0.277 | 0.242 | 8.275 |
| −0.283 | 0.253 | 8.275 |
| −0.288 | 0.265 | 8.275 |
| −0.293 | 0.277 | 8.275 |
| −0.299 | 0.288 | 8.275 |
| −0.304 | 0.300 | 8.275 |
| −0.308 | 0.312 | 8.275 |
| −0.313 | 0.324 | 8.275 |
| −0.317 | 0.336 | 8.275 |
| −0.321 | 0.348 | 8.275 |
| −0.325 | 0.360 | 8.275 |
| −0.328 | 0.373 | 8.275 |
| −0.330 | 0.385 | 8.275 |
| −0.333 | 0.398 | 8.275 |
| −0.334 | 0.410 | 8.275 |
| −0.335 | 0.413 | 8.275 |
| −0.335 | 0.415 | 8.275 |
| −0.335 | 0.418 | 8.275 |
| −0.336 | 0.420 | 8.275 |
| −0.336 | 0.423 | 8.275 |
| −0.336 | 0.426 | 8.275 |
| −0.336 | 0.428 | 8.275 |
| −0.336 | 0.431 | 8.275 |
| −0.337 | 0.433 | 8.275 |
| −0.337 | 0.436 | 8.275 |
| −0.338 | 0.445 | 8.275 |
| −0.339 | 0.455 | 8.275 |
| −0.339 | 0.465 | 8.275 |
| −0.337 | 0.474 | 8.275 |
| −0.335 | 0.484 | 8.275 |
| −0.331 | 0.493 | 8.275 |
| −0.327 | 0.501 | 8.275 |
| −0.321 | 0.509 | 8.275 |
| −0.313 | 0.515 | 8.275 |
| −0.305 | 0.520 | 8.275 |
| −0.296 | 0.524 | 8.275 |
| −0.287 | 0.527 | 8.275 |
| −0.277 | 0.529 | 8.275 |
| −0.268 | 0.529 | 8.275 |
| −0.258 | 0.528 | 8.275 |
| −0.248 | 0.526 | 8.275 |
| −0.239 | 0.524 | 8.275 |
| −0.230 | 0.520 | 8.275 |

It should be understood that the finished second stage HPT blade 42b does not necessarily include all the sections defined in Table 2. The portion of the airfoil 54 proximal to the platform 60 and tip 62 may not be defined by a profile section 66. It should be considered that the blade 42b airfoil profile proximal to the platform 60 may vary due to several imposed constraints. However, the HPT blade 42b has an intermediate airfoil portion 64 defined between platform 60 and tip 62 thereof and which has a profile defined on the basis of at least the intermediate sections of the various vane profile sections 66 defined in Table 2.

It should be appreciated that the intermediate airfoil portion 64 of the HPT stage blade 42b is defined between the inner and outer gaspath walls 28 and 30 and that the platform 60 forms part of the inner gaspath wall 28. More specifically, the Z values defining the gaspath 27 in the region of the stacking line 50 are comprised within the range of about 6.18 to about 8.15 which generally correspond to the z values around the stacking line 50 (x=4.433 inches in the gas path coordinate system). The airfoil profile physically appearing on HPT blade 42b and fully contained in the gaspath includes Sections 3 to 13 of Table 2. The remaining sections are at least partly located outside of the gaspath 27, but are provided, in part, to fully define the airfoil surface and/or, in part, to improve curve-fitting of the airfoil at its radially distal portions. The skilled reader will appreciate that a suitable fillet radius is to be applied between the platform 60 and the airfoil portion of the blade. The blade inner diameter endwall fillet is in the range of about 0.120 in. to about 0.225 in.

Figure 4A:
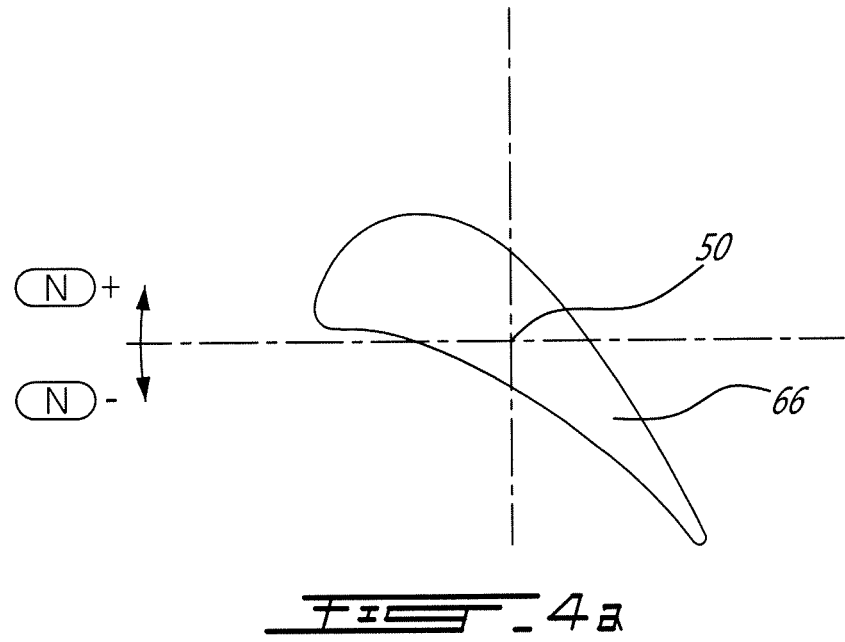
FIGS. 4a and 4b are simplified 2D HP turbine blade airfoil cross-sections illustrating the angular twist and restagger tolerances.
Figure 4B:
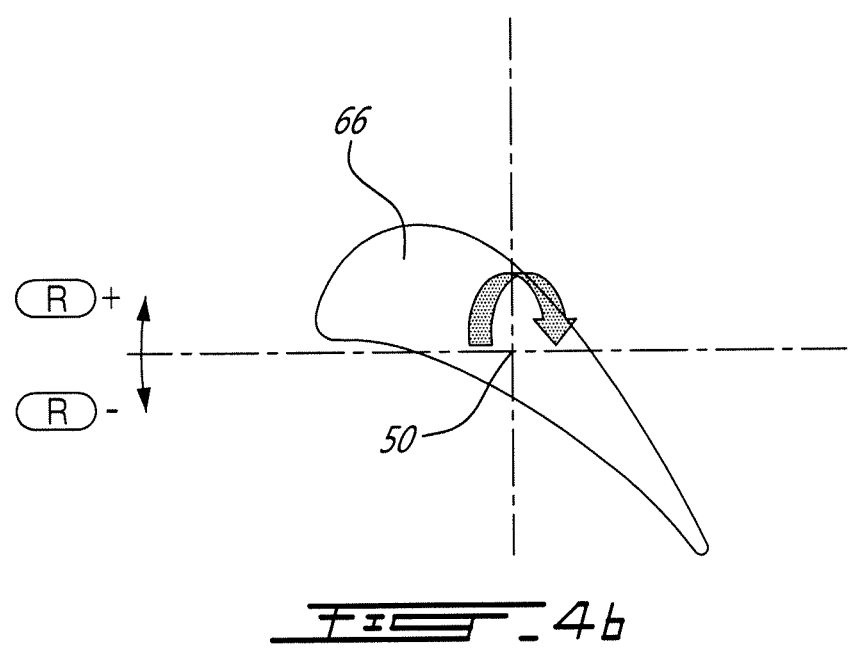

FIGS. 4a and 4b illustrate the tolerances on twist and restagger angles. The twist "N" is an angular variation at each blade section, whereas restagger "R" is the angular reposition of the entire airfoil. Both the twist and the restagger angles are about the stacking line 50. The section twist "N" (section restagger) tolerance with respect to the stacking line is +/−0.501 degrees (casting tolerance). The global restagger "R" capability for the airfoil with respect to the stacking line is +/−2.0 degrees (throat area adjustment).

Referring to FIG. 5, the airfoil portion 64 of the HPT stage blade 42b is hollow, and as such its profile is defined by a perimeter wall 68 surrounding an enclosure 70. In the illustrated embodiment, a plurality of ribs 72 are shown extending across the enclosure 70 to interconnect opposed sides of the wall 68 and to separate the enclosure into adjacent cooling cavities. Although not shown, the ribs 72 may include apertures defined therethrough to allow fluid circulation within the enclosure 70. However, it is understood that the configuration of the blade 42b within the enclosure 70 may vary. The perimeter wall 68 includes a plurality of cooling holes defined therethrough which provide fluid communication between the enclosure 70 and the gaspath 27, such that a cooling fluid circulated through the hollow airfoil portion 64 can exit into the gaspath 27 through the cooling holes.

Referring to FIGS. 5-6, the cooling holes include at least one set selected between first, second, third and fourth sets of cooling holes. The holes PA-1 to PA-10 of the first set 76 are defined as an at least substantially radially extending row of holes located on the pressure side of the airfoil 54, closer to the trailing edge 58 than to the leading edge 56. The first set 76 of holes generally extends along only part of the height of the airfoil portion 64, with the radially outermost hole PA-10 being defined spaced apart from the blade tip 62 and the radially innermost hole PA-1 being defined in proximity of the inner platform 60.

The holes PB-1 to PB-3 of the second set 78 are defined as an at least approximately axially extending row of holes located near the tip of the blade 42b, with the row being defined on the pressure side of the airfoil 54 near its leading edge 56.

The holes HA-1 to HA-9 of the third set 80 are defined as an at least substantially radially extending row of holes located near or along the leading edge 56 of the airfoil 54. The third set 80 of holes generally extends along the height of the airfoil portion 64, with the radially outermost hole HA-9 being defined in proximity of the blade tip 62 and the radially innermost hole HA-1 being defined in proximity of the inner platform 60. In the embodiment shown, the distance between the radially outermost hole HA-9 and the adjacent hole HA-8 of the third set 80 is substantially greater than the distance between other adjacent ones of the holes of the third set 80. In the embodiment shown, the radially outermost hole HA-9 of the third set 80 is located in-line or approximately in-line with the holes of the second set 78.

The holes SA-1 to SA-8 of the fourth set 82 are defined as an at least substantially radially extending row of holes located on the suction side of the airfoil 54, near the leading edge 56. The fourth set 82 of holes generally extends along only part of the height of the airfoil portion 64, with the radially outermost hole SA-8 being defined spaced apart from the blade tip 62 and the radially innermost hole SA-1 being defined in proximity of the inner platform 60.

In a particular embodiment, all cooling holes of the first, second, third and fourth sets 76, 78, 80, 82 have a nominal diameter of 0.014 inches. In a particular embodiment, the tolerance on the hole diameters is ±0.006 in., preferably ±0.004 in. In a particular embodiment, the minimum tolerance for the hole diameter is controlled by a minimum flow requirement over all of the cooling holes provided on the blade 42b.

The central axis of each airfoil cooling hole extends through respective points 1 and 2, with the nominal coordinates of point 1 and point 2 for each hole being set out in Table 3, in units of inches, in the blade coordinate system X, Y, Z described above. The Table 3 values are generated and shown to three decimal places for determining the location of the central axis of the airfoil cooling holes. However, as mentioned above, there are manufacturing tolerance issues to be addressed and, accordingly, the values for the points defining the central axis of each hole given in Table 3 are for a theoretical airfoil. In a particular embodiment, the tolerance envelope of point 1 and point 2 for the airfoil holes is ±0.030 in. of the nominal position with respect to the X, Y, and Z axes. As the coordinates are set out in the blade coordinate system, their value applies regardless of the restagger of the blade.

Point 1 may corresponds to the intersection of the cooling hole's central axis with the outer surface 71 (see FIG. 5) of the airfoil perimeter wall 68, the outer surface 71 being in a "cold" non-operating coated condition, and/or point 2 may correspond to the intersection of the cooling hole's central axis with the inner surfaces 73 of the airfoil perimeter wall 68. However, in a particular embodiment, although the holes extend through the inner and outer surfaces 71, 73 of the airfoil wall 68, points 1 and 2 are not defined along these surfaces.

The coordinate values given in Table 3 below thus provide two nominal points defined along the preferred central axis of cooling holes formed in the airfoil portion of the second stage HPT blade 42b, in the blade coordinate system.

TABLE 3

| Hole | Point 1 | | | Point 2 | | |
|---|---|---|---|---|---|---|
| | X | Y | Z | X | Y | Z |
| PA-1 | 0.078 | −0.174 | 6.379 | 0.072 | −0.084 | 6.265 |
| PA-2 | 0.092 | −0.180 | 6.489 | 0.087 | −0.087 | 6.371 |

TABLE 3-continued

| Hole | Point 1 | | | Point 2 | | |
|---|---|---|---|---|---|---|
| | X | Y | Z | X | Y | Z |
| PA-3 | 0.107 | −0.188 | 6.601 | 0.101 | −0.099 | 6.489 |
| PA-4 | 0.121 | −0.199 | 6.718 | 0.117 | −0.118 | 6.615 |
| PA-5 | 0.136 | −0.215 | 6.841 | 0.132 | −0.135 | 6.739 |
| PA-6 | 0.149 | −0.232 | 6.956 | 0.149 | −0.154 | 6.839 |
| PA-7 | 0.149 | −0.237 | 7.079 | 0.149 | −0.160 | 6.965 |
| PA-8 | 0.150 | −0.239 | 7.199 | 0.149 | −0.173 | 7.100 |
| PA-9 | 0.150 | −0.239 | 7.315 | 0.150 | −0.183 | 7.232 |
| PA-10 | 0.150 | −0.239 | 7.432 | 0.150 | −0.193 | 7.363 |
| PB-1 | −0.271 | 0.282 | 8.035 | −0.262 | 0.318 | 7.981 |
| PB-2 | −0.298 | 0.334 | 8.030 | −0.280 | 0.349 | 7.967 |
| PB-3 | −0.325 | 0.395 | 8.029 | −0.293 | 0.383 | 7.946 |
| HA-1 | −0.462 | 0.204 | 6.641 | −0.403 | 0.175 | 6.444 |
| HA-2 | −0.459 | 0.193 | 6.773 | −0.401 | 0.178 | 6.597 |
| HA-3 | −0.452 | 0.188 | 6.912 | −0.397 | 0.179 | 6.729 |
| HA-4 | −0.435 | 0.201 | 7.076 | −0.383 | 0.185 | 6.871 |
| HA-5 | −0.421 | 0.240 | 7.219 | −0.367 | 0.206 | 7.020 |
| HA-6 | −0.409 | 0.301 | 7.380 | −0.347 | 0.244 | 7.171 |
| HA-7 | −0.399 | 0.351 | 7.494 | −0.337 | 0.277 | 7.284 |
| HA-8 | −0.383 | 0.397 | 7.635 | −0.328 | 0.316 | 7.408 |
| HA-9 | −0.340 | 0.451 | 8.015 | −0.294 | 0.402 | 7.830 |
| SA-1 | −0.361 | 0.331 | 6.374 | −0.379 | 0.232 | 6.222 |
| SA-2 | −0.352 | 0.317 | 6.489 | −0.369 | 0.225 | 6.347 |
| SA-3 | −0.343 | 0.307 | 6.609 | −0.358 | 0.224 | 6.482 |
| SA-4 | −0.332 | 0.303 | 6.738 | −0.345 | 0.231 | 6.628 |
| SA-5 | −0.320 | 0.305 | 6.877 | −0.333 | 0.238 | 6.774 |
| SA-6 | −0.307 | 0.317 | 7.032 | −0.320 | 0.244 | 6.920 |
| SA-7 | −0.356 | 0.318 | 7.162 | −0.323 | 0.250 | 7.033 |
| SA-8 | −0.356 | 0.360 | 7.319 | −0.315 | 0.277 | 7.185 |

It is understood that depending on cooling requirements, the blade 42b may include only one of the sets 76, 78, 80, 82 of holes, any combination of two of the sets 76, 78, 80, 82 of holes, or any combination of three of the sets 76, 78, 80, 82 of holes. In a particular embodiment, the blade 42b includes all the sets 76, 78, 80, 82 of holes. Cooling holes with different coordinates may be provided in replacement of the omitted sets of holes, additional cooling holes may be provided in proximity of the included sets of holes and/or additional cooling holes may be provided at other locations on the airfoil portion 64.

In a particular embodiment, the enclosure 70 is separated into at least two independent cooling cavities, one in communication with the first set 76 of cooling holes and/or with other cooling holes, and another in communication with the other sets 78, 80, 82 of cooling holes and/or with other cooling holes.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A turbine blade for a gas turbine engine comprising an airfoil portion defined by a perimeter wall surrounding at least one enclosure, the perimeter wall having a plurality of cooling holes defined therethrough and providing fluid communication between the at least one enclosure and a gaspath of the gas turbine engine, the plurality of cooling holes including at least one row of holes selected from the group consisting of a first row, a second row, a third row and a fourth row, with the first row extending at least substantially radially and closer to a trailing edge than to a leading edge of the airfoil portion, the second row extending at least approximately axially near a tip of the blade and near the leading edge, the third and fourth rows extending at least substantially radially adjacent the leading edge, and the first, second, third and fourth rows of holes respectively including the holes numbered PA-1 to PA-10, PB-1 to PB-3, HA-1 to HA-9, and SA-1 to SA-8 located such that a central axis thereof extends through the respective point 1 and point 2 having a nominal location in accordance with the X, Y, Z Cartesian coordinate values set forth in Table 3, wherein the point of origin of the X, Y, Z Cartesian system is located at an intersection of a centerline of the gas turbine engine and a stacking line of the turbine blade, the X axis being angled with respect to a turbine rotor centerline by an angle corresponding to a restagger of the blade with a positive direction thereof being oriented towards aft of the engine and the Z axis extending generally radially along the stacking line with a positive direction thereof being oriented toward the tip of the blade.

2. The turbine blade as defined in claim 1, wherein for each hole, at least one of point 1 and point 2 corresponds to an intersection of the central axis of the hole with a surface of the perimeter wall.

3. The turbine blade as defined in claim 1, wherein each hole has a nominal diameter of 0.014 inches with a tolerance of ±0.006 inches.

4. The turbine blade as defined in claim 1, wherein the X, Y, Z Cartesian coordinate values have a tolerance of ±0.030 inches of the nominal location with respect to the X, Y and Z axes.

5. The turbine blade as defined in claim 1, wherein an outer surface of the perimeter wall is defined by a nominal profile substantially in accordance with the X, Y, and Z Cartesian coordinate values of Sections 3 to 14 set forth in Table 2.

6. The turbine blade as defined in claim 1, wherein the airfoil portion includes two rows of holes selected from the group consisting of the first row, the second row, the third row and the fourth row.

7. The turbine blade as defined in claim 1, wherein the airfoil portion includes three rows of holes selected from the group consisting of the first row, the second row, the third row and the fourth row.

8. The turbine blade as defined in claim 1, wherein the airfoil portion includes the first row of holes, the second row of holes, the third row of holes and the fourth row of holes.

9. A turbine rotor assembly for a gas turbine engine comprising a blade having an airfoil portion defined by a perimeter wall enclosing at least one cooling cavity, the perimeter wall having a plurality of cooling holes defined therethrough and providing fluid communication between the at least one cooling cavity and a gaspath of the gas turbine engine, the plurality of cooling holes including at least one row of holes selected from the group consisting of a first row, a second row, a third row and a fourth row, with the first row being defined closer to a trailing edge than to a leading edge of the airfoil portion, and the second, third and fourth rows being defined along or in proximity of the leading edge, the first, second, third and fourth rows of holes respectively including the holes numbered PA-1 to PA-10, PB-1 to PB-3, HA-1 to HA-9, and SA-1 to SA-8, located such that a central axis thereof extends through the respective point 1 and point 2 having a nominal location in accordance with the X, Y, Z Cartesian coordinate values set forth in Table 3, wherein the point of origin of X, Y, Z Cartesian system is located at an intersection of a centerline of the gas turbine engine and a stacking line of the turbine blade, the X axis being angled with respect to a turbine rotor centerline by an angle corresponding to a restagger of the blade with a positive direction thereof being oriented towards aft of the engine and the Z axis extending generally radially along the stacking line with a positive direction thereof being oriented toward a tip of the blade.

10. The rotor as defined in claim 9, wherein each hole has a nominal diameter of 0.014 inches with a tolerance of ±0.006 inches.

11. The rotor as defined in claim 9, wherein the X, Y, Z Cartesian coordinate values have a tolerance of ±0.030 inches.

12. The rotor as defined in claim 9, wherein an outer surface of the perimeter wall is defined by a nominal profile substantially in accordance with the X, Y, and Z Cartesian coordinate values of Sections 3 to 14 set forth in Table 2.

13. The rotor as defined in claim 9, wherein the airfoil portion includes two rows of holes selected from the group consisting of the first row, the second row, the third row and the fourth row.

14. The rotor as defined in claim 9, wherein the airfoil portion includes three rows of holes selected from the group consisting of the first row, the second row, the third row and the fourth row.

15. The rotor as defined in claim 9, wherein the airfoil portion includes the first row of holes, the second row of holes, the third row of holes and the fourth row of holes.

16. A high pressure turbine blade comprising an airfoil having a perimeter wall surrounding at least one cooling cavity, the perimeter wall having an outer surface lying substantially on the points of Table 2, the perimeter wall having a plurality of cooling holes defined therethrough in fluid communication with the at least one cooling cavity, the plurality of cooling holes including at least one row of holes selected from the group consisting of a first row, a second row, a third row and a fourth row, with the first, second, third and fourth rows of holes respectively including the holes numbered PA-1 to PA-10, PB-1 to PB-3, HA-1 to HA-9, and SA-1 to SA-8, located such that a central axis thereof extends through the respective point 1 and point 2 having a nominal location in accordance with the X, Y, Z Cartesian coordinate values set forth in Table 3, wherein the point of origin of X, Y, Z Cartesian system is located at an intersection of a centerline of the gas turbine engine and a stacking line of the turbine blade, the X axis being angled with respect to a turbine rotor centerline by an angle corresponding to a restagger of the blade with a positive direction thereof being oriented towards aft of the engine and the Z axis extending generally radially along the stacking line with a positive direction thereof being oriented toward a tip of the blade.

17. The turbine blade as defined in claim 16, wherein the airfoil portion includes the first row of holes, the second row of holes, the third row of holes and the fourth row of holes.

18. The turbine blade as defined in claim 16, wherein the airfoil portion includes three rows of holes selected from the group consisting of the first row, the second row, the third row and the fourth row.

19. The turbine blade as defined in claim 16, wherein each hole of the first, second, third and fourth rows has a nominal diameter of 0.014 inches with a tolerance of ±0.006 inches.

20. The turbine blade as defined in claim 16, wherein the X, Y, Z Cartesian coordinate values of the holes have a tolerance of ±0.030 inches of the nominal location with respect to the X, Y and Z axes.

* * * * *